US011176621B1

United States Patent
McDonald et al.

(10) Patent No.: US 11,176,621 B1
(45) Date of Patent: Nov. 16, 2021

(54) COMPUTER-IMPLEMENTED METHODS SYSTEMS AND ARTICLES OF MANUFACTURE FOR ADDRESSING OPTICAL CHARACTER RECOGNITION TRIGGERED IMPORT ERRORS DURING PREPARATION OF ELECTRONIC TAX RETURN

(71) Applicant: INTUIT INC., Mountain View, CA (US)

(72) Inventors: Andrew S. McDonald, San Diego, CA (US); Caitlin Elizabeth Flint, San Diego, CA (US); Phillip J. Ohme, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 597 days.

(21) Appl. No.: 15/419,399

(22) Filed: Jan. 30, 2017

(51) Int. Cl.
*G06Q 40/00* (2012.01)
(52) U.S. Cl.
CPC .................. *G06Q 40/123* (2013.12)
(58) Field of Classification Search
CPC .............. G06Q 40/123; G06Q 40/00
See application file for complete search history.

(56) References Cited

U.S. PATENT DOCUMENTS

| | | | | |
|---|---|---|---|---|
| 8,606,665 B1* | 12/2013 | Shaw | ................... | G06Q 40/123 705/31 |
| 8,626,617 B1* | 1/2014 | Bhatt | ..................... | G06Q 40/12 705/30 |
| 9,412,017 B1* | 8/2016 | Huang | ................ | G06K 9/00449 |
| 10,235,721 B1* | 3/2019 | Cabrera | ................ | G06Q 40/123 |
| 2003/0021477 A1* | 1/2003 | Sommer | ................. | G06K 9/726 382/181 |
| 2003/0179400 A1* | 9/2003 | Kofman | ................ | G06F 21/608 358/1.13 |
| 2005/0073733 A1* | 4/2005 | Kim | .................... | H04N 1/00384 358/528 |
| 2007/0183000 A1 | 8/2007 | Eisen | | |

(Continued)

OTHER PUBLICATIONS

"Bommer, L Gary; Dec. 14, 2009, Accounting Today" (Year: 2009).*

(Continued)

*Primary Examiner* — Shahid Merchant
*Assistant Examiner* — Gregory M James
(74) *Attorney, Agent, or Firm* — DLA Piper LLP (US)

(57) ABSTRACT

A tax return preparation application generates a first interview screen displayed to a subject taxpayer and requests first input of an image or entry of pre-determined data. Intermediate computer storing electronic tax data of multiple taxpayers determines whether electronic tax data provided or derived based on first input includes a first set for certain fields of an electronic tax form. If so, certain fields are automatically populated and a second, larger set of electronic data is identified and imported from data store to populate additional fields. If not, tax return preparation application generates a second interview screen requesting second input. Additional fields are not populated with data imported from data store when second input confirms that electronic tax data does not include the first set, but may import from data store when second input makes modifications or corrections such that electronic tax data includes the first set.

25 Claims, 36 Drawing Sheets

(56) References Cited

U.S. PATENT DOCUMENTS

| | | | |
|---|---|---|---|
| 2008/0147494 A1* | 6/2008 | Larson | G06Q 30/0234 705/14.34 |
| 2008/0319882 A1* | 12/2008 | Wyle | G06F 17/243 705/31 |
| 2010/0182631 A1* | 7/2010 | King | G06F 17/243 358/1.15 |
| 2011/0052062 A1* | 3/2011 | Chiu | G06K 9/00456 382/176 |
| 2011/0258195 A1 | 10/2011 | Welling | |
| 2012/0020532 A1* | 1/2012 | Snow | G06K 9/036 382/112 |
| 2012/0022983 A1 | 1/2012 | Hughes | |
| 2012/0063688 A1* | 3/2012 | Honma | G06K 9/3233 382/218 |
| 2012/0109792 A1* | 5/2012 | Eftekhari | G06F 21/31 705/31 |
| 2012/0211561 A1* | 8/2012 | Lieberman | G06Q 40/123 235/383 |
| 2013/0201307 A1* | 8/2013 | Schloter | H04N 5/23229 348/61 |
| 2014/0056542 A1* | 2/2014 | Negro | G06K 9/228 382/313 |
| 2014/0153830 A1* | 6/2014 | Amtrup | H04N 1/40 382/190 |
| 2014/0241631 A1* | 8/2014 | Huang | G06K 9/00463 382/176 |
| 2014/0244456 A1* | 8/2014 | Huang | G06Q 40/123 705/31 |
| 2014/0324648 A1* | 10/2014 | Mori | G06Q 40/123 705/31 |
| 2015/0170085 A1 | 6/2015 | Amtrup | |
| 2016/0027126 A1* | 1/2016 | Blowers | G06Q 40/123 705/31 |
| 2016/0063645 A1* | 3/2016 | Houseworth | G06Q 50/265 705/31 |
| 2016/0078567 A1* | 3/2016 | Goldman | G06Q 40/123 705/31 |
| 2016/0092994 A1* | 3/2016 | Roebuck | G06Q 40/123 705/31 |
| 2016/0247239 A1 | 8/2016 | Houseworth | |
| 2017/0018035 A1 | 1/2017 | Shakir | |

OTHER PUBLICATIONS

U.S. Appl. No. 15/419,607, filed Jan. 30, 2017.
U.S. Appl. No. 15/419,549, filed Jan. 30, 2017.
U.S. Appl. No. 15/419,607, filed Jan. 30, 2017 (filed Nov. 6, 2019-present).
U.S. Appl. No. 15/419,549, filed Jan. 30, 2017 (filed Nov. 6, 2019-present).
U.S. Appl. No. 15/419,607, filed Jan. 30, 2017 (filed Apr. 27, 2020-present).
U.S. Appl. No. 15/419,549, filed Jan. 30, 2017 (filed Apr. 27, 2020-present).
U.S. Appl. No. 15/419,607, filed Jan. 30, 2017 (filed Dec. 22, 2021-present).
U.S. Appl. No. 15/419,549, filed Jan. 30, 2017 (filed Dec. 22, 2021-present).
U.S. Appl. No. 15/419,549, filed Jan. 30, 2017 (Jul. 5, 2021—present).

* cited by examiner

COMPUTER-IMPLEMENTED METHODS SYSTEMS AND ARTICLES OF MANUFACTURE FOR ADDRESSING OPTICAL CHARACTER RECOGNITION TRIGGERED IMPORT ERRORS DURING PREPARATION OF ELECTRONIC TAX RETURN

CROSS REFERENCE TO RELATED APPLICATIONS

The present application is related to U.S. patent application Ser. No. 15/419,549, filed Jan. 30, 2017, entitled "COMPUTER-IMPLEMENETED METHODS SYSTEMS AND ARTICLES OF MANUFACTURE FOR IMAGE-INITIATED PREPARATION OF ELECTRONIC TAX RETURN," and U.S. patent application Ser. No. 15/419,607, filed Jan. 30, 2017, entitled "COMPUTER-IMPLEMENTED METHODS SYSTEMS AND ARTICLES OF MANUFACTURE FOR VALIDATING ELECTRONIC TAX RETURN DATA". The contents of the aforementioned patent applications are hereby expressly incorporated by references in their entireties for all purposes.

SUMMARY

Embodiments are related to image processing, utilizing results of image processing to prepare an electronic tax return, addressing shortcomings of or image processing errors during preparation of an electronic tax return, and validation of electronic tax return data including validation of image processing results and identification and resolution of detected errors and discrepancies. Embodiments improve, for example, computerized tax return preparation applications, image processing based preparation of electronic tax returns, electronic tax returns prepared thereby, user interfaces and user experiences during preparation of electronic tax returns, mobile communication device applications, networked computing systems, rule-based computing systems, and computerized error detection systems. Embodiments are also related to automatically preparing electronic tax return, e.g., in response to a preparer's touch of a finger upon a touchscreen of a mobile communication device to begin and/or complete an electronic tax return by starting with acquisition of tax document images, thus improving computerized tax return preparation applications, reducing user interactions with computerized tax return preparation application interview screens and processing of same, and resulting in more efficient use of computing resources to prepare and complete an electronic tax return. Embodiments also improve the manner in which computerized tax return preparation applications identify errors, discrepancies and life events based on specific rules, thus eliminating or reducing various user interactions with the tax return preparation application including navigation and searches involving other tax topics, and processing of user interactions when processing errors, thus providing for more efficient and accurate preparation of electronic tax returns and processing of image processing.

Embodiments also provide for reducing image processing required to prepare an electronic tax return thus improving the functioning of computerized tax return preparation applications and computing devices executing same.

Embodiments are also related to computerized tax return preparation applications and computing systems that operate based on special purpose rules including rules for imaging processing triggered electronic import and electronic tax return data validation.

Certain embodiments involve fallback or confirmation methods executed by computerized tax return preparation applications when pre-determined criteria that trigger automatic import of electronic tax return data has not been satisfied. Certain embodiments involve fallback or correction/confirmation methods executed by computerized tax return preparation applications when pre-determined criteria for optical character recognition triggered import of electronic tax return data from a data store has not been satisfied. Embodiments also involve fallback or confirmation methods executed by computerized tax return preparation applications when pre-determined criteria for import of electronic tax return data triggered by entry of a pre-determined combination of certain types of electronic tax return data has not been satisfied.

Certain embodiments involve computerized tax return preparation applications that automatically prepare or complete an electronic tax return even when pre-determined criteria or rules for automatic import has not been satisfied.

Certain embodiments transform user experiences, computer generated user interfaces and interactions with interview screens generated by a computerized tax return preparation application during preparation of an electronic tax return. Embodiments also transform how data is entered into an electronic tax return and processed by providing for entry of both optical character recognition and optical character recognition triggered electronic import of electronic tax data.

Certain embodiments involve hybrid population and fallback or confirmation procedures to reduce or eliminate the amount of data that is manually entered during preparation of electronic tax returns which, in turn, reduces user interactions with a computing device and computerized tax return preparation application which, in turn, improves how tax return preparation applications execute and how a computing device executing same operates by reducing the need for computing resources such as processor, memory and communications or network resources.

Certain embodiments involve determining when a hybrid population of an electronic tax form or portion thereof may be executed, which may include population of fields with both electronic data resulting from optical character recognition or image processing and importing of electronic tax return data from a data store that includes data of multiple tax payers and/or population of fields with both electronic data that was manually entered and importing of electronic tax return data from a data store that includes data of multiple tax payers.

Certain embodiments involve preparing an electronic tax return or portion by hybrid population including a first data entry method and a different second data entry method in the form of electronic import of electronic tax return data from a data store. Embodiments may be utilized to prepare an electronic tax form or even complete an electronic tax return by use of embodiments, which may eliminate the need for manual entry of data by a user.

Certain embodiments also transform user experiences during preparation of an electronic tax return from entering tax data to viewing and confirming or correcting tax data resulting from a combination of optical character recognition and electronic import. Embodiments also transform user experiences by modifying a data entry methods during preparation of an electronic tax return, e.g., from image processing to another method, or from image processing triggered electronic import to another method.

Certain embodiments also provide for new life event detection during preparation of an electronic tax return and transforming how tax topics are identified. With embodiments, the "fallback" method can be used to confirm that automatic import from the data store should not be executed, or to have the preparer correct or provide additional data to satisfy the pre-determined criteria such that automatic import from the data store can be executed.

Certain embodiments involve processing summarized above except rather than determining electronic tax data from image processing, a user manually enters data into certain fields of a particular tax form or interview screen, followed by execution of specific rules concerning when electronic data can be imported.

Embodiments also transform how an electronic tax return is prepared by providing a computerized tax return preparation application that is configured to begin preparation of an electronic tax form by "starting with documents" or "starting with images" of multiple electronic tax forms. Embodiments are in contrast to known tax return preparation applications that are programmed according to a pre-determined sequence or structure to step the user through a pre-determined sequence of questions or interview screens to enter data into respective fields. With embodiments, a preparer can "start with documents" by imaging multiple documents, e.g., in an uninterrupted sequence, moving from one tax document to another until imaging is completed, to begin and/or complete an electronic tax return. Image processing results are used to populate electronic tax forms or trigger electronic import to populate electronic tax forms. Embodiments reduce the amount of user interaction and associated computing resources required to prepare and/or complete an electronic tax return by processing images of multiple tax documents and automatically populating electronic tax forms by electronic import rather than relying upon imaging processing results. For example, only a portion of an image may be processed (rather than an entire image) and is used to determine whether to electronically import other data into the electronic tax return.

Embodiments also transform user experiences during preparation of an electronic tax return from manually entering tax data according to the pre-determined structure of known computerized tax return preparation applications to viewing, confirming or correcting tax data resulting from image processing or other data entry methods triggered by image processing.

One embodiment is for a computer-implemented method in which preparation of an electronic tax return starts with imaging tax documents, e.g., by use of a camera of a mobile communication device. Image processing results are utilized to populate electronic forms and can complete an electronic tax return such that a preparer is not required to manually enter tax return data and instead confirms or corrects entered data. In one embodiment, a computer-implemented method is executed by an intermediate computer that is in communication with a preparer computing device executing a browser through a first network and an electronic source of tax data through a second network. The intermediate computer executes computer code or instructions of a tax return preparation application to generate a first interview screen. The first interview screen is presented to a preparer through a display of the preparer computing device and instructs the preparer to begin preparation of an electronic tax return by acquiring a first image of a first tax document. In response to the first interview screen, the intermediate computer receives a first image of a first tax document from the preparer computing device. The intermediate computer, by the tax return preparation application, then generates at least one additional interview screen that is presented to the preparer through the display and instructing the preparer to acquire at least one additional image of at least one additional tax document. The intermediate computer receives one or more additional images in response to these one or more interview screens. Respective images are processed to transform respective images into respective electronic tax data, and a plurality of electronic tax forms is populated with respective electronic tax data. Thus, rather than beginning with a traditional pre-determined interview screen experience, the preparer can begin preparation of the electronic tax return by imaging multiple tax documents sequentially in response to each interview screen, or an interview screen may instruct the preparer to acquire images of all available tax documents in an uninterrupted manner and then confirm through the interview screen that imaging is completed. Embodiments can be executed to partially prepare and complete the electronic tax return by starting with documents or starting with document imaging.

Other embodiments involve other specific rules for backend validation of data that has been entered into the electronic tax return, or that is presented for entry into the electronic tax return. Embodiments identify errors and facilitate processing of errors with more efficient use of computing resources by at least eliminating presentation of interview screens, user interaction with same, and other user interactions, navigation, searches and corrections in order to rectify discrepancies of data across different electronic sources and data errors, including errors resulting from image processing or other data entry methods. Certain embodiments are related to backend validation of optical character recognition results relative both a prior year electronic tax return and current year payroll data received or accessed from a payroll service provider.

In certain embodiments, rule-based backend validation embodiments may involve a combination of analyses involving two or more of OCR results—prior year electronic tax return; OCR results—current year payroll data; prior year electronic tax return and current year payroll data. Embodiments are also operable to identify life events and potential electronic tax return or OCR errors, e.g., based on identifying inconsistencies or discrepancies between electronic data of different sources of electronic tax data that are the subject of the specific validation rules. For example, a life event in the form of the taxpayer switching jobs may be identified, and the tax return preparation experience modified to address this possible life event.

One embodiment involves a computer-implemented method executed by an intermediate computer that is in communication through respective networks with a computing device of a preparer or subject taxpayer and an electronic payroll data source. The computer-implemented method includes the intermediate computer, by a tax return preparation application, accessing or receiving respective current year electronic payroll data of a plurality of employees including the subject taxpayer and an image of a current year electronic tax document generated by an image acquisition component such as a camera of the computing device. The intermediate computer, by the tax return preparation application, processes at least a portion of the image to transform the image into current year electronic tax data. The intermediate computer accesses (e.g., from a local data store) or receives (e.g., from the preparer's computing device) a prior year electronic tax return of the subject taxpayer and determines based on specific rules whether to validate the current year electronic tax data derived from the image for entry into the current year electronic tax return. Electronic import rules are based at least in part upon certain current year electronic tax return data derived from the image, the data of the prior year electronic tax return and data of the current year electronic payroll data. At least a portion of an electronic tax form of the current year electronic tax return can be automatically populated with validated current year electronic tax data, and when current year electronic tax data has not been validated, the intermediate computer, by the current year tax return preparation application, can execute a pre-determined action concerning the current year electronic tax data, which may involve generation of another interview screen to confirm or correct data or to present another interview screen or tax topic or question regarding a life event or numerical error detected based on an inconsistency of data resulting from image processing, the current year payroll data and prior year electronic tax return data.

Additional embodiments may involve one or more computer-implemented method embodiments above, or combinations of multiple embodiments. For example, other embodiments may involve a combination of image-based initiation of preparing an electronic tax return and a fallback mechanism when an initial attempt at hybrid population triggered by image processing is not successful, a combination of image-based initiation of preparing an electronic tax return and rule-based backend validation of electronic tax data utilizing prior year tax return and current year payroll data from different electronic sources, a combination of image-based initiation of preparing an electronic tax return and life event detection and further user experience transformation based on the detected life event or anomaly (e.g., between a prior year electronic tax return and current year payroll data), and various other combinations.

Additional embodiments involve networked, computerized systems or specific components thereof, and may include one or more or all of an intermediate computer that is in communication with a preparer device such as a mobile communication device or tablet computing device and sources of electronic tax data through respective networks. Such networked computing systems may be utilized to execute computer-implemented method embodiments above, or combinations thereof.

Further embodiments are for computer program products or articles of manufacture comprising a non-transitory computer readable medium embodying instructions executable by a computer to execute a fallback process and specific electronic data importation rules process for design time and/or runtime computer software product management.

Yet additional embodiments are related to computer-generated user interfaces or interview screens tax return preparation application, and how presentation of interfaces or interview screens can be modified to transform user experiences during preparation of electronic tax returns.

In a single or multiple embodiments involving a fallback when an initial attempt at image processing triggered electronic import has failed, specific electronic data importation rules specify that the intermediate computer request the subject taxpayer to manually enter electronic tax return data when preparer or second input confirms that the electronic tax data do not include the first pre-determined set of electronic tax data that is needed to trigger electronic import. Thus, when tax document imaging and subsequent fallback do not allow for importation from the data store, the tax return preparation application then executes in a default mode of manual entry by the preparer.

Further, in a single or multiple embodiments, the preparer or second input that corrects or changes the electronic tax data may be one or more of the preparer manually entering data into the electronic tax form that was not recognized by processing at least the portion of the image and manually correcting data resulting from an error the electronic tax data resulting from processing at least the portion of the image. When the corrected or changed electronic tax data includes the first set of electronic tax data for the plurality of pre-determined fields, then the data importation rules specify that the pre-determined fields of the electronic tax form are automatically populated with respective electronic tax data of the first set determined by image transformation, and the second, larger set of electronic tax return data is automatically imported from the data store to populate additional fields of the electronic tax form.

In a single or multiple embodiments, an electronic tax form or the entire electronic tax return can be completed based at least in part upon population of fields with electronic data determined from image processing and electronic tax data automatically imported from the data store after the taxpayer's input corrects electronic tax data so that the data of the subset of fields is correct.

In a single or multiple embodiments, an electronic tax form or the entire electronic tax return can be completed based at least in part upon population of fields with electronic data determined from image processing and electronic tax data automatically imported from the data store based on the image processing results including data for the subset of fields. Thus, in certain embodiments, no manual entry may be needed in order to complete an electronic tax form or an entire electronic tax return depending on the tax documents required.

In a single or multiple embodiments, in the event that the combination of population of fields with electronic tax data determined from image processing and electronic tax data imported from the data store or provided based on a fallback procedure does not complete an electronic tax return or form thereof, the intermediate computer requests the subject taxpayer to enter other electronic tax form data to complete the electronic tax form or import such data from another source.

In a single or multiple embodiments, the intermediate computer is in communication the preparers or subject taxpayer's computing device in the form of a mobile communication device, and the image is acquired with the image acquisition component such as a camera of the mobile communication device.

In a single or multiple embodiments, image processing may involve processing the entire image, e.g., OCR on the entire image and determining whether the subset of fields are populated with data that match that of the data store, or only processing a portion of the image, e.g., OCR on only the certain fields, or other fields can be masked, thus reducing the amount of image processing and computing resources utilized. Further, in these embodiments, when the electronic tax data of the certain fields does not match electronic tax data of the data store, the correction request communicated to the taxpayer may include displaying only those certain fields thus reducing display and processing requirements. Thus, with embodiments only a portion of an image can be processed while data for other parts of an electronic tax form can be imported from another source. In this manner, the second, larger set of fields are can be populated without having to perform image processing on corresponding sections of the subject taxpayer's document or ignoring and not having to process these image sections if the entire tax document was previously imaged.

In a single or multiple embodiments, when electronic tax data determined from image processing does not include the first set of electronic tax data for the plurality of pre-determined fields, the second input requested by the intermediate computer may request the subject taxpayer to reactivate the image acquisition component and acquire another image of the tax document, or to do so after repositioning the tax document. The second or additional image is then processed to determine whether the resulting second electronic tax data includes the first set of electronic tax data for the plurality of pre-determined fields, and the specific data importation rules are executed.

In a single or multiple embodiments, the intermediate computer receives electronic tax data of the plurality of taxpayers from respective electronic data sources comprising respective computers of respective payroll processors and stores electronic tax data of a plurality of taxpayers or employees. In one embodiment, during preparation of an electronic tax return by a subject taxpayer, the intermediate computer determines whether the electronic tax data of the subject taxpayer includes electronic tax data of a first set of at least three pre-determined fields of the electronic tax form and determines whether this set of electronic tax data for at least three pre-determined fields is included in the data store. The at least three pre-determined fields may be selected to provide a high level of confidence of uniquely identifying the subject taxpayer, e.g., for Form W-2, whether the electronic tax data includes Social Security Number (SSN), Employer Identification Number (EIN), and Box 1 (Wages, tips, other compensation). The pre-determined fields may also be selected based on location-based criteria or where they appear within a tax form, which may vary for different tax forms of different sources such as employers and financial institutions. For example, the three-pre-determined fields may include adjacent or contiguous pre-determined fields of the electronic tax form. In certain embodiments, only the sections of the tax document image corresponding to the pre-determined fields are processed, which can reduce the amount of image processing and computing resources required. The structure of electronic tax documents may vary by employer or other source and that data can be used to identify a structure of the tax document and pre-determined fields therein.

Embodiments may involve acquisition of an image of a first document, first document image processing and population, followed by acquisition of a second image of a second document, second image processing and population, and so on utilizing the electronic data importation rules. In another embodiment, images may be sequentially acquired up front and then processed accordingly, i.e., a taxpayer may "start with the documents" and acquire images of the documents to begin preparation of an electronic tax return, and can complete an electronic tax form or the electronic tax return itself by acquiring tax document images, and this may be done without any manual data entry.

In a single or multiple embodiments, images that are processed by the tax return preparation application or intermediate computer are acquired by and received from a preparer computing device in the form of a mobile communication device. Images can be acquired in an uninterrupted manner or in response to interview screens requesting that at an image be acquired and tax document imaging can be done before any manual entry of tax return data. For example, an interview screen may be generated after the preparer logs into an account that the preparer has with the tax return preparation application or host of the intermediate computer followed by tax document imaging before the preparer manually enters any tax return data via the preparer computing device for the electronic tax return. In this manner, personal identification and other data of the taxpayer can be first determined by intermediate computer based on the first electronic tax data determined from processing the first image without entry by the preparer of the personal identification data and utilized for other electronic tax forms as appropriate. Thus, embodiments can be used to reduce or minimize manual data entry and computing resources required to process manual data entry.

In a single or multiple embodiments, results of tax document image processing can be used to automatically prepare electronic tax forms, partially or completely, or an entire electronic tax return, which can then be electronically filed. Thus, an electronic tax return can be automatically completed without the preparer manually entering or electronically importing any electronic tax return data or only requiring input in the form of confirmation and any corrections as necessary rather than forcing preparers to step through a sequence of interview screens to type in data.

In a single or multiple embodiments, while images are being uploaded, received and processed, the intermediate computer can process images in the background or simultaneously while a next interview screen is presented to a user, thus providing for more efficient interaction and tax return preparation. After images are received, the intermediate computer may receive preparer input indicating that no other tax document is to be imaged and then a data entry interview screen can be presented to the preparer through a display to allow the preparer to manually enter tax return data or initiate electronic import as needed. This may be done to allow a user to correct image processing results (e.g., by manual entry) or to provide additional data to complete the electronic tax return.

In a single or multiple embodiments including those in which tax document imaging begins the tax return preparation process, the tax return preparation application may instruct the preparer to begin imaging a particular document, such as a wage and tax statement or Form-W2, and data thereof may be used to at least partially populate other electronic tax forms. Tax document imaging may also be used to identify a new electronic tax document or tax topic that was not in a prior year electronic tax return and generating interview screens regarding the new electronic tax document or tax topic that are presented to a user, e.g., which may indicate a life event based at least in part upon prior year electronic tax return data and imaging processing results. For example, a life event of a move, a property sale, change of employment or change of family or marital status may be identified based at least in part upon analysis of prior year electronic tax return data and results of processing one or more tax document images. These determinations and different interview screens and tax topics presented transform the interview experience by not only identifying and addressing new topics associated with life events but also transforming an interview experience by, for example, changing from a standard deduction interview process to an itemized deduction interview process based at least in part upon electronic tax data determined from tax document image processing (e.g., upon determining that imaged documents indicate that the taxpayer purchased a house), while also Identifying questions or topics that can be eliminated from the interview process based at least in part upon electronic tax data determined from image processing, thus providing for more efficient return preparation application and use of computing resources.

In a single or multiple embodiments, involving image processing results, current year payroll data and prior year electronic tax return data, the intermediate computer may be in communication through respective networks with respective electronic sources or computers to access or receive respective current year electronic payroll data of respective employees from respective electronic payroll data sources and store that data to a data store. Current year payroll data for a particular employee may be received from one or multiple data sources (e.g., if the taxpayer changed jobs during the year and different payroll service providers managed payroll for different employers). Current year payroll data may be stored by the intermediate computer before the intermediate computer receives the image or in response to the intermediate computer receiving or processing the image.

In a single or multiple embodiments, when the intermediate computer does not have access to or has not previously stored a prior year electronic tax return, the prior year electronic tax return for a particular taxpayer may be requested via an interview screen after the intermediate computer receives or processes a tax document image for the taxpayer.

In a single or multiple embodiments, the intermediate computer, by the current year tax return preparation application, executes specific rules to validate current year electronic tax data for entry into the current year electronic tax return when the prior year tax return application and the current year payroll data both include the same current year electronic tax data, or when the prior year tax return includes data that matches pre-determined current year electronic tax data and pre-determined current year electronic tax data. The rules may specify that current year electronic tax data is not to be validated when the prior year tax return does not include data matching pre-determined current year electronic tax data and the current year payroll data does not include data matching the pre-determined current year electronic tax data, in which case the preparer can be alerted regarding data that was entered (e.g., as part of a pre-determined interview sequence) or in embodiments in which return preparation begins with tax document imaging, the preparer can be alerted and corresponding electronic tax forms are not automatically populated. The intermediate computer may determine whether to populate sections of the electronic tax return based on preparer input in response to the alert or generated interview screen. For example, an alert may be generated when a user has imaged a Form W-2 to begin preparation of an electronic tax return, but no electronic source includes current payroll data for that taxpayer or Form W-2 resulting in an alert, but the taxpayer confirms that data for entry.

In a single or multiple embodiments, rules may be executed to validate electronic tax data entered during navigation of or interaction with a pre-determined interview screen of a pre-determined sequence of interview screens of an in-line electronic tax return preparation experience or based on electronic tax data determined from image processing and in response to processing a final image of a plurality of images to begin preparation of the current year electronic tax return in which case electronic tax data resulting from image processing may be use to automatically populate one or more electronic tax forms or automatically complete an electronic tax return.

In a single or multiple embodiments, the intermediate computer may utilize backend validation based on prior year electronic tax return data and current year payroll data to identify a life event or new tax topic based at least in part upon the discrepancy between the current year payroll data and the prior year electronic tax return data, and in response, generate an interview screen regarding the life event or new tax topic that is presented to the taxpayer.

Embodiments and combinations thereof provide various technological improvements and improve the functioning of computing devices including an intermediate or host computer and a preparer's computing device. For example, embodiments provide for a hybrid preparation method that incorporates initial data entry of a small subset of data, which may be the result of image processing (and which may be prone to error or less reliable), followed by importation of larger amounts of data in a more reliable manner or in a manner that is more reliable than image processing such as optical character recognition, for example, thus improving populating of electronic tax forms and returns and reducing data population errors, thus reducing or eliminating the need for additional computing resources that would otherwise be required to make corrections, e.g., as part of an error check. As another example, image-initiated and image-based preparation of electronic tax returns provides for electronic tax return preparation while reducing the number of interview screens that are generated and presented to the preparer, reducing the amount of user interaction with the browser, inputs (e.g., via keyboard, touchscreen, mouse or other input device) and processing of same, and providing for more efficient electronic tax return preparation, thus improving electronic tax return preparation programs and computing devices executing same by requiring reduced computing resources such as processor and memory resource and network and communication resources (in embodiments involving online tax return preparation applications). As yet another example, embodiments utilize a specific networked computing system that operates according to specific rules to provide for a more accurate, comprehensive and intelligent tax return preparation application method and system and reducing errors and subsequent error checks and processing.

BRIEF DESCRIPTION OF THE DRAWINGS

FIGS. 6A-E are side-by-side views of how a computerized tax return preparation application executing on or accessed by a mobile communication device can be used to acquire tax document images and process same;

FIG. 7 illustrates an example of a wage and tax statement and one embodiment involving certain tax document fields that are utilized for hybrid population and fallback mechanism determinations;

DETAILED DESCRIPTION OF ILLUSTRATED EMBODIMENTS

Figure 1:
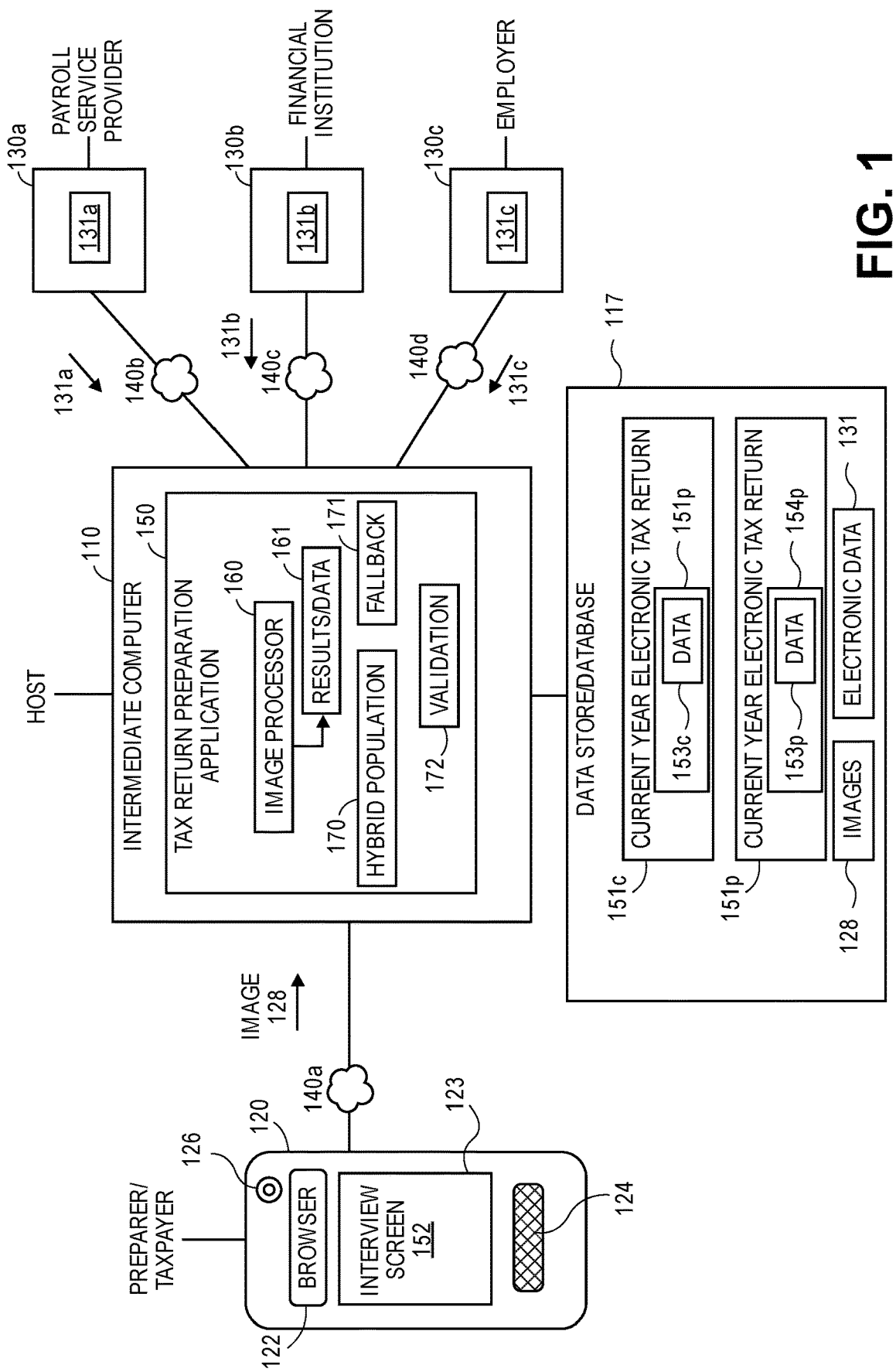
FIG. 1 is a block diagram of a computing system constructed according to one embodiment and configured to provide a fallback mechanism in response to failure of image processing triggered electronic import, beginning preparation of electronic tax returns with tax document imaging, and validation of electronic tax return data.

Embodiments are related to improving computerized tax return preparation applications, electronic tax returns and preparation thereof, image processing and electronic import during preparation of electronic tax returns, networked computing systems, electronic data validation systems, rule-based computing systems, and computerized error detection and resolution systems. Embodiments also address shortcomings of image processing such as optical character recognition (OCR) using specific rules and data structures for OCR-triggered electronic import and failure thereof, which also reduces errors and computing resources required to process same. Embodiments also provide for specific rule-based electronic tax return validation to ensure correct data, which also reduces errors and computing resources required to process same. Embodiments also provide for new life event detection methods or identification of other tax topics to be addressed, which also provides for more efficient user of computing resources since these topics are identified and presented rather than arriving at the same determination as a result of additional questions and interactions with the tax return preparation application. Embodiments also involve how electronic tax return preparation is initiated by and can be prepared by imaging of tax documents or starting with documents first (rather than entering data into interview screens first), which also provides for improvements to computing devices that execute and/or host tax return preparation applications by providing for more efficient use of computing resources to prepare and/or complete electronic tax returns. Certain embodiments provide for technological and computing system improvements by providing new capabilities that may be executed individually or in combination including a "fallback" for when OCR-triggered import from an electronic data source initially fails based on image processing results, image-initiated preparation of electronic tax returns, and validation of image processing results.

For example, when initial criteria for using OCR or other image processing has not been satisfied such that electronic import is not currently available as an automatic data entry method, embodiments provide for a "fallback" so that electronic import may still be an option, and if not, modifies the data entry method to ensure that the data is corrected and accurate. As another example, rather than navigate a series of interview screens of a pre-determined structure or sequence as is the case in known tax return preparation applications structured according to pre-determined interview screen sequences, embodiments provide for a different method of "starting with documents" or "starting with imaging" which provides for ad hoc processing of tax documents by, for example, imaging multiple documents sequentially such that the tax return preparation application can proceed with next steps or entry of data during or after image processing and reducing manual entry of data by a user or preparer. In this manner, embodiments also reduce user interactions and interview screens required in order to complete a tax topics or electronic tax form thus resulting in more efficient use of computing resources involved in preparation of an electronic tax return, while further reducing user interactions and interview screens by validating or confirming data resulting from image processing and that is to be used to populate electronic tax forms using a distributed cross-check using different sources of different types of data for different tax years.

Embodiments provide new capabilities that address various technical challenges associated with known tax return preparation applications and preparation of an electronic tax return including, for example, provide new capabilities that address technical challenges involved in using a mobile communication device to acquire and/or enter data and prepare an electronic tax return, provide new capabilities that address technical challenges for automatically populating electronic tax returns, and provide new capabilities that address technical challenges inherent in known computerized tax return preparation applications that are based on a programmed, pre-determined structure. Embodiments also provide new capabilities that address technical challenges and limitations of optical character recognition (OCR), which may be inaccurate or fail to correctly identify imaged data for various reasons (such as the OCR algorithm itself or various imaging or environmental variables) by utilizing OCR on a limited or initial basis or as a trigger to identify data from other electronic sources to utilize to populate sections of an electronic tax return rather than use less reliable OCR results for that other data.

Embodiments and combinations thereof are described in further detail with reference to FIGS. 1-17.

Referring to FIG. 1, a networked computing system 100 constructed according to one embodiment includes an intermediate computer 110 that is in communication through respective networks 140a-d with a computing device 120 of a user, preparer or taxpayer (generally, preparer) and respective computers 130a-c or electronic sources (generally, electronic source 130) of respective electronic data 131a-c (generally, electronic data 131) that may be included in a current year electronic tax return 151c ("c" referring to "current" year) that is being prepared or to determine data for the current year electronic tax return 151c. As described below, embodiments may involve the preparer interacting with interview screens 152 generated by a computerized tax return preparation application 150 to prepare at least a portion of the current year electronic tax return 151c.

In certain embodiments, the preparer's computing device 120 is a mobile communication device such as a smartphone or a portable computing device such as a tablet computing device. The computing device 120 executes a browser 122 or other program to access the Internet or network resource and includes an input element 124 such as a touchscreen, keyboard or mouse 124. The type of input element 124 will vary depending on the size and configuration of the computing device 120. The input element 124 is manipulated by the preparer to access an on-line resource such as the tax return preparation application 150. One example of a computerized tax return preparation application 150 that may be configured to execute or include embodiments is TURBOTAX tax return preparation application available from Intuit Inc. TURBOTAX is a registered trademark of Intuit Inc., Mountain View, Calif. Depending on the system configuration utilized, the tax return preparation application 150 may be a desktop or locally executing tax return preparation application 150 or an on-line tax return preparation application 150 hosted by the intermediate computer 110 as shown in FIG. 1.

The electronic source 130 of electronic data 131 may be a computer hosting current year payroll data or a payroll service provider, a financial institution or an employer of the taxpayer. For example, in certain embodiments, electronic data 131a hosted by an electronic source computer 130a is current year electronic payroll data. Current year electronic payroll data is generated or hosted by a computer 130c of the preparer's employer and/or by a computer 130a of a payroll processing service that is in communication with an employer computer 130c. Thus, while FIG. 1 illustrates a payroll service provider computer 130a, it will be understood that the payroll service provider computer 130a may be in communication with various computers 130c of employers that utilize the payroll services and is also in communication with the intermediate computer 110. One example of an electronic source 130a that includes electronic data 131a in the form of current year payroll data is a payroll processing service such as ADP, LLC, Roseland, N.J. The electronic source 130b may also be a computer of a financial institution, e.g., which provides forms or electronic transaction data 131b associated with a taxpayer's checking, credit card or brokerage accounts. For ease of explanation, reference is made to a host intermediate computer 110, a taxpayer's computing device 120 (and examples involving a mobile communication device), electronic sources 130 of electronic tax data 131 such as current year payroll data, and a tax return preparation application 150 including computer code or software instructions that are executed to prepare a current year electronic tax return 151c.

In the computing system illustrated in FIG. 1, the tax return preparation application 150 includes or utilizes an image processor or image processing system 160, such as an Optical Character Recognition (OCR) system. The image processing system 160 transforms images 128 of tax documents 129 acquired by a camera or image acquisition component 126 (generally, camera 126) of the computing device 120 into corresponding electronic tax data 161. The tax return preparation application 150 also includes or utilizes special purpose or specially configured systems including a rule-based hybrid population system or element 170, a rule-based fallback system or element 171 that is utilized with the hybrid population system or element 170, an image-based preparation initiation system 172 and a rule-based tax data validation system or element 173. Embodiments may utilize one or more or all of the special purpose or specially configured systems as described in further detail with reference to FIGS. 2-16.

The tax return preparation application 150 generates interactive interview screens 152 that are presented to the taxpayer via a display 123 of the computing device 120 for preparation of a current year electronic tax return 151c. The current year electronic tax return 151c includes current year electronic data 153c and may be stored in a data store 117 of the intermediate computer or accessible by the intermediate computer 110. The interview screens 152 present instructions, information or questions about various tax topics and fields to be populated with tax return data 153c to prepare the electronic tax return 151c or electronic tax form 154c thereof. The data store 117 may also include electronic tax returns 151p including prior year electronic data 153p for various taxpayers ("p" referring to prior year) including the subject taxpayer or preparer. Embodiments may involve presentation of a pre-determined sequence of interview screens 152 or involve an interview screen 152 sequence that is not pre-determined and that is determined on the fly, e.g., based on tax document images 128 received from the preparer's mobile communication device 120 or based on discrepancies identified by the tax return preparation application 150, by the rule-based validation system, between tax return data and payroll data, e.g., between current year tax return data 153c and current year payroll data 131a, or between prior year tax return data 153p and current year payroll data 131a.

Embodiments may also be implemented using other networked computing system configurations besides the configuration shown in FIG. 1. For example, rather than the tax return preparation application 150 being an on-line tax return preparation application 150 that is accessible via a browser 122 executed by the computing device 120, embodiments may involve a tax return preparation application 150 that executes locally on the computing device 120 and that is in network communication with the intermediate computer 110. Further, in another embodiment, the data store 114 including electronic data 131, for example, is hosted by the intermediate computer 150. In another embodiment, a second intermediate computer is in communication with the intermediate computer 110 hosting the tax return preparation application 150 and is in communication with electronic sources 130. A second intermediate computer may be a dedicated computer used to aggregate electronic data 131 from respective sources or to host the rule-based validation system for backend validation. Accordingly, while one networked computing system 100 is shown in FIG. 1, it will be understood that embodiments may be implemented using various networked computing system configurations while still addressing various technical shortcomings of prior art tax return preparation applications and image processing.

Figure 2:
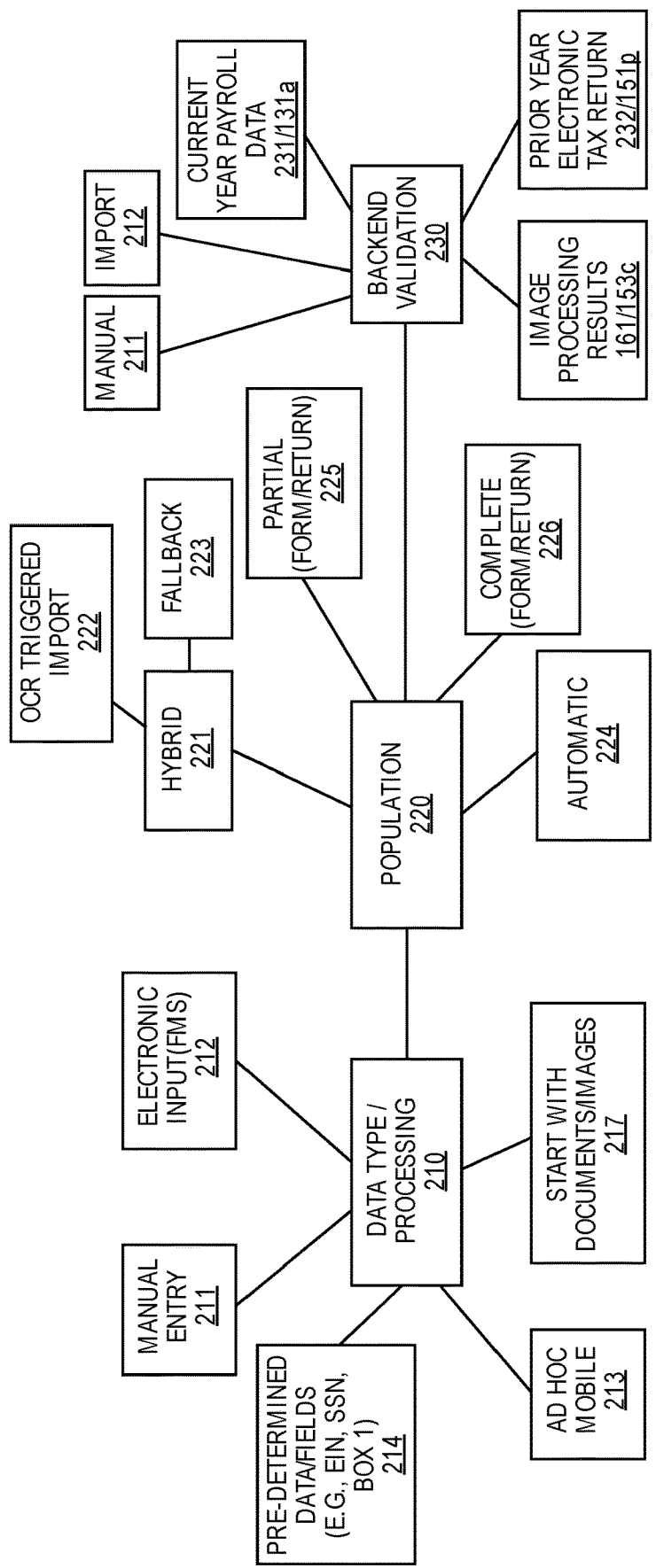
FIG. 2 is a flow diagram further illustrating how the computing system shown in FIG. 1 may be used for end-to-end tax return preparation tasks of data sources and processing of data, population and electronic tax return data validation.

Referring to FIG. 2, a system flow diagram generally illustrates how one or more embodiments may be incorporated into or utilized by a tax return preparation application 150 that is operable to prepare an electronic tax return 151c based on different types or combinations of data, rule-based electronic tax form or tax return population 220 and rule-based electronic tax return data validation 230. Depending on the embodiments are employed, individually or in combination, preparation of an electronic tax return 151c may involve receiving different types and processing of data 210, different ways in which an preparation of an electronic tax return 151c can be initiated, how electronic tax return data 153c is identified, selected and validated before the completed tax return 151c is submitted to a tax authority. Embodiments may involve starting and/or completing an electronic tax return 151c by processing images 128 of tax documents 129, a fallback for when an initial attempt at hybrid entry, such as OCR-triggered import of electronic tax return data 153c, has failed, backend validation of electronic tax return data 153c based at least in part upon payroll data of the taxpayer individually, or a combination of two, three and other embodiments, as generally reflected in FIG. 2.

For example, embodiments may involve a computerized tax return preparation application 150 configured to instruct a user through an interview screen 152 to begin preparation of an electronic tax return 151c by tax document imaging 128/215. The electronic tax return 151c is started, e.g., in response to an instruction presented through an interview screen 152, by tax document imaging 215 rather than other data entry methods such as manual data entry 211 or electronic import 212 (e.g., from a computerized financial management system, account or other computing resource). Thus, electronic tax return 151c preparation begins with the camera 126 of the mobile communication device 120 and acquiring images 128 (or uses a frame of a video) of one or more tax documents 129. The preparer may, for example, acquire an image 128 of a first tax document 129a, move the mobile communication device 120 to acquire an image 128 of a second tax document 129b, move the mobile communication device 120 to acquire an image 128 of a third tax document 129c and so on for the tax documents 129 available to the taxpayer. Thus, the user "starts with imaging" or "starts with documents" rather than starting with manually typing in data into a field of an electronic tax form or interview screen. The acquired images 128 are processed 160/217 and electronic tax return forms 154c are automatically populated 224, which may result in partial completion 225 of the electronic tax return 151c or automatic completion 226 of the electronic tax return 153c. Image processing 217 may involve OCR or other processing provided by embodiments, such as a hybrid population method 221, an example of which is OCR-triggered electronic import 222, which is triggered when certain electronic tax data 214 has been received (e.g., EIN or combinations of specified types of data such as EIN, SSN and Box 1 of Form W-2), and a fallback procedure 223 for when OCR-triggered electronic import 222 rules or requirements are not satisfied or certain electronic tax data 214 has not been received. Processing of multiple images 128 may result in partial preparation 225 of the electronic tax return 151c or, if all tax documents 129 have been imaged 215 and processed 217, preparation of the entire electronic tax return 226. Thus, embodiments provide for a type of ad hoc, mobile communication based data entry 213 method and processing to determine electronic tax data 151c for the electronic tax return 153c to complete or partially complete the electronic tax return 153c, without having to manually type 211 or import 212 any other data, reducing the amount of manual or other data entry, or having a user confirm or correct electronic data 151c. These enhancements not only improve computerized tax return preparation applications 150 and user experiences and interactions with same, but also reduces computing resources and communication resources required to enter data and prepare electronic tax returns 153c.

In the event that image processing 217 does not complete the electronic tax return 153c, e.g., due to empty fields of certain sections, or determining that another electronic tax form 154c is required due to, for example, detection of a life change or life event requiring further input, the preparer can be prompted via an interview screen 152 to enter additional data manually 211 or by another method such as electronic import 212 if a tax document 129 concerning the change or life event is not available to be imaged 215.

Image processing 217, whether for embodiments involving beginning but not completing an electronic tax return 153c by tax document imaging 215, or imaging 215 that is employed at some time during preparation of the electronic tax return 153c, may involve specific rules or criteria that are satisfied for image processing 217 to trigger hybrid population such 221 as OCR triggered electronic import 221 and a fallback mechanism 223 in the event of OCR triggered import 221 failure. For example, OCR triggered import 221 and a fallback mechanism 223 may be used to supplement and/or replace image processing results 161 or overwrite imaging processing results. Further, the data that is entered or received, as a result of manual data entry 211, electronic import 212, OCR-triggered import 222, fallback 223 or resulting from image processing 160, can be validated 230 based at least in part upon specific rules involving current year payroll data 131a/231. Rules involving current year payroll data 131a/231 may be used for validation of manually entered data 211, results of image processing 217 and/or electronic data that is imported 211 or by a hybrid population method 221. Rule-based validation 230 may be triggered to execute after the electronic tax data 153c has been entered or an electronic tax form 154c has been populated, or prior to population and serve as a rule that must be satisfied before the electronic tax return 151c can be populated.

Accordingly, FIG. 2 is provided to generally illustrate that one or more or all embodiments can be incorporated into the electronic tax return 151c preparation process, and various embodiments may involve different preparation aspects depending on how the tax return preparation application 150 is configured. Specific embodiments are described with reference to FIGS. 3-16, but it will be understood that embodiments may be used in different combinations.

Figure 3:
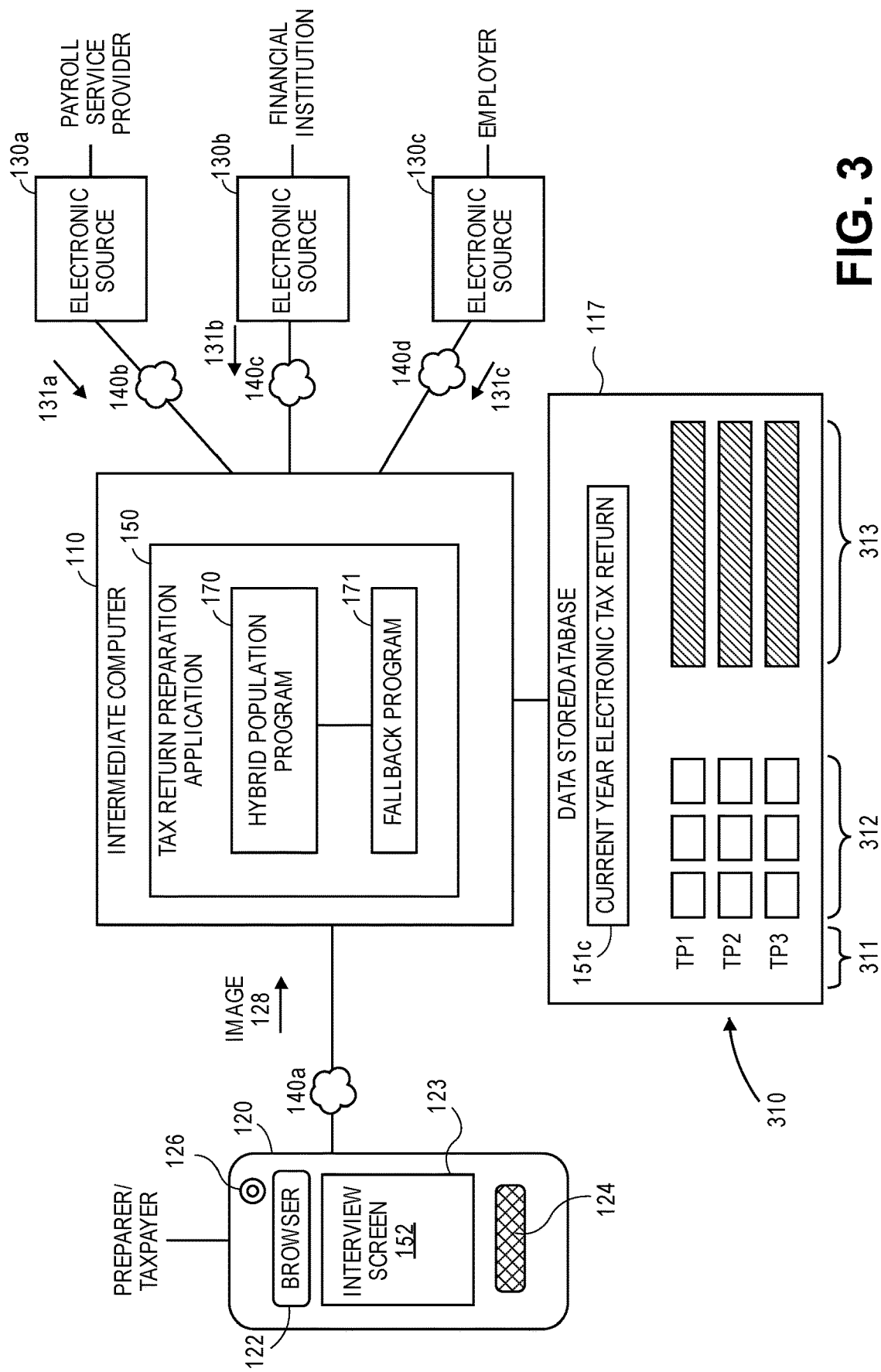
FIG. 3 is a block diagram of a computing system constructed according to one embodiment and further illustrating embodiments involving a fallback mechanism in response to failure of image processing triggered electronic import.

Referring to FIG. 3, in one embodiment, the intermediate computer 110 hosts a hybrid population program 170 and a fallback program 171 and is in communication with respective computers 130a-c or electronic sources, which may be a computer of a payroll service provider, financial institution and/or employer, for example. The intermediate computer 110 includes or accesses the data store 117 that includes electronic data 131/310 for various taxpayers (TP1-TP3) 311 received from the electronic sources 130. Data store 117 may also include prior year electronic tax returns 151p for various taxpayers and may include a prior year electronic tax return 151p for the preparer or subject taxpayer.

The electronic data 310 may include data of certain or pre-determined fields 312, and other or additional data 313 besides the data of certain or pre-determined fields 312. According to one embodiment, the data store or database is structured in a specific way such that the additional data 313 associated with the pre-determined field data 312 is larger or includes more types of data compared to the smaller set of data of pre-determined fields 312. The electronic data 131 received from the electronic sources 130 may include some or all or none of the data for the pre-determined fields 312, and while the intermediate computer 110 aggregates such data for various taxpayers 131, the electronic data 310 may or may not include data for the preparer or subject taxpayer, e.g., it may be the case that the taxpayer's employer did not utilize the payroll service provider.

Figure 4:
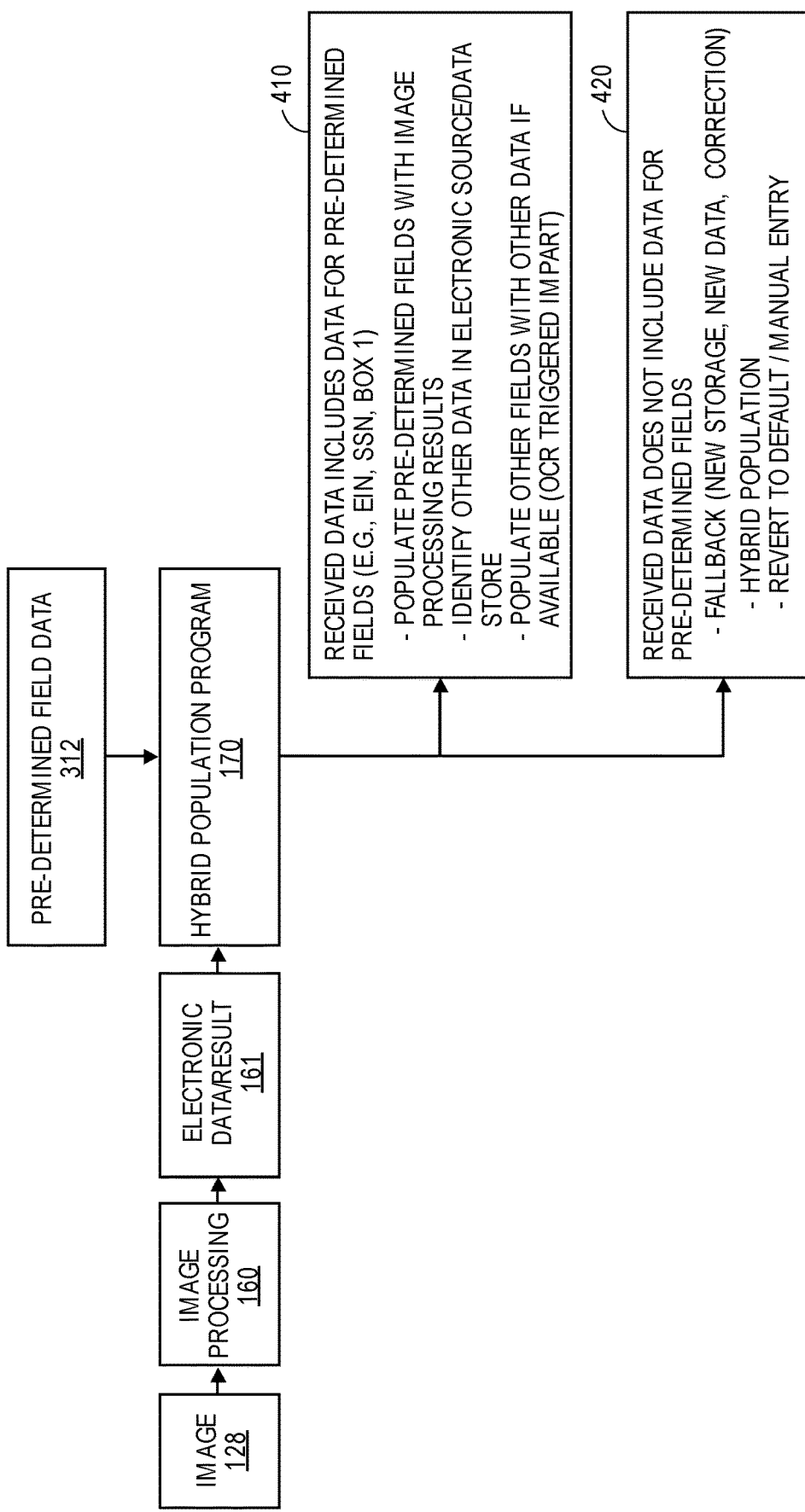
FIG. 4 is a flow diagram illustrating one manner in which a fallback mechanism triggered in response to failure of image processing triggered electronic import may be implemented.

Referring to FIG. 4, and with continuing reference to FIG. 3, results of image processing 160 trigger execution of the hybrid population program 170, e.g., OCR-triggered electronic import when certain rules or criteria are satisfied. If so, certain fields of one or more electronic tax forms 154c may be populated with OCR results 161, and electronic sources 130 are identified and electronic data 131 from the identified sources 130 is used to populate other fields of the electronic tax form 154c. This mechanism provides for use of different data population methods. This mechanism also utilizes image processing results such as OCR results 161 on a limited basis by identifying electronic sources 130 having other electronic data 131, populating electronic forms 154c using both OCR results 161 and electronic data 131 from the identified electronic sources 130, or using OCR 160 to only identify an electronic source 130 and importing data 131/313 from the data store 117 and that was previously received from an identified electronic source 140. Thus, not utilizing OCR results 161 or not using all of the OCR results 161 reduces or eliminates problems and errors associated with using OCR results 161 and instead utilizes electronic data 131/313 that is more reliable and accurate and less prone to error. Further, it is not required to perform imaging processing on an entire image thus reducing computation intensive image processing.

For these purposes, the hybrid population program 170 determines whether image processing results 161 include electronic data for pre-determined fields 312. According to one hybrid population rule, when the image processing results 161 include data of pre-determined fields 312/410 (e.g., EIN or EIN and a combination of other specified data such as Box 1 of Form W2), then the hybrid population program 170 proceeds with identifying electronic data 131/313 in the data store 117 and of an electronic source 130, and that electronic data 131/313 is used to at least partially populate one or more electronic tax forms 154c. However, at 420, another hybrid population rule specifies that when the image processing results 161 do not include data of a pre-determined minimum number or certain pre-determined fields 312, then the hybrid population program 170 is configured to call or execute a fallback program or execute a fallback procedure 171.

According to one embodiment, the fallback procedure 171 requests a new image 128, new electronic data or correction of previously entered data to determine whether the new or modified data or new image processing results 161 include data for the pre-determined fields 312. If so, then the image processing results 161 can be used to populate those fields 312 and electronic data 131/313 of the data store 117 and electronic sources 130 can be used to populate other portions of the electronic tax form 154c or other electronic tax forms 154c. In another embodiment, image processing results 161 are used to identify the other data 313, but not used to populate an electronic tax return since other electronic data in the data store 117 is used instead. Thus, even though image processing results 161 are available to populate a field of one or more electronic tax forms 154c, electronic data 131 of an electronic source 130 that was stored to the data store 117 is utilized instead for this purpose, or to populate more than the image processing results 161. Embodiments may also involve real-time identification of the electronic source 130 based on the whether the image processing results 161 include data for pre-determined fields 312, which is used to identify an external electronic source 130 and electronic data 131 thereof, and retrieve electronic data 131/313 associated with the pre-determined field data 312. In other words, the electronic source data 130 may be aggregated to the data store 117 before preparation of the electronic tax return 151c, or accessed by the tax return preparation application 150 during preparation of the electronic tax return 151c. Otherwise, a hybrid population rule specifies that when the pre-determined fields and/or pre-determined number of fields 312 are not populated, or hybrid population 170 has failed, then the fallback program or procedure 171 is activated or triggered to initiate subsequent potentially corrective action and determine whether hybrid population 170 or OCR-triggered import can still be used.

The fallback program or procedure 171 may involve generating interview screens 152 or instructions for the user to acquire a new image 128 of the tax document 129, reorient the tax document 129 or the mobile communication device 120, enter new data, correct data to determine whether the new image processing results 161, data or corrected data contains the pre-determined field data 312. If not, then a fallback rule specifies that hybrid population 170 is not a current option, and the user experience and data entry method is modified on the fly from image processing/hybrid population to manual data entry or another default data entry mode, as described in further detail with reference to FIGS. 3, 4 and 5A-H, which shown when import and fallback rules are executed and how electronic tax forms or electronic tax returns are populated based on execution of such rules. FIGS. 5A-H involve embodiments in which external electronic sources 130 are accessed before preparation of the electronic tax return 151c and electronic data 131 from these electronic sources 130 is aggregated to the data store 117, but embodiments are not so limited and the electronic sources 130 may be accessed during preparation of the electronic tax return 151c to determine whether OCR-triggered import is available.

Figure 5A:
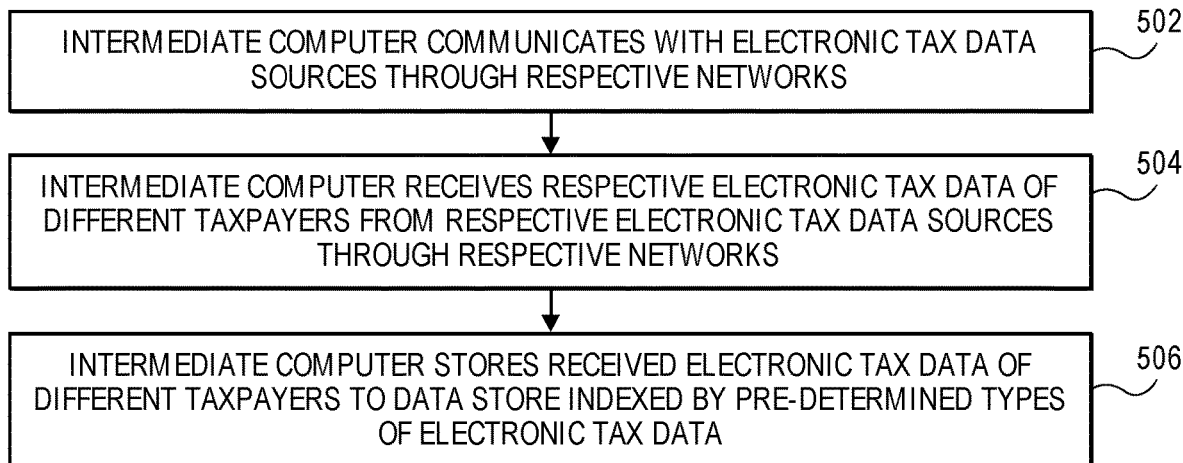
FIGS. 5A-H are additional flow diagrams illustrating how a fallback mechanism triggered in response to failure of image processing triggered electronic import may be implemented.

Referring to FIG. 5A, at 502, the intermediate computer 110, by the tax return preparation application 150, communicates with electronic tax data sources 130 through respective networks 140, and at 504, receives respective electronic tax data 131 of different taxpayers from respective electronic tax data sources 130. At 506, the intermediate computer 110, by the tax return preparation application 150, stores received electronic tax data 131 of different taxpayers to the data store 117, e.g. indexed by types of electronic data 131 or field identifiers. These intermediate computer 110 actions may be executed periodically and before preparation of an electronic tax return 151c such that electronic data 131 is aggregated from various electronic sources 130. Embodiments that involve prior aggregation of electronic data 131 eliminate the need for the tax return preparation application 150 to communicate with external electronic sources 130 during preparation of the electronic tax return 151c and instead utilize a local data store 117 for easier and faster access.

Figure 5B:
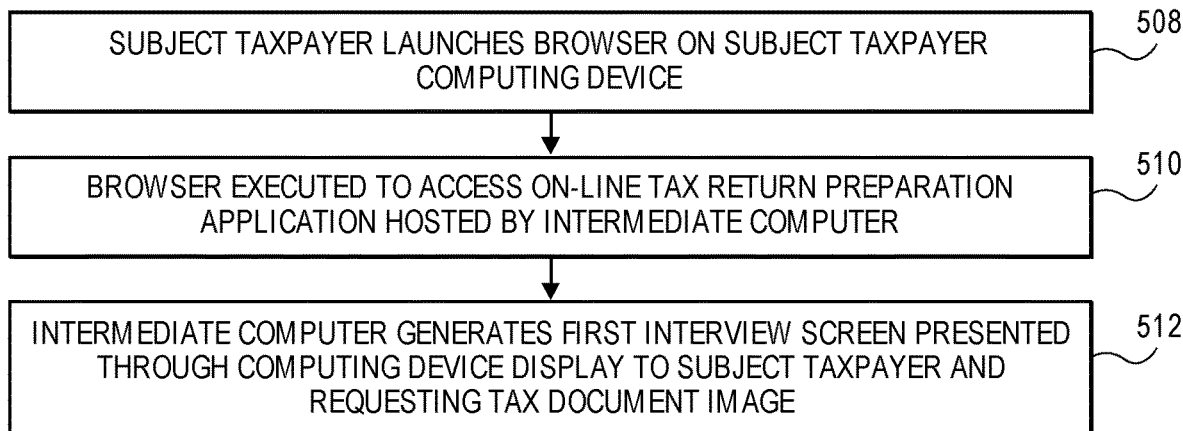

Continuing with reference to FIG. 5B, at 508, a subject taxpayer launches browser 122 on the computing device 120 such a mobile communication device, and at 510, the browser 122 is used to access the on-line tax return preparation application 150 hosted by the intermediate computer 110. At 512, the intermediate computer 110, by the tax return preparation application 150, generates a first interview screen 152. The first interview scree 152 is presented to the subject taxpayer through a display 123 of the mobile communication device 120 and requests a tax document image 128.

Figure 5C:
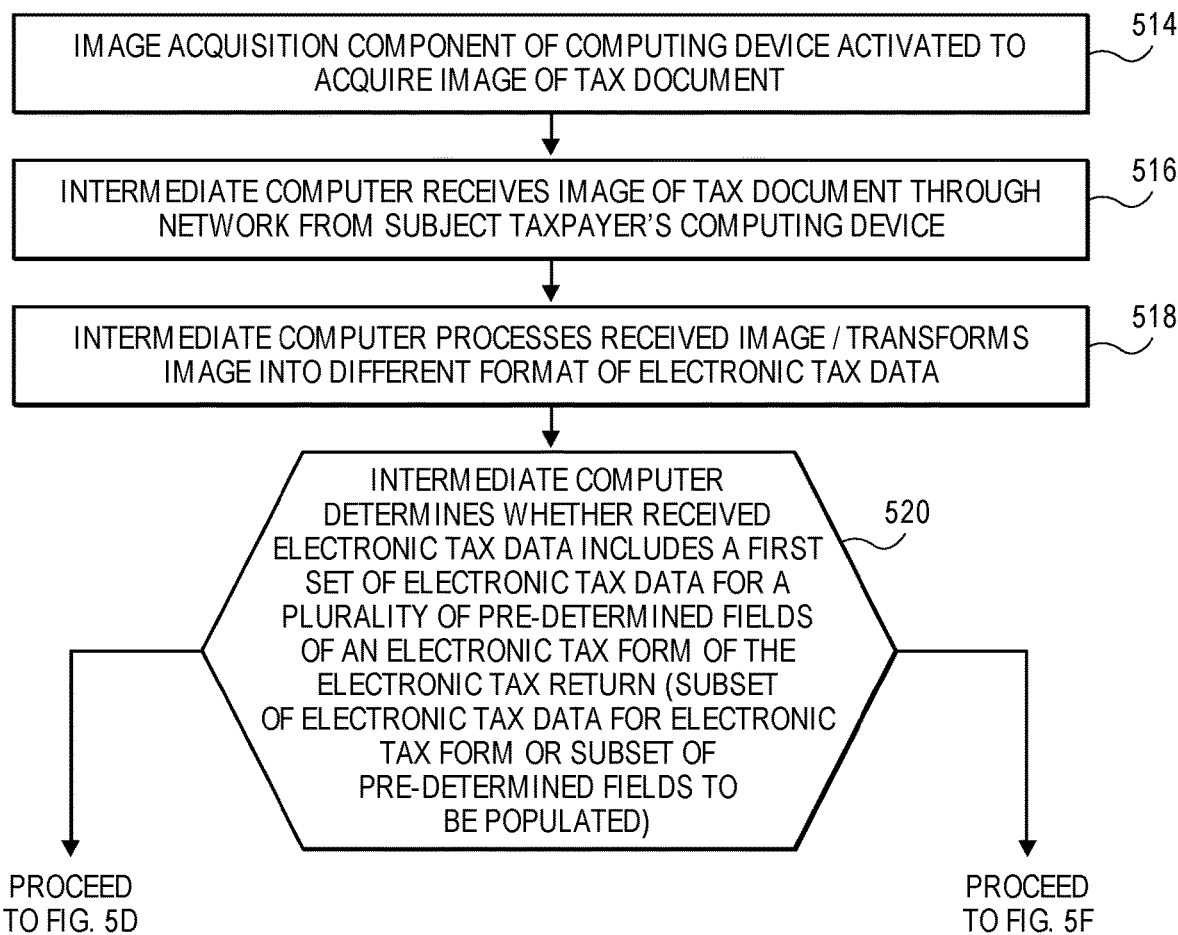

With continuing reference to FIG. 5C, at 514, a camera or other image acquisition component 126 of the mobile communication device 120 is positioned in view of a tax document 129. The camera 126 is activated to acquire image 128 of tax document 129, and the image 128 is transmitted from the mobile communication device 120 to the intermediate computer 110 through a network 140*a* at 516.

Figure 6A:
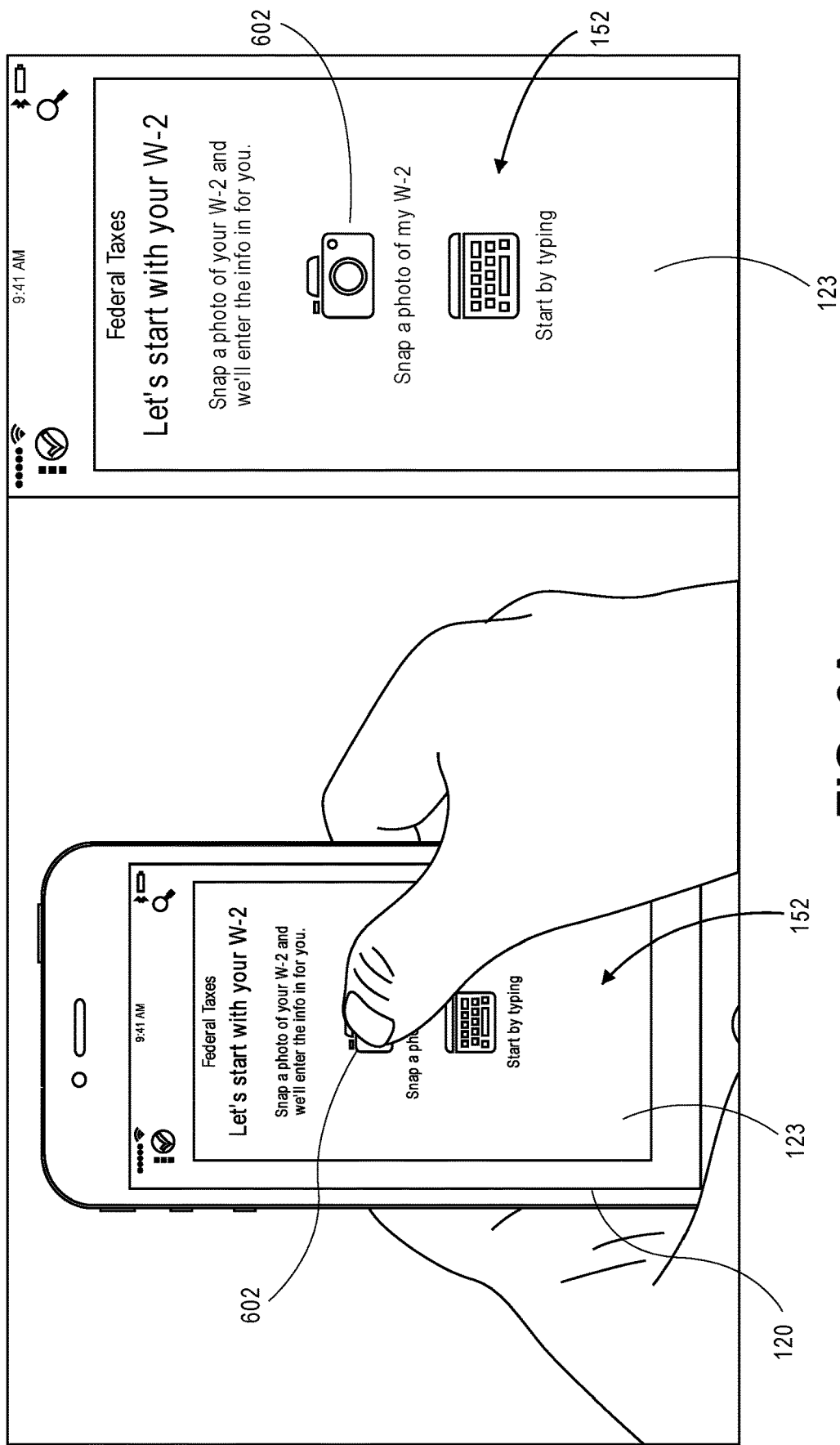
Figure 6B:
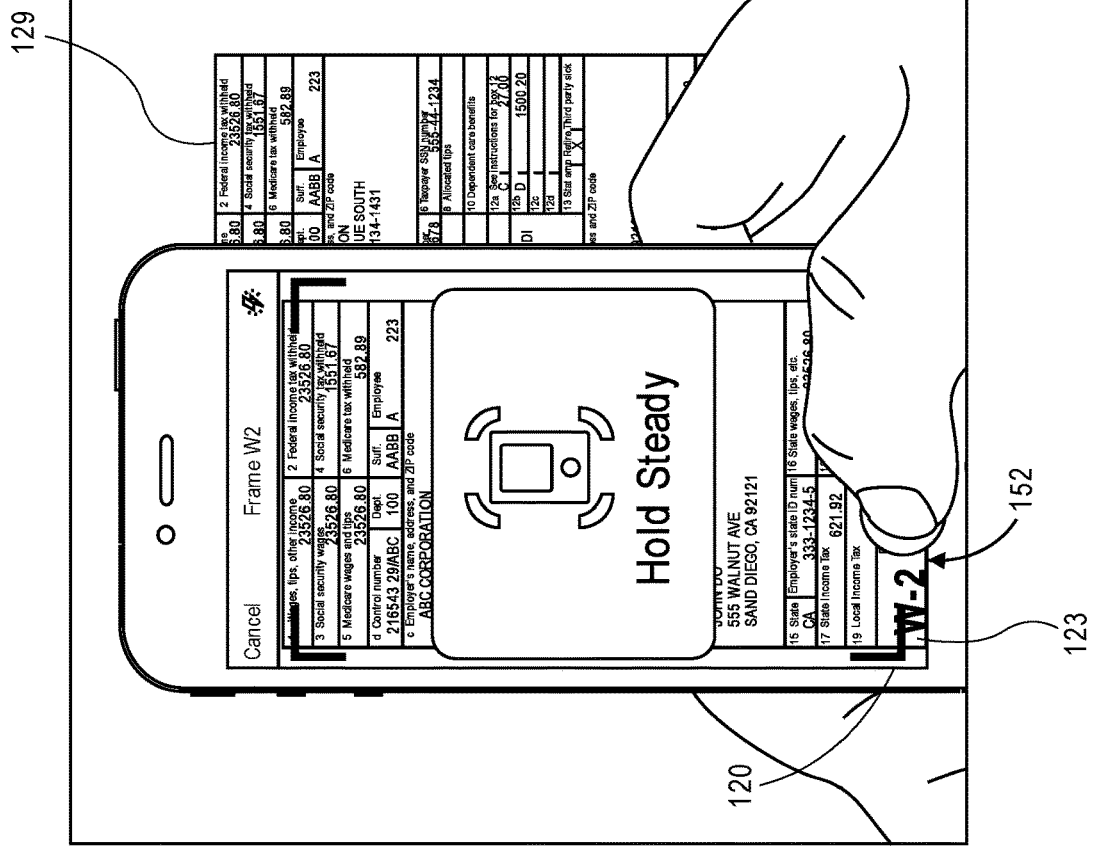
Figure 6C:
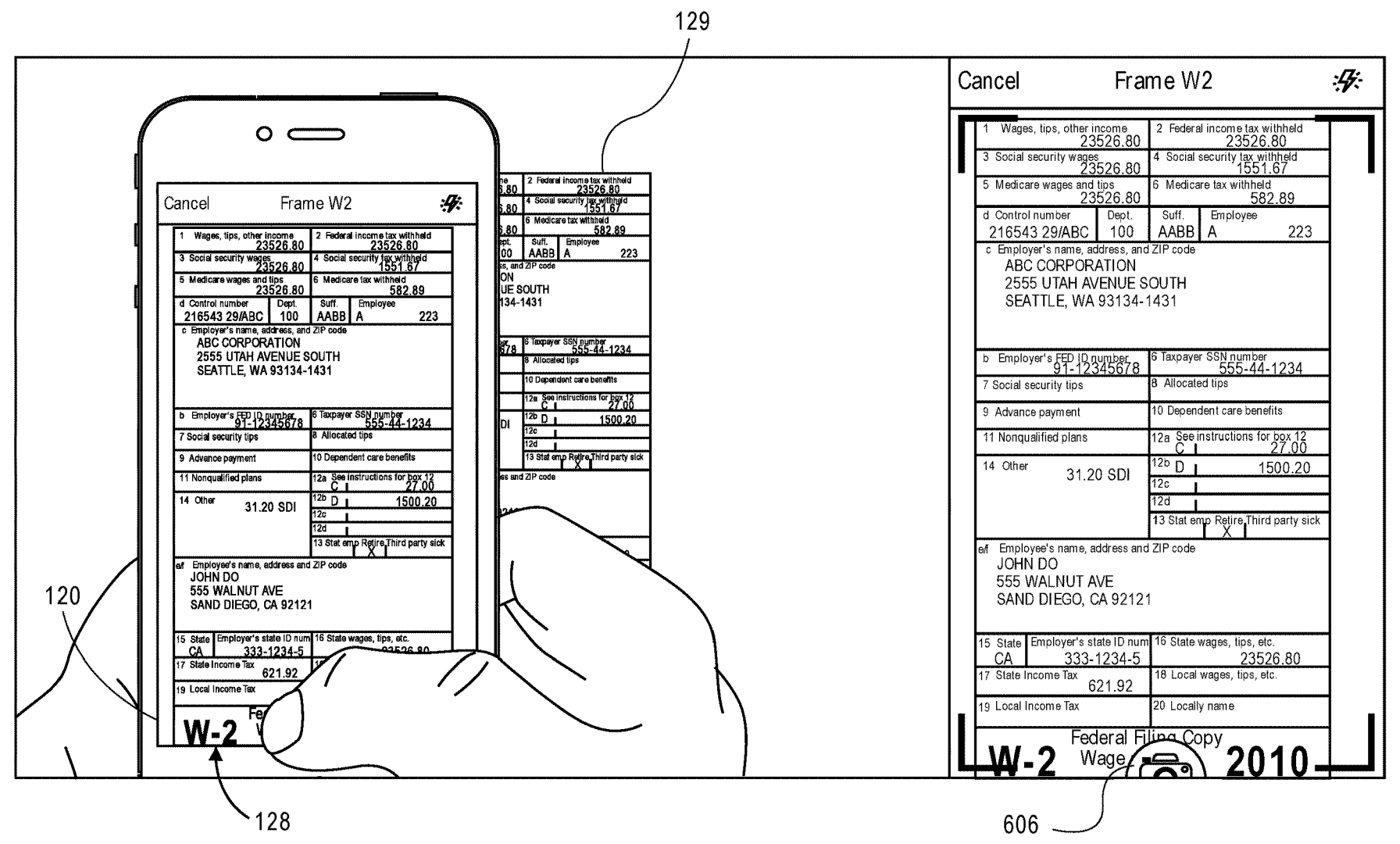
Figure 6D:
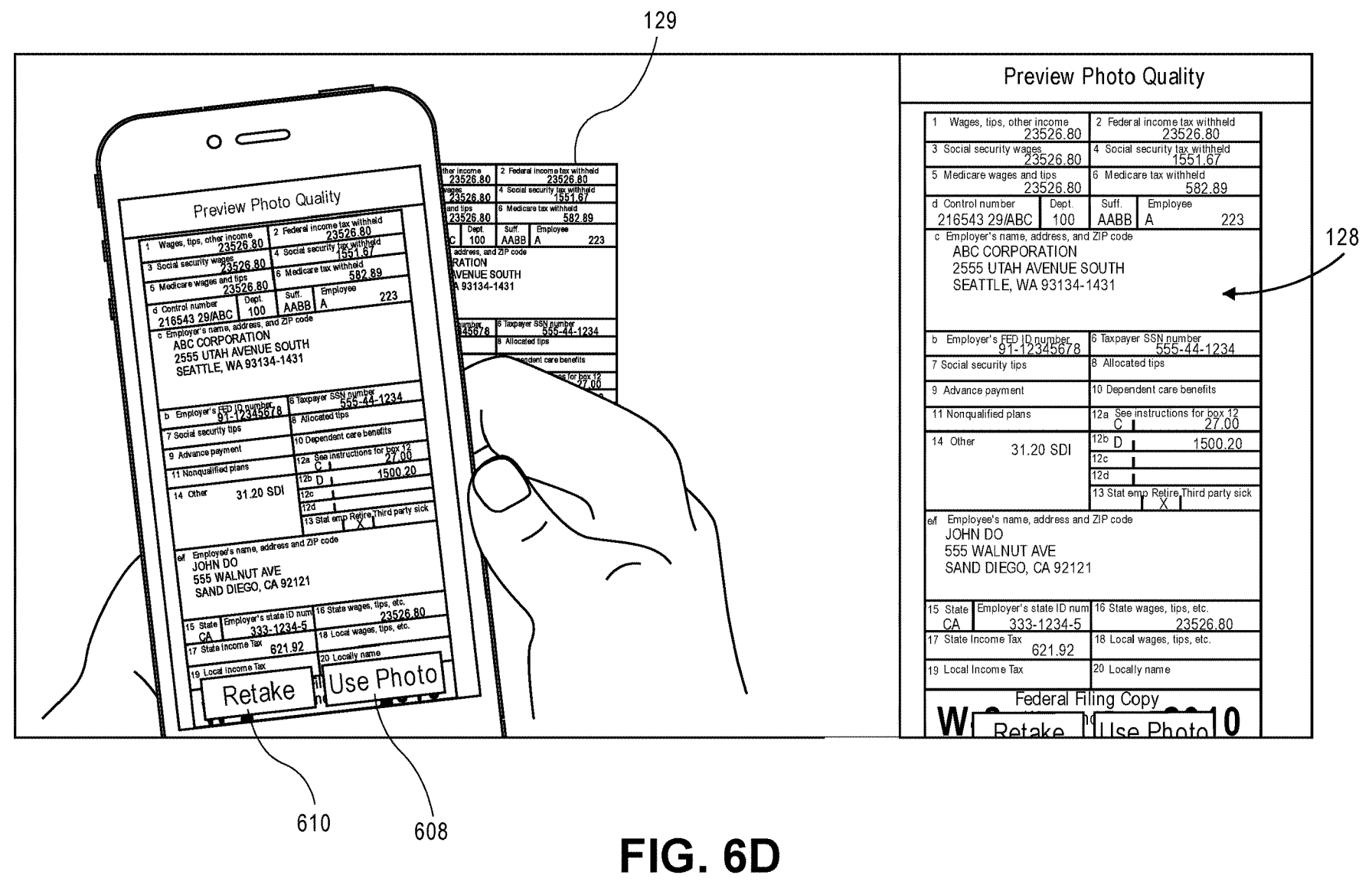
Figure 6E:
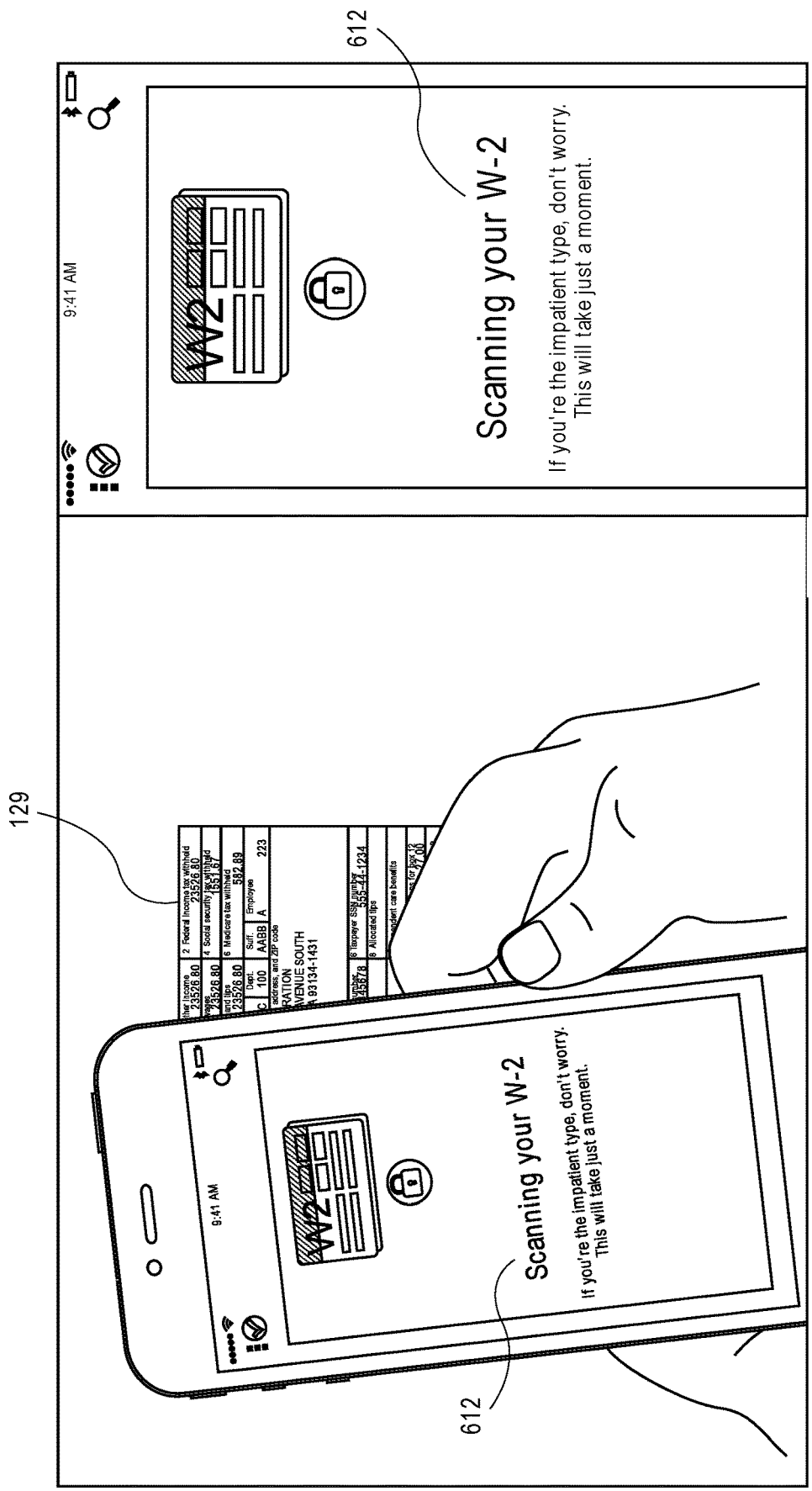

For example, referring to FIG. 6A, the taxpayer may select the icon for "Snap a photo of my W-2" 602, and FIG. 6B show the mobile communication device camera 126 being positioned relative to the underlying tax document so that the tax document 129 is in view of the camera 216, and an instruction 604 to hold the mobile communication device 120 steady is presented to the preparer. Referring to FIG. 6C, the preparer touches the camera icon 606 on the mobile communication device screen 123 to snap a picture of the tax document 129, or a picture is acquired after a pre-determined time of holding the mobile communication device 120 steady. The resulting image 128 is displayed as shown in FIG. 6D, and the preparer is provided with options 608 610 to use the acquired image or photo 128 or retake the image or photo. The resulting image 218 is scanned or processed 612 as shown in FIG. 6E to transform the image into electronic data 161. Image processing 160 may be executed locally on the mobile communication device 120, or the image 128 can be transmitted through the network 140*a* to the intermediate computer 110 for remote image processing 160.

Referring again to FIG. 5C, and in embodiments in which a networked computing system as shown in FIG. 3 is utilized, at 516, the acquired tax document image 128 is transmitted by the mobile communication device 120 and received by the intermediate computer 110 through network 140*a*. At 518, the intermediate computer 110, such as by the tax return preparation application 150, executes imaging processing system 160 to process the received image 128 and transform the received image 128 into a different format of electronic tax data 161. At 520, the intermediate computer 110, by the tax return preparation application 150, determines whether received electronic tax data 161 includes a first set of electronic tax data 161 for a plurality of pre-determined fields of an electronic tax form of the electronic tax return 151*c* (subset of electronic tax data for electronic tax form or subset of pre-determined fields to be populated).

Figure 7:
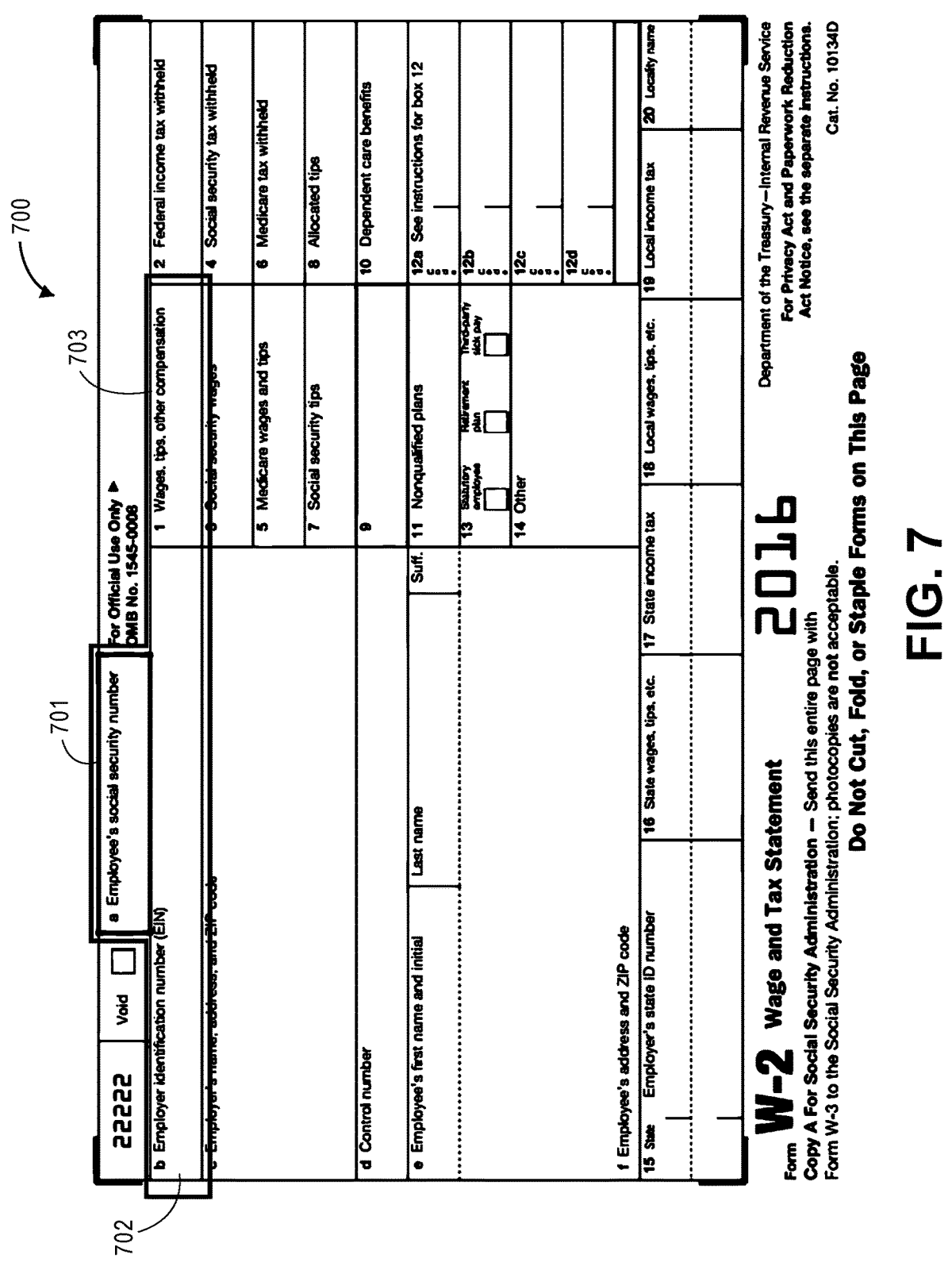

For example, referring to FIG. 7, step 522 may involve whether the resulting electronic tax data 161 includes a first set of data of a specific types of data or data for specific fields of an electronic tax form 129—Form W2 is illustrated as an example. In the illustrated embodiment, this determination involves whether the resulting electronic tax data 161 includes a first set of data of Form W-2, i.e., Employee's social security number 701, an Employer identification Number (EIN) 702 and Box 1 Wages, tips other compensation 703. The illustrated embodiment also illustrates how the first set of data is in adjacent fields or a pre-determined section of the tax document image 128. Other embodiments may involve other types and combinations of data for the first set. Further, other embodiments may involve a single field, e.g., only EIN, and the data being analyzed may be determined from image processing 160 or in other embodiments in which a user initially manually enters the EIN number. Moreover, in the example involving a Form W-2 as shown in FIG. 7, it will be understood that different forms including different Forms W-2 include different field structures.

Figure 5D:
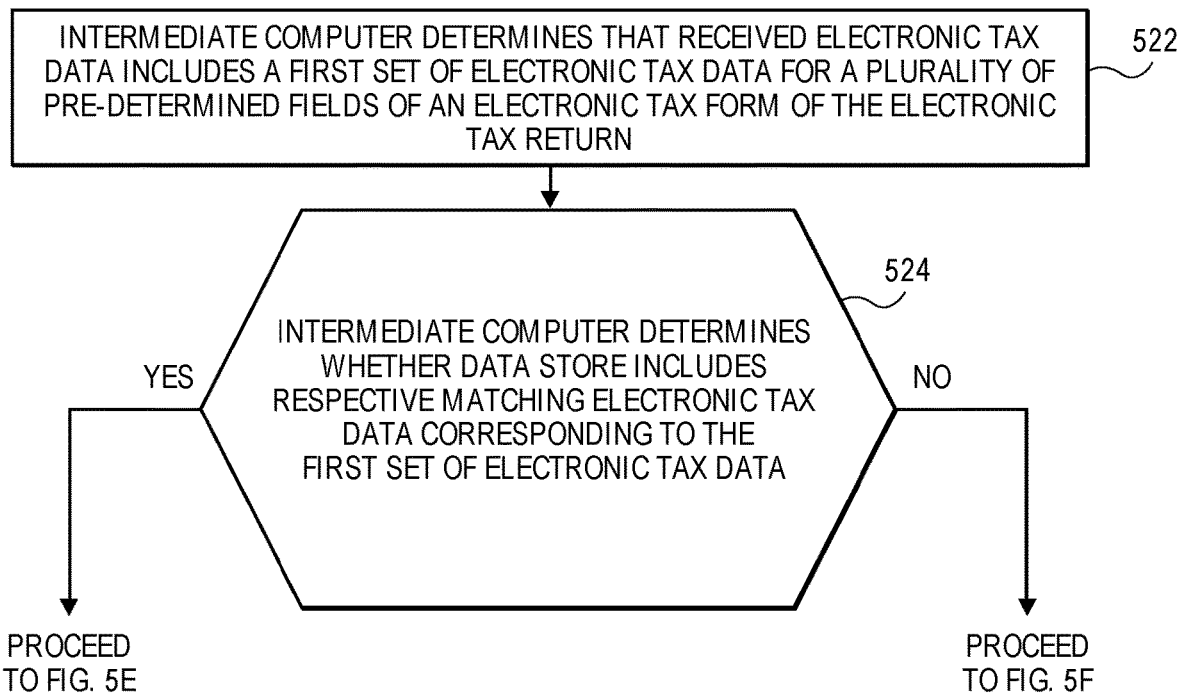

With continuing reference to FIG. 5C, when the electronic tax data 161 includes data for the first set of pre-determined fields, then the process proceeds to FIG. 5D. If not, the process proceeds to FIG. 5E.

Referring to FIG. 5D, at 522, the intermediate computer 110, by the tax return preparation application 150, determines that received electronic tax data 161 includes a first set of electronic tax data for a plurality of pre-determined fields of an electronic tax form of the electronic tax return 151*c*, and at 524, determines whether the data store 117 includes respective matching electronic tax data corresponding to the first set 700 of electronic tax data 161. As described above with reference to FIG. 5A, the data store 117 includes electronic data 131 aggregated from respective electronic sources 130 prior to preparation of the electronic tax return 151*c*, although updates to the electronic data in the data store 117 may be executed after preparation of the electronic tax return 151*c* has begun. If so, then the process proceeds to FIG. 5E, and if not, the process proceeds to FIG. 5F.

Figure 5E:
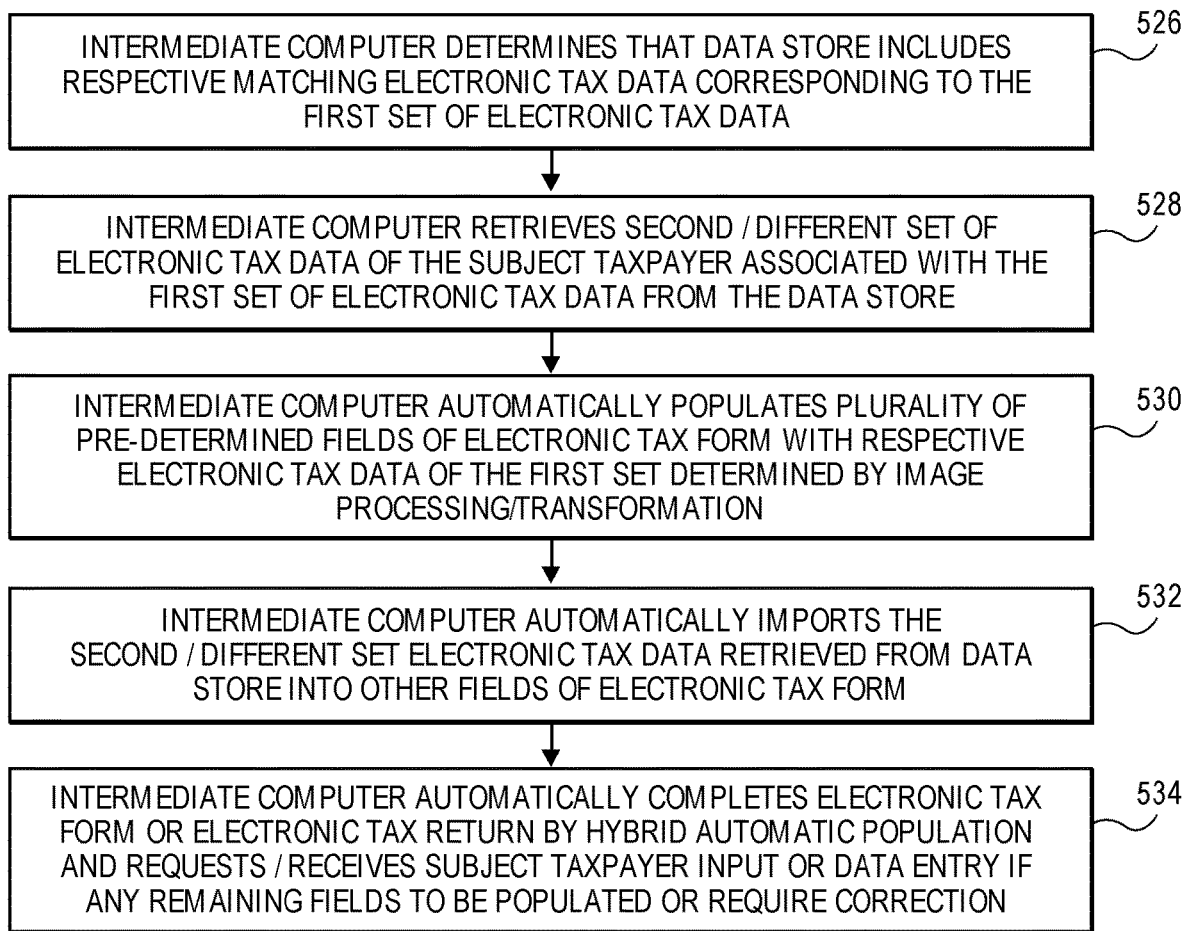

Referring to FIG. 5E, at 526, the intermediate computer 110, by the tax return preparation application 150, determines that the data store 117 includes respective matching electronic tax data corresponding to the first set of electronic tax data 161 determined by image processing 160 or that was entered by the taxpayer, and at 528, retrieves a second or different set of electronic tax data of the subject taxpayer associated with the first set of electronic tax data from the data store 117.

According to one embodiment, at 530, the intermediate computer 110, by the tax return preparation application 150, automatically populates a plurality of pre-determined fields of one or more electronic tax forms 154*c* or corresponding interview screens 152 with respective electronic tax data 161 of the first set determined by image processing/transformation 160, and at 532, automatically imports the second/different set electronic tax data retrieved from data store 117 into other fields of electronic tax form. Thus in this embodiment, an electronic tax form, for example, is populated with electronic tax data determined by image processing 169 and electronic tax data that is imported from the data store 117 thus providing a type of hybrid population.

Figure 8:
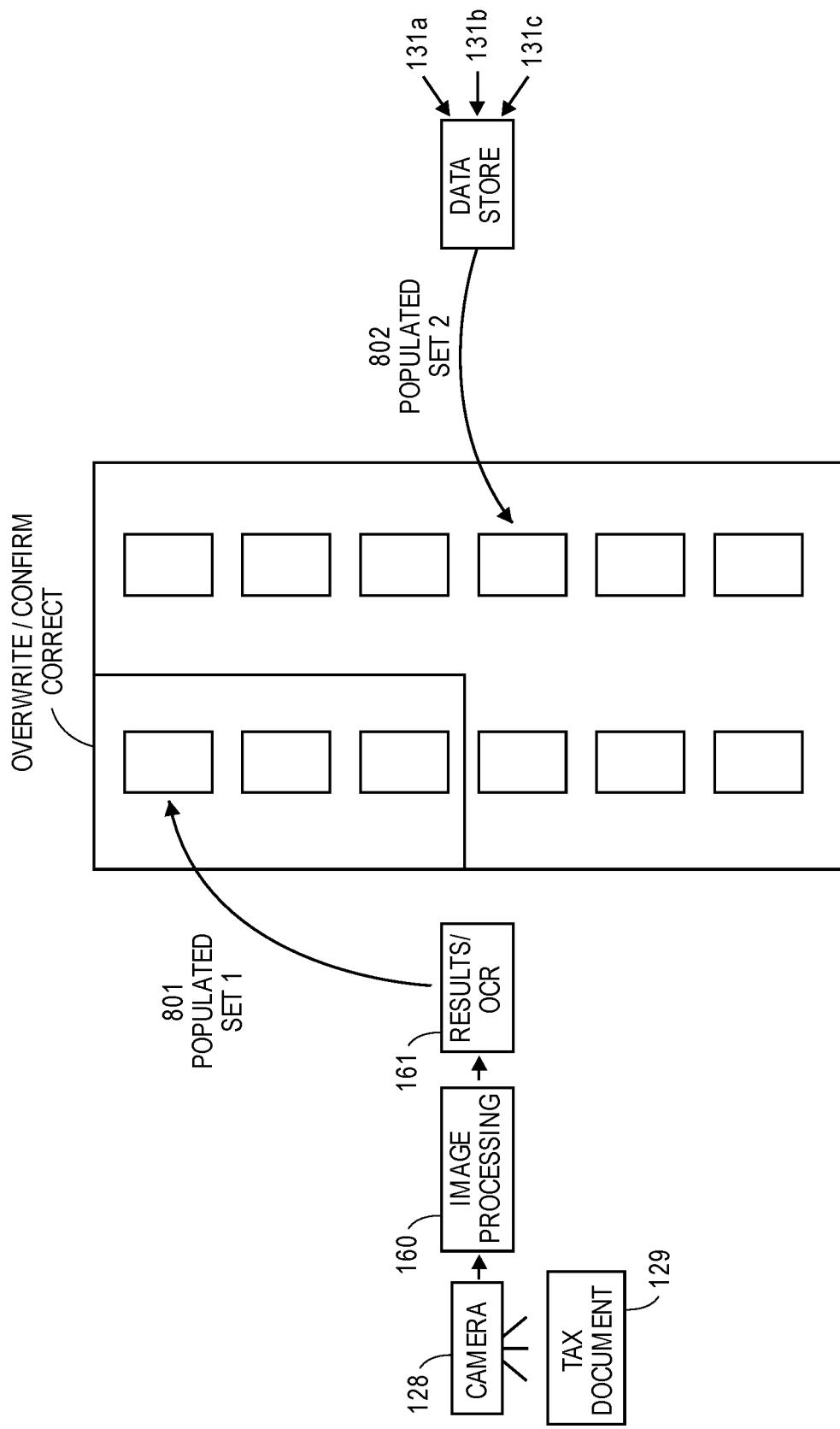
FIG. 8 depicts an electronic tax form being populated with electronic data originating from various sources and how one type or source of data is prioritized over another type or source of electronic data to populate an electronic tax form.

Hybrid population is also illustrated in FIG. 8, which shows an example in which image processing results 161 of data for the pre-determined fields are used to populate corresponding fields in the electronic tax form 154*c* (shown as group or set 801), whereas other fields of the electronic tax form 154*c* are populated with data received from the data store 117 (shown as second group or set 802) rather than with image processing results 161. Thus, embodiments utilize imaging processing (e.g., OCR) 160 to at least identify electronic source data 131 in the data store 117 (or identify an electronic source 130 and electronic source data 131 thereof) that can be used for electronic import, which is more reliable or more accurate than image processing, to populate all or a majority or substantial portion of the electronic tax form 154*c*.

In the embodiment illustrated in FIG. 8, a first, smaller portion of the electronic tax form 154*c* including three fields (e.g., for SSN, EIN and Wages, Box 1) are populated with electronic tax data 161 determined by image processing 160, whereas all other fields of the electronic tax form 154*c* are populated with data imported from the data store 117, the source of which is one or more electronic sources 130. Thus, in this example, image processing 160 is used to identify in the data store 117 other data that is to be used to populate the electronic tax return 151c which, in turn, reduces or minimizes reliance upon using imaging processing 160 or OCR results 161 that may be less reliable or associated with lower confidence and more prone to errors compared to importing data from the data store 117. In other words, embodiment are able to utilize image processing 160 and to leverage the user's ability to acquire images 128 of tax documents 129, while also utilizing other sources 117/130 of electronic data 131 identified based upon image processing results 161.

While FIG. 8 illustrates the image processing results 161 for the pre-determined fields being used to populate the electronic tax form 154c, in another embodiment, the data received from the data store 117 is used to confirm that the image processing results 161 are correct, thus providing for an automatic OCR accuracy check. Data retrieved from the data store 117 may also be used to overwrite the data populated electronic tax form 154 fields that were previously populated with image processing results 161, e.g., in the event of a discrepancy.

Referring again to FIG. 5E, at 534, embodiments may involve the intermediate computer 110 automatically completing one or multiple electronic tax forms 154c or completing the electronic tax return 151c by hybrid automatic population. In the event that the data store 117 does not include data for all other fields of the electronic tax form 154c, the tax return preparation application 150 presents an interview screen 152 or instruction to the taxpayer requesting the taxpayer to manually enter or otherwise input data for remaining fields to be populated or that require correction.

Figure 5F:
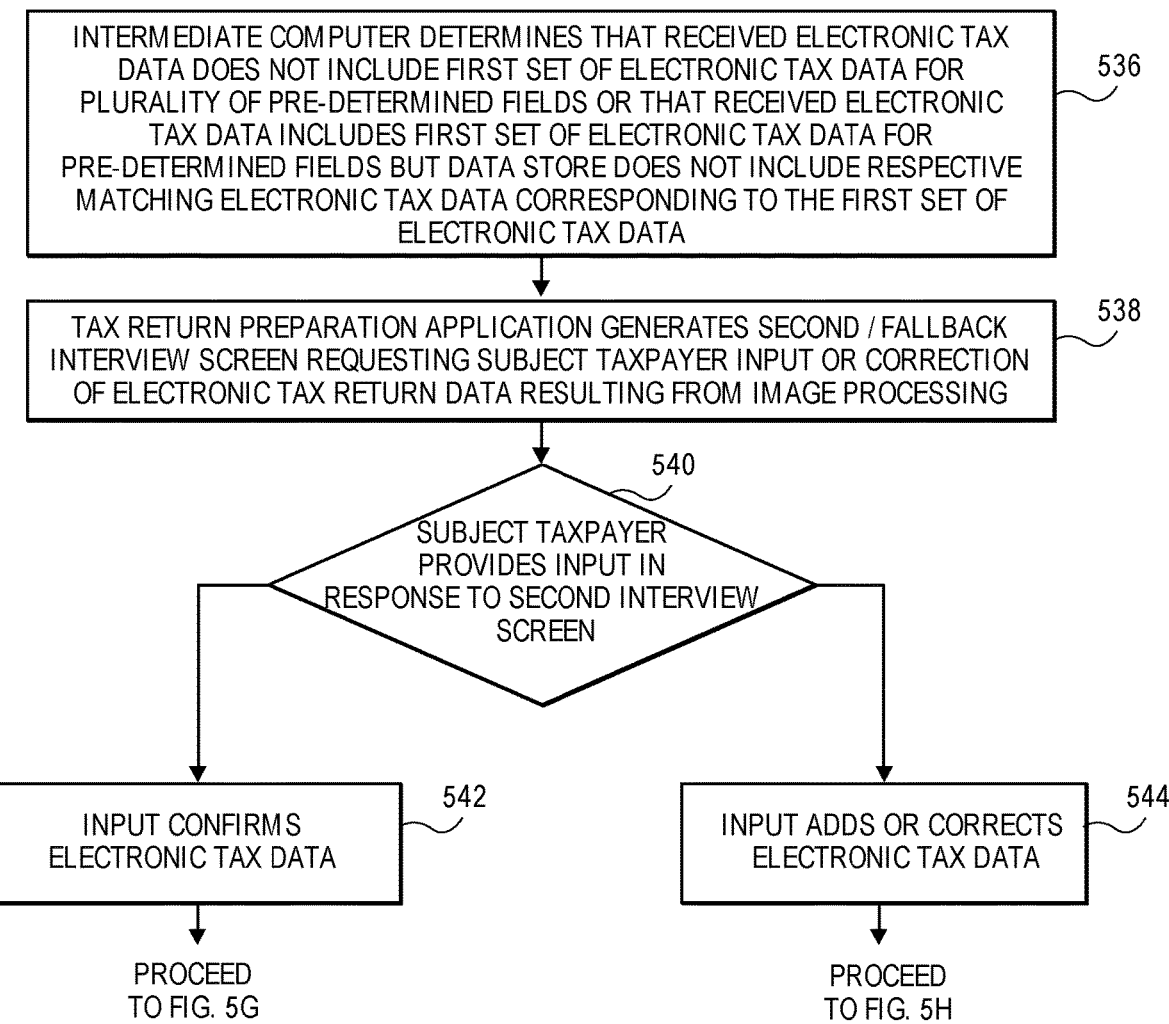

Referring to again to FIG. 5D and to FIG. 5F, at 536, the intermediate computer 110 determines that received electronic tax data 161 does not include first set of electronic tax data for plurality of pre-determined fields or that received electronic tax data 161 includes first set of electronic tax data for pre-determined fields but data store 117 does not include respective matching electronic tax data. In this case, proceeding with 538, the intermediate computer 110, by the tax return preparation application 150, generates a second/fallback interview screen 152 requesting subject taxpayer input or correction of electronic tax return data resulting from image processing 161, and in response, at 540, the taxpayer provides input in response to second interview screen 152. At 542, when the taxpayer input confirms that electronic tax data 161, thus confirming that data store 117 does not include a file or record that is relevant to that electronic tax data 161, then the process proceeds to FIG. 5G. Otherwise, at 544, when the taxpayer input adds or corrects the previously analyzed electronic data 161, the process proceeds to FIG. 5H.

Figure 5G:
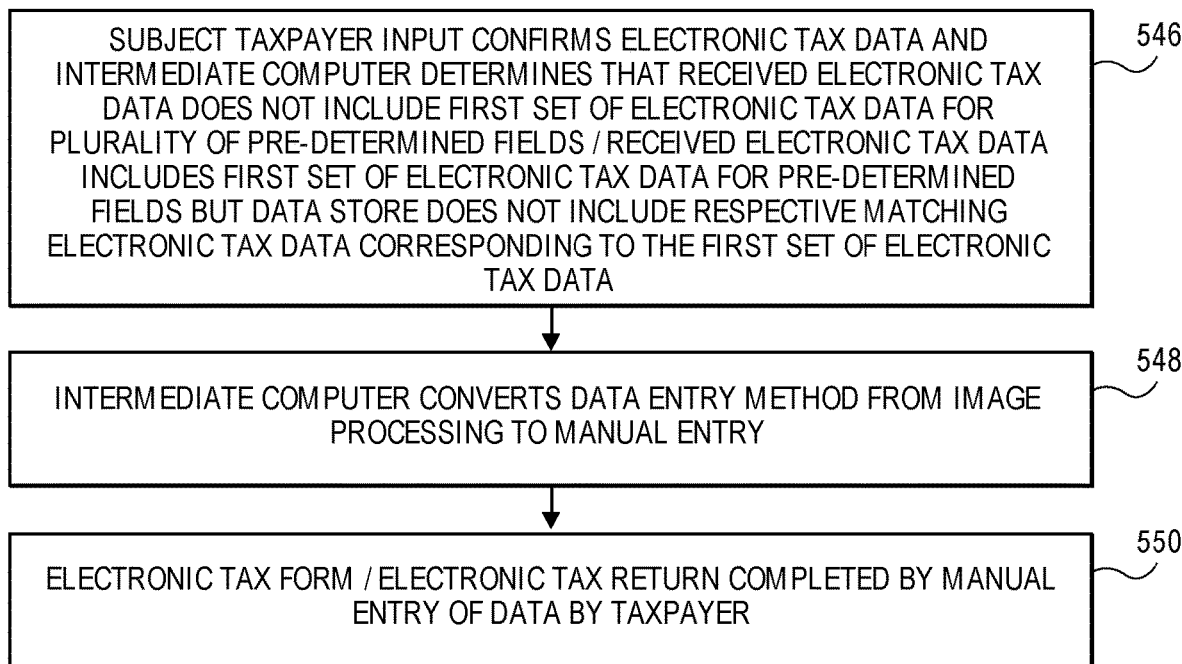

Referring to FIG. 5G, at 546, the taxpayer input received by the intermediate computer 110 confirms the electronic data 161 such that the intermediate computer 110 determines that received electronic data 161 does not include first set of electronic tax data for plurality of pre-determined fields, or includes data for the pre-determined fields but not the data store 117 does not matching data. In this case, at 548, the intermediate computer 110, by the tax return preparation application 150, converts the user experience and data entry method from population by image processing 160 or hybrid population 170 to a default data entry method such as manual entry of data by the taxpayer, and at 550, the intermediate computer 110 receives electronic data manually typed in or otherwise provided by the taxpayer. This subsequent input may complete the electronic tax form 154c or electronic tax return 151c.

Figure 5H:
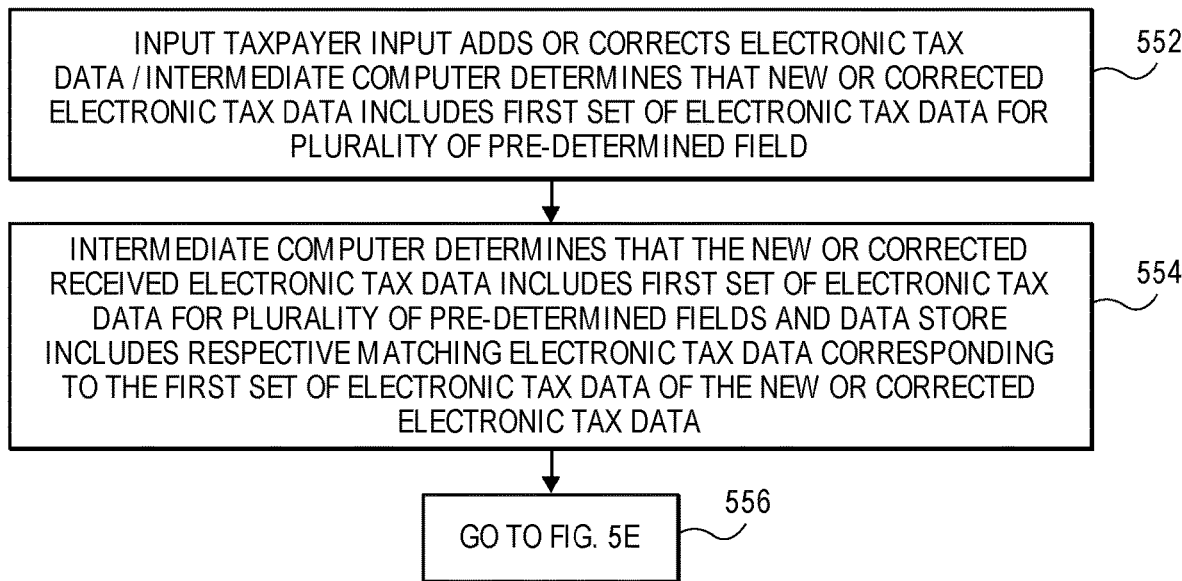

Referring to FIG. 5H, at 552, the taxpayer input adds or corrects electronic tax data 161 (e.g., due to an OCR error) or that the intermediate computer 110 determines that new or corrected electronic tax data includes first set of electronic tax data for plurality of pre-determined fields, and at 554, the intermediate computer 110 determines that the new or corrected received electronic tax data includes first set of electronic tax data for plurality of pre-determined fields and the data store 117 includes respective matching electronic tax data. In this case, the process proceeds to FIG. 5E, which as discussed above with reference to FIG. 8, involves the intermediate computer 110 automatically importing second/different set electronic tax data retrieved from data store 117 into other fields of electronic tax form 154C, e.g., as part of hybrid population. Thus, in this case, the "fallback" 171 resulted in hybrid population still being applicable although the hybrid population method was not initially triggered.

Figure 9A:
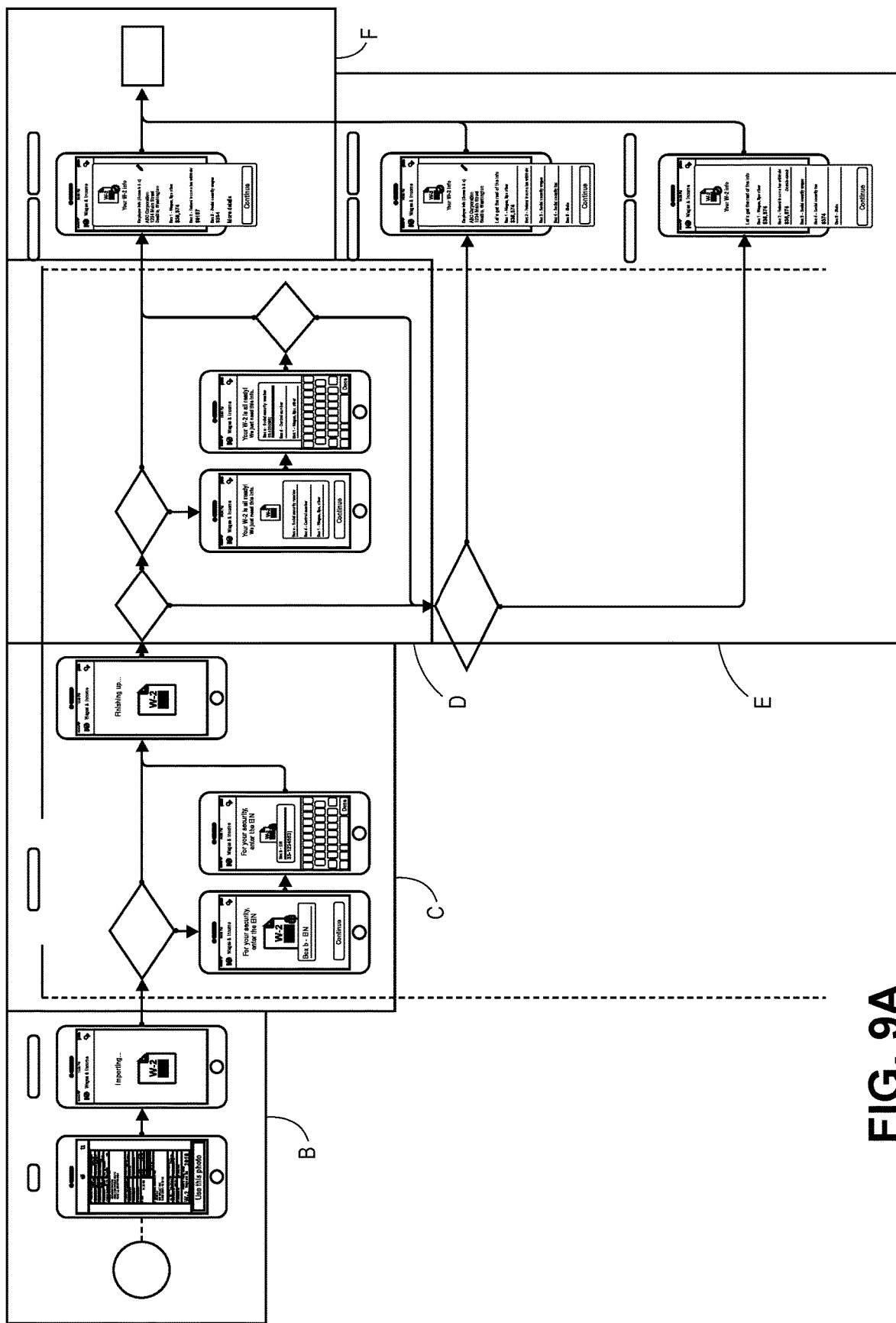
FIGS. 9A-F illustrate one example of how image-based hybrid population and fallback mechanisms may be implemented according to embodiments.
Figure 9B:
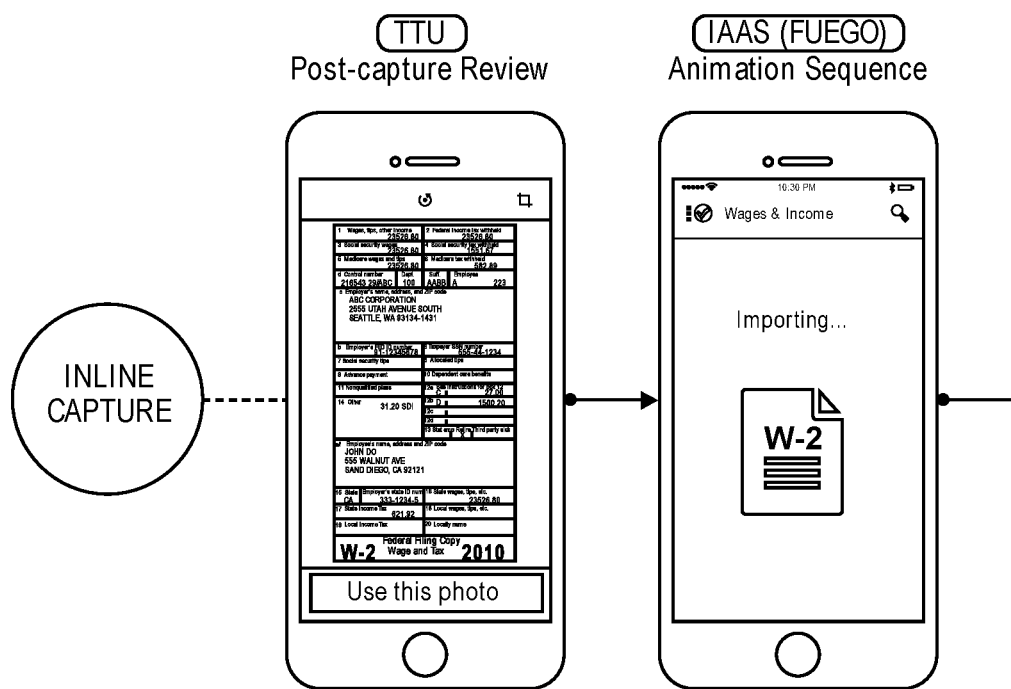
Figure 9C:
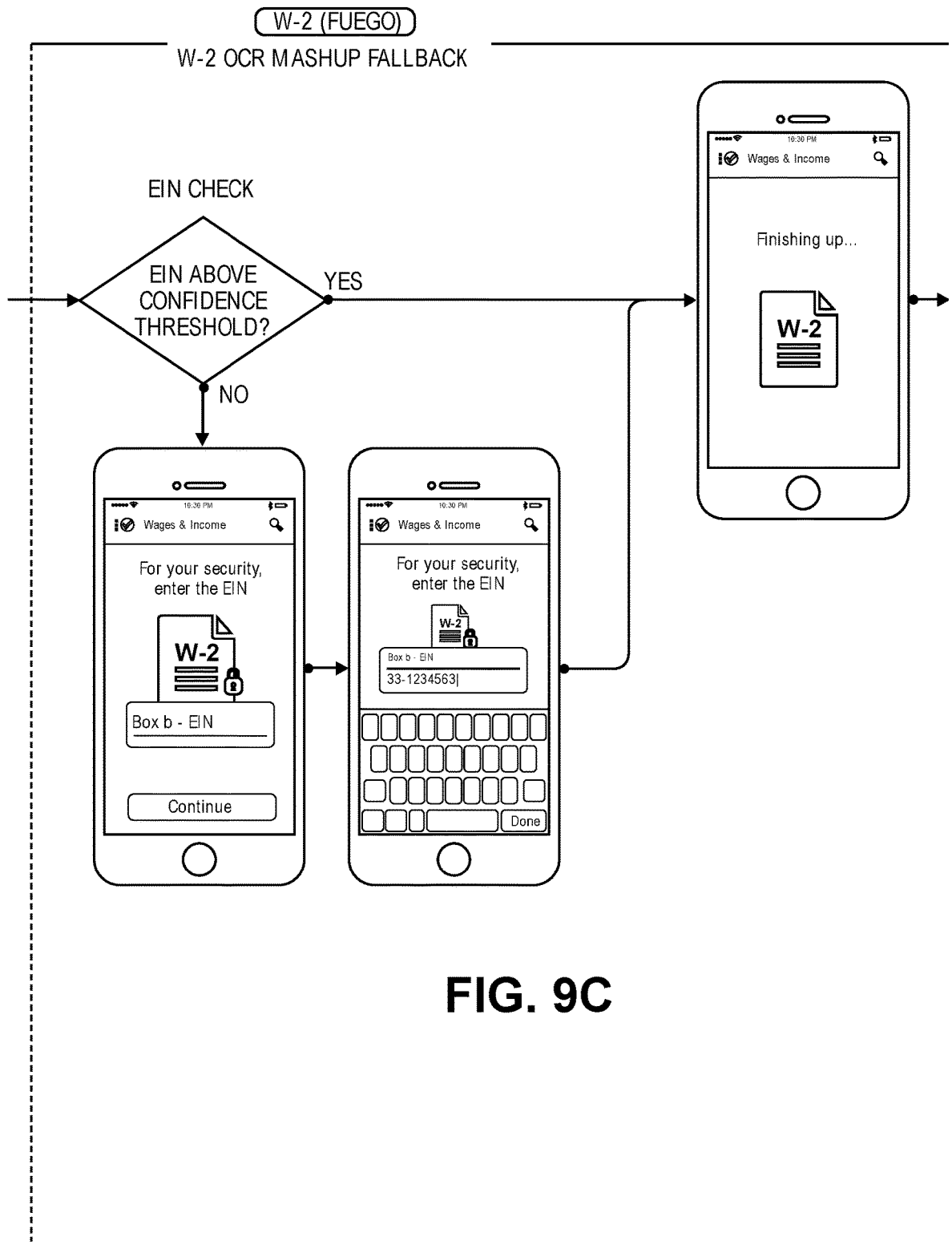
Figure 9D:
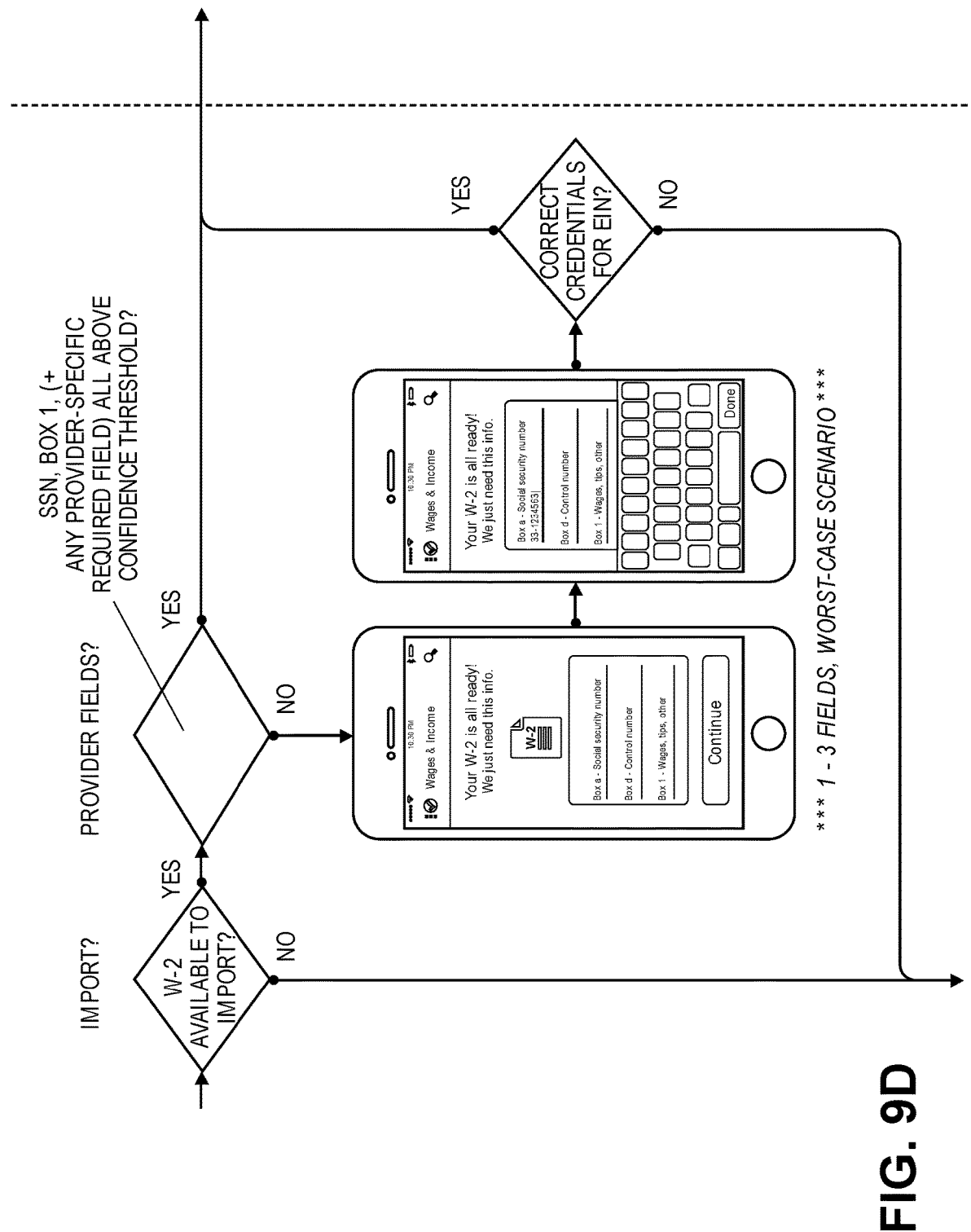

FIGS. 9A-F further illustrate a more detailed example of how a fallback procedure 171 may be implemented to check whether hybrid population 170 or OCR-triggered import can be utilized, or whether the user experience and data entry method should be transformed on the fly during preparation of the electronic tax return 151C. In the illustrated embodiment, an image 128 of a tax document 129 is acquired (FIG. 9B), and in certain embodiments, the taxpayer is instructed to begin with imaging of a certain document 129, which in one embodiment, is a wage statement such as Form W-2. Specific data, such as the EIN, is utilized to determine whether electronic import can be utilized (FIG. 9C). For this purpose, the imaging results 161 are initially analyzed to determine whether they have identified EIN (or other tax form data) with sufficient confidence, and if not, the taxpayer may be asked to manually enter the EIN. After the EIN (or other data) is determined with sufficient confidence by image processing or confirmed or entered, the tax return application 150, by the hybrid population program 170, determines whether electronic data for Form W-2 is available in the data store 117 for electronic import (FIG. 9D). For this purpose, the hybrid population program 170 checks the data in the data store 117 associated with the analyzed EIN (and additional pre-determined data such as the taxpayers SSN and Box 1—Wages known what a minimum confidence level as shown in FIG. 9D). Thus, in this embodiment, a first type of data, such as EIN, is initially analyzed, and then a combination of that data and other pre-determined data (such as SSN and Box 1—Wages) is analyzed, thus providing for two step confidence analysis.

Figure 9E:
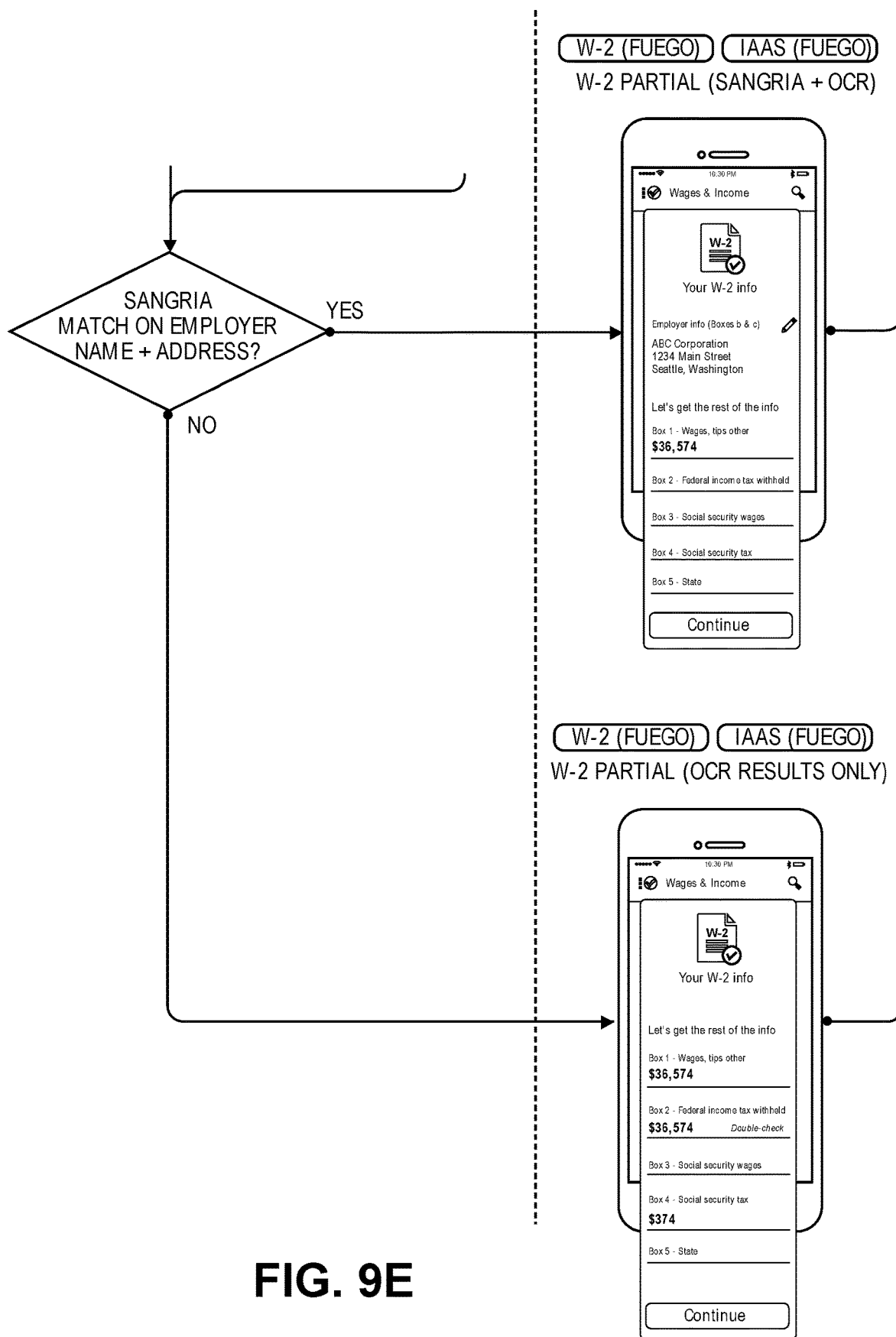
Figure 9F:
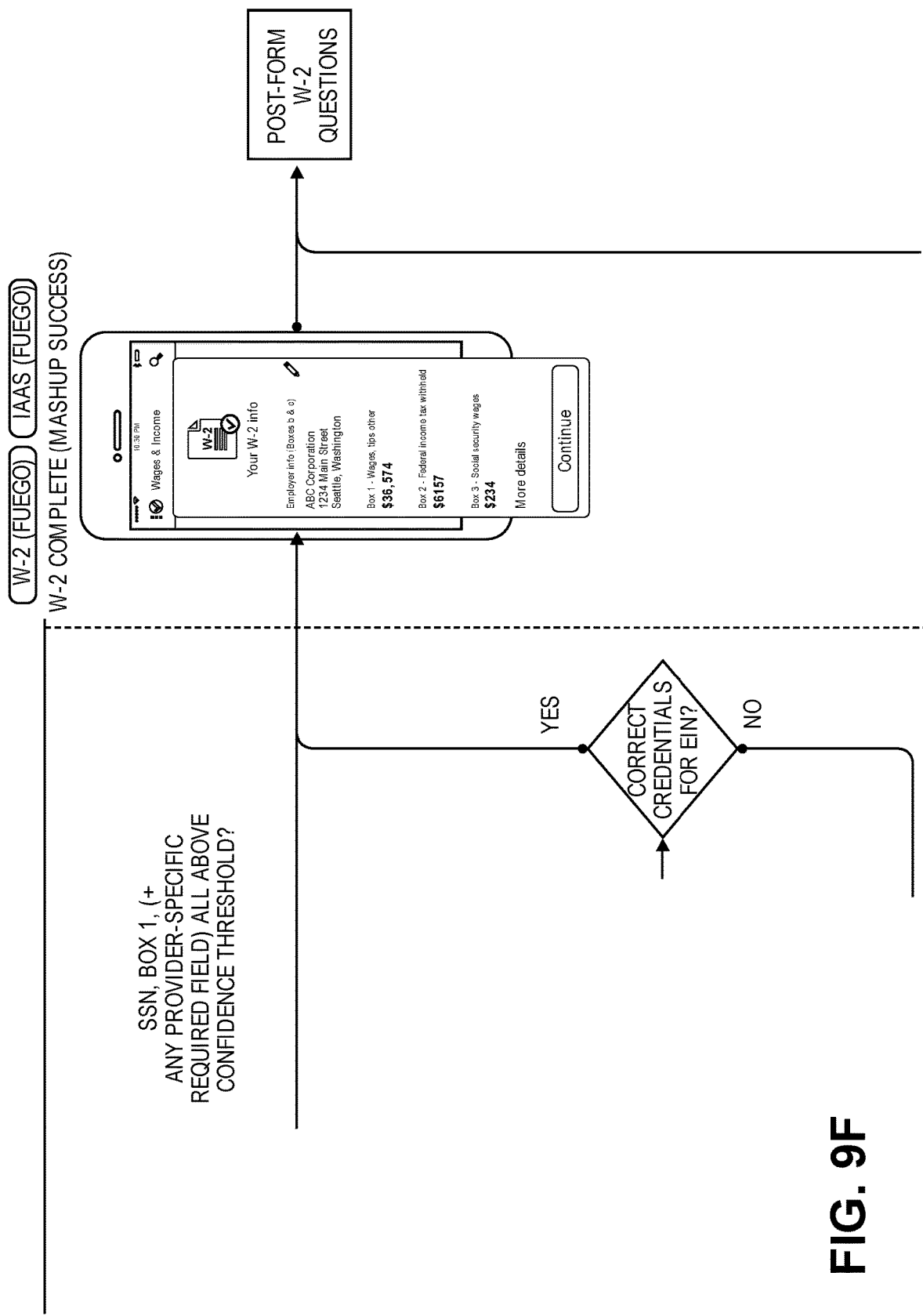

The electronic tax form 154c can be populated to different degrees depending on whether a fallback procedure 171 is utilized and the outcome of the fallback procedure 171. For example, when the EIN and other pre-determined data such as SSN and Box 1—Wages are determined with sufficient confidence and the data store 117 includes electronic data that is available for import, then the electronic tax form 154c can be completed or populated in full using the electronic data retrieved from the data store 117 such that the electronic tax form 154c is completed using a combination of the previously determined image processing results 161 and electronic import. In other words, electronic tax form 154c population is performed by a "mashup" of different data entry methods and from different electronic data sources (FIG. 9D). The tax return preparation application 150 may then proceed to the next topic. (FIG. 9F). However, if some of the pre-determined data is not known or is not known with sufficient confidence (FIG. 9D), then the fallback program 171 is triggered to execute to determine whether hybrid population 170 or OCR-triggered import is still an option. In the illustrated embodiment, the fallback program 171 requests taxpayer confirmation regarding the pre-determined data that did not meet the confidence threshold. Embodiments may also involve other actions such as asking the user to acquire another image 128 of the tax document 129. If, based on this taxpayer confirmation or re-imaging that the set of pre-determined data is now known with sufficient confidence, the fallback program 171 output indicates that hybrid population 170 can proceed as discussed above (FIG. 9F), but if not, the electronic tax form 129 can be partially populated (FIG. 9E) based on what Form W-2 data that has been confirmed or is known with sufficient confidence (FIG. 9E). The preparer may be prompted to fill in other fields that have not been populated. Otherwise, if there is not electronic import available (data store 117 does not include data for the entered or determined EIN), then the electronic tax form 154c can be populated with results 161 of image processing 160 or imaging processing results 161 meeting minimum confidence levels (FIG. 9E). The tax return preparation application 150 can then proceed to the next topic or next tax document 129 (FIG. 9F), and the process may repeat for other tax documents 129.

Figure 10:
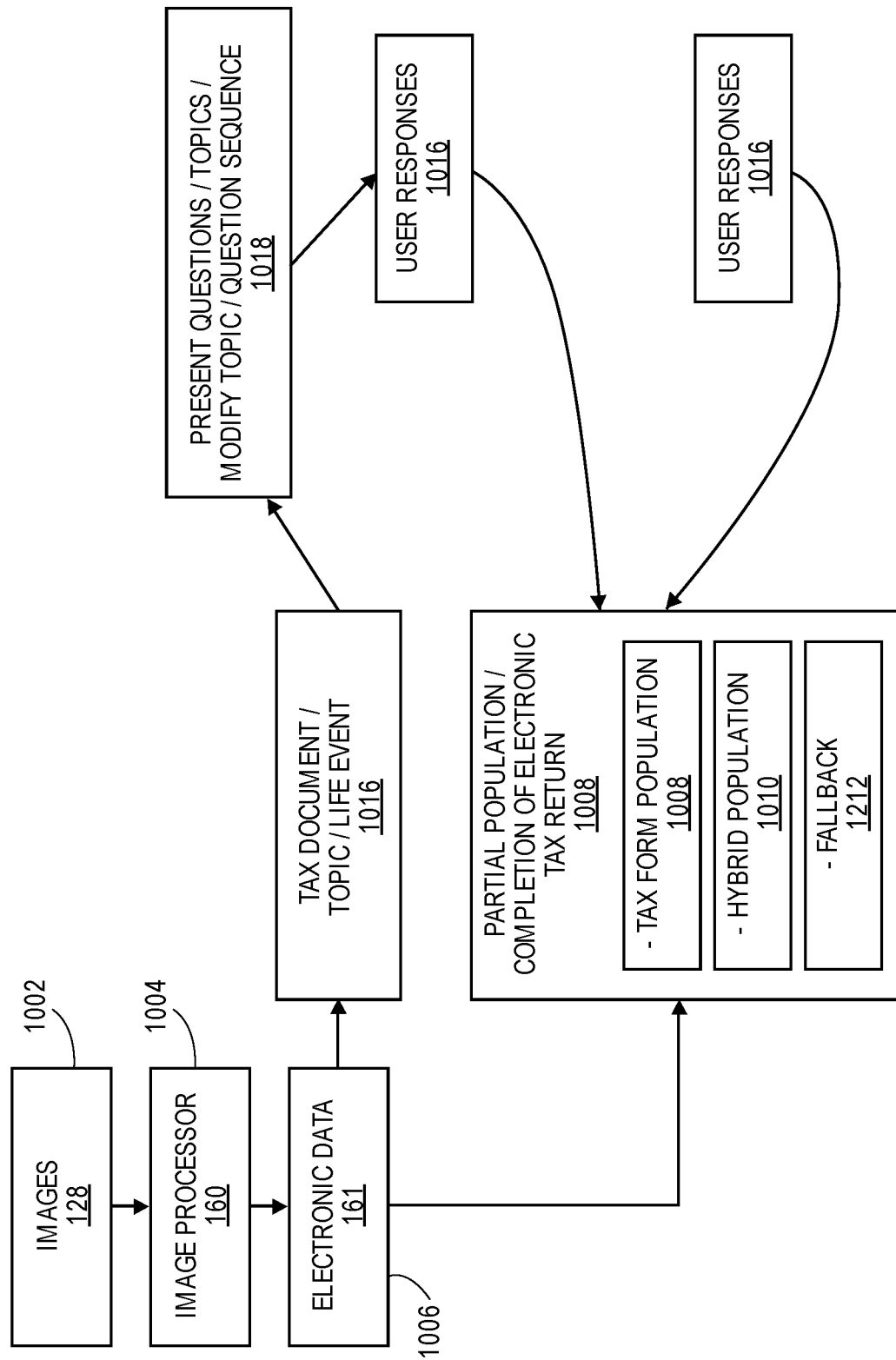
FIG. 10 depicts how embodiments involving image based hybrid population and fallback mechanisms may also involve image-based life event detection and modifications to a tax return preparation experience.

Referring to FIG. 10, another embodiment involves how electronic tax return 151c preparation is initiated or begins with acquiring images 128 of tax documents 129, or starting with documents 129, rather than starting by entering data into a field of an interview screen or electronic import. Embodiments for starting with images 128 or starting with documents 129 may be utilized independently of embodiments described above involving hybrid population 170 and fallback 171 mechanisms, or in combination with such mechanisms. For example, a preparer may begin preparation of an electronic tax return 151c by acquiring images of five different tax documents 129a-e. Some or all of these tax document images 128a-e may be usable with hybrid population 170 and fallback 171 embodiments.

As shown in FIG. 10, a preparer launches a camera 126 of a mobile communication device 120 to acquire images 128 of different tax documents 129 (1002), which are transformed by image processor 160 into electronic data 161 (1006). Beginning with tax document imaging 160 can be utilized in different ways depending on the resulting electronic tax data. For example, as shown in FIG. 10, the electronic tax data 161 may mapped to fields of one or more electronic tax forms 154c or corresponding interview screens 152 to populate one or more electronic tax forms (1008), and embodiments involving hybrid population (1010) and fallback rules (1012) may also be utilized for population by a combination of electronic data determined by image processing 161 and retrieved from the data store 117 and populated by higher confidence and more reliable electronic import, thus reducing errors and computing resources for correcting and processing same. This processing may complete or partially complete the electronic tax return (1014) and user input (1016) can be requested as needed to complete an electronic tax form 154c for that topic or related topics.

Embodiments that involve starting with tax document imaging 160 may also be utilized to identify other tax topics or electronic tax forms 154c (1016) that may be required or must be completed, e.g., tax topics that represent "life events" experienced by the taxpayer, in response to with the tax return preparation application 150 generates an interview screen 152 with questions or fields for the identified topic (1018), and the user's responses are then used to populate at least a portion of an electronic tax form 154c. Thus, life event detection and identification of topics and presentation of corresponding interview screens 152 may be based on ad hoc imaging 160 of tax documents 129, thus modifying the usual manner in which tax return application 150 presents interview screens 152 to a taxpayer according to a pre-determined, programmed sequence. Embodiments may provide for life event or new topic identification based on image processing 160 alone or based on image processing 160 and a prior year electronic tax return 151p. When the tax return preparation application 150 for a current year (e.g., 2016) is first launched, the taxpayer may identify an electronic tax return for a prior year (2015) 151p and certain data 154p from that 2015 electronic tax return is used to populate certain fields in the current 2016 electronic tax return 151c. The user may then being taxpayer entry of data by imaging various documents.

One of the tax documents 129 that is imaged may be a mortgage interest statement for 2016 for a house purchased in 2016 (and thus not reflected in the 2015 electronic tax return 151p). The tax return preparation application 150 determines that the taxpayer has experienced a life event in the form of purchasing a home and identifies other topics or questions that may be relevant to the taxpayer based on this determination. For example, other topics or questions may relate to property taxes, energy tax credits for energy efficient home repairs, whether the taxpayer moved, had a new job starting in 2016, etc. Thus, the user experience as reflected in the interview screens 152 and topics therein that are presented to the user is fluid and can change based on results of image processing 160, with or without reference to a prior year electronic tax return 151p. FIGS. 11-15 illustrate one manner in which "start with imaging tax documents" embodiments can be implemented, which may also involve image-based life event detection.

Figure 11:
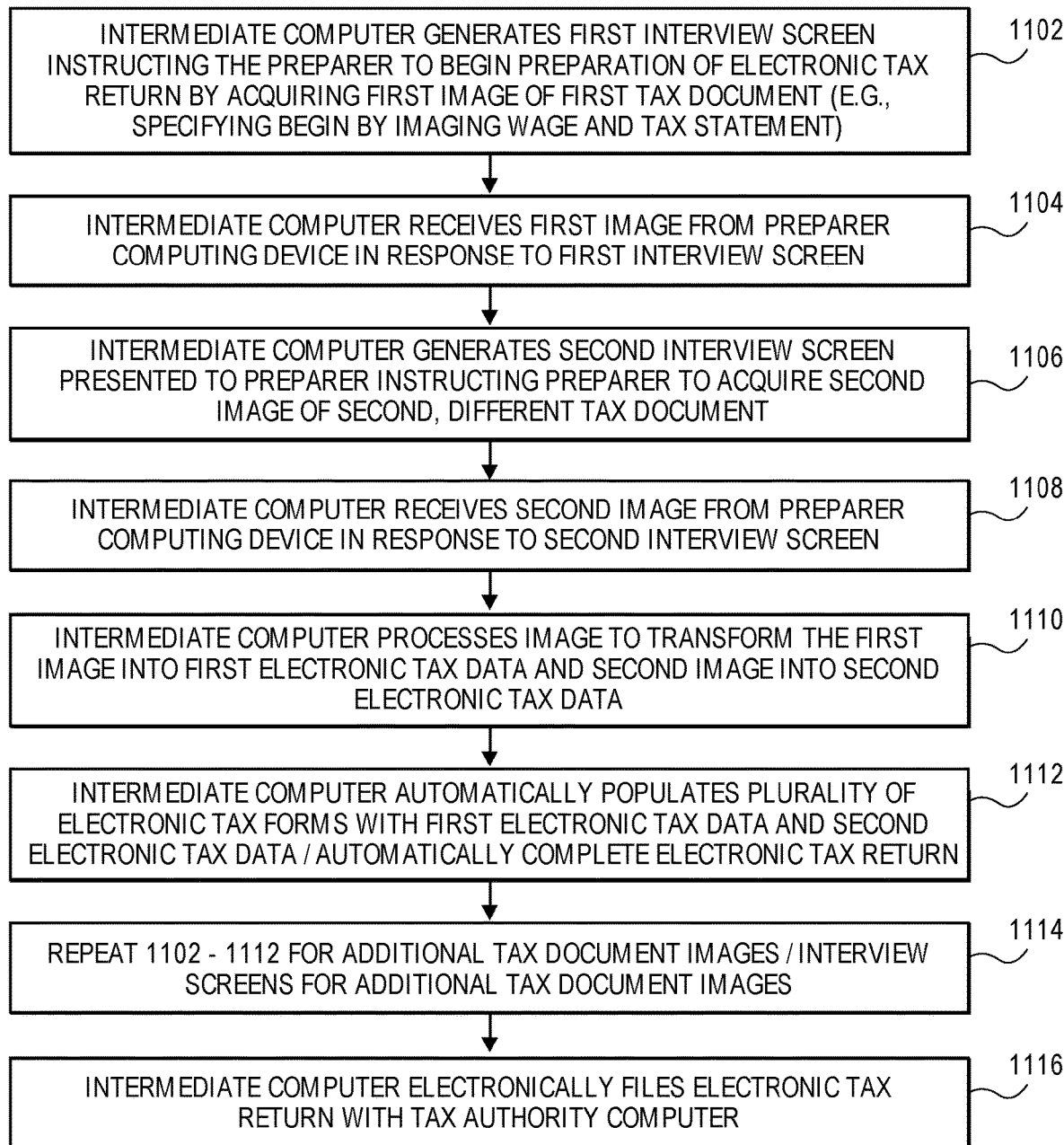
FIG. 11 is a flow diagram illustrating tax document imaging in response to interview screen instructions and image-based preparation of an electronic tax return.
Figure 12A:
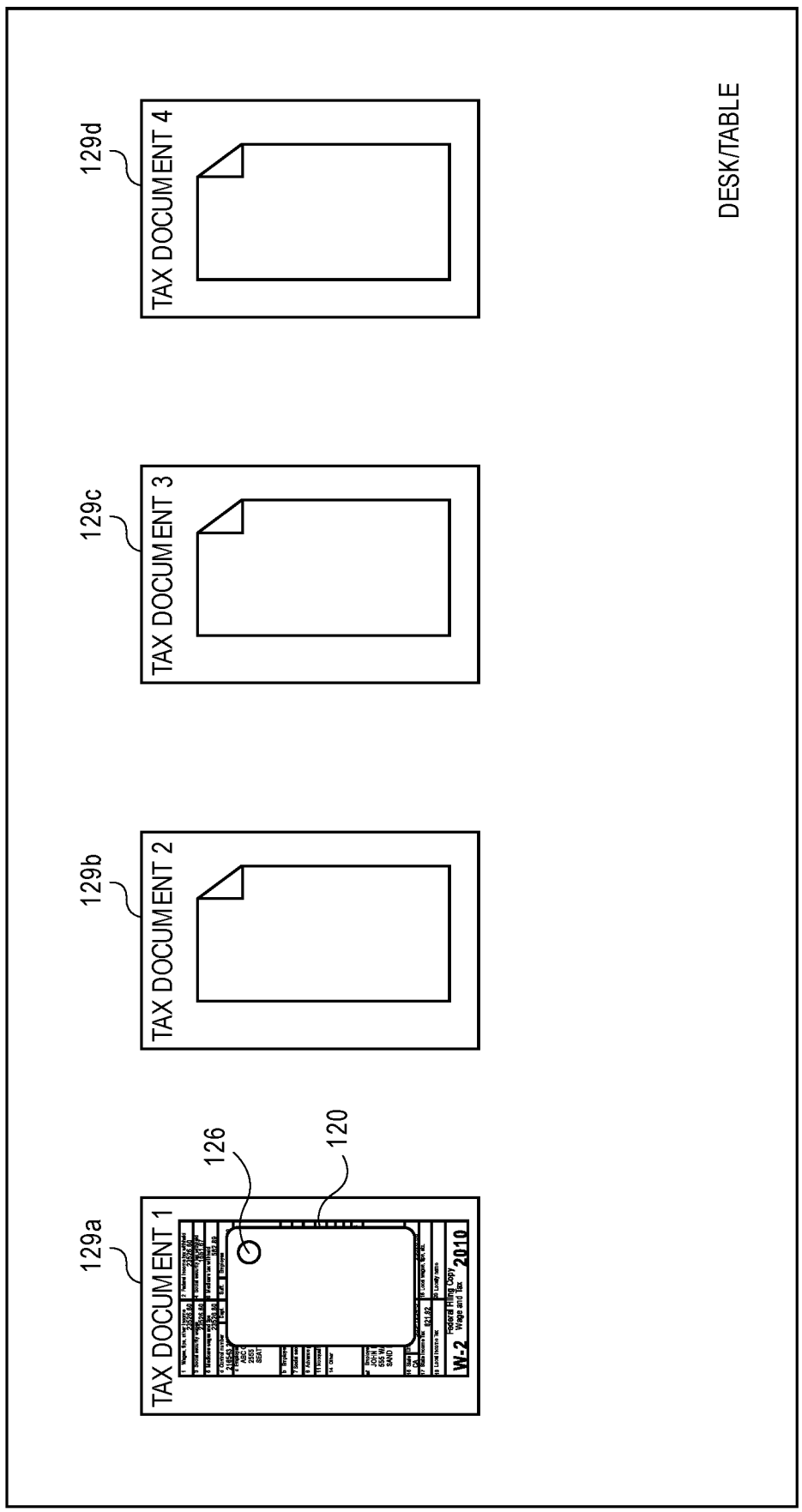
FIGS. 12A-D illustrate another embodiment involving beginning preparation of an electronic tax return by tax document imaging and continuous, uninterrupted imaging of tax documents.
Figure 12B:
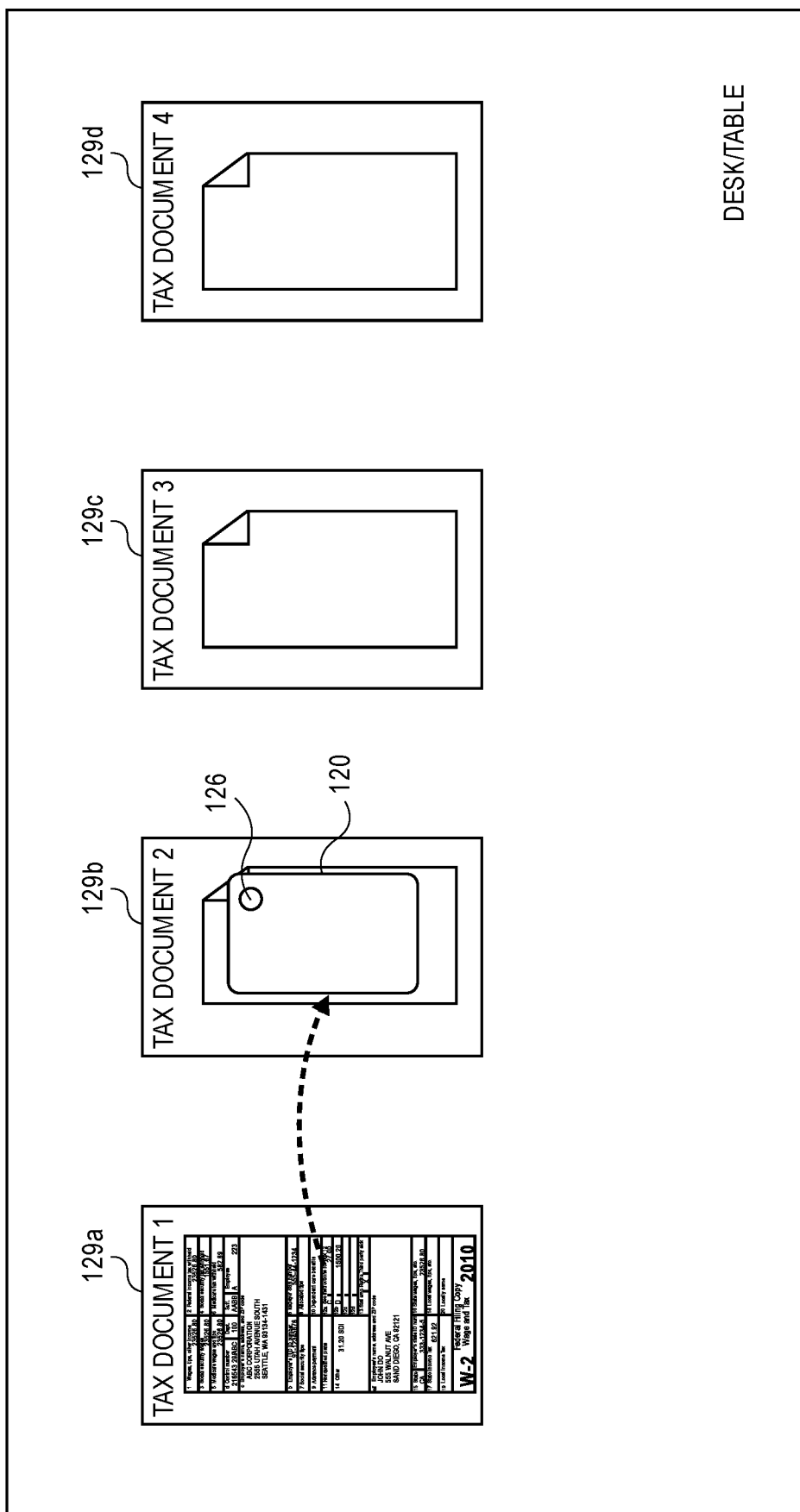
Figure 12C:
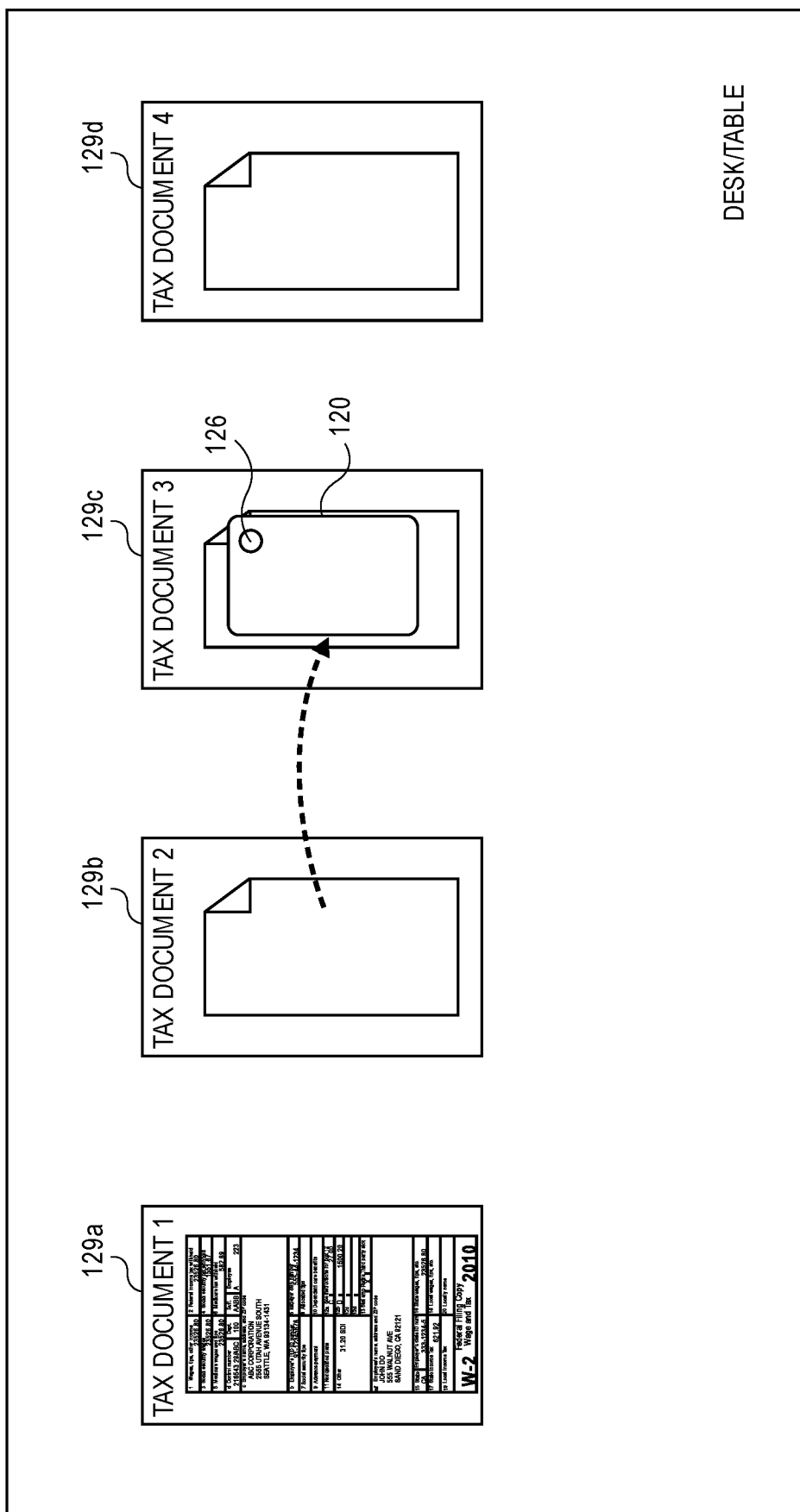
Figure 12D:
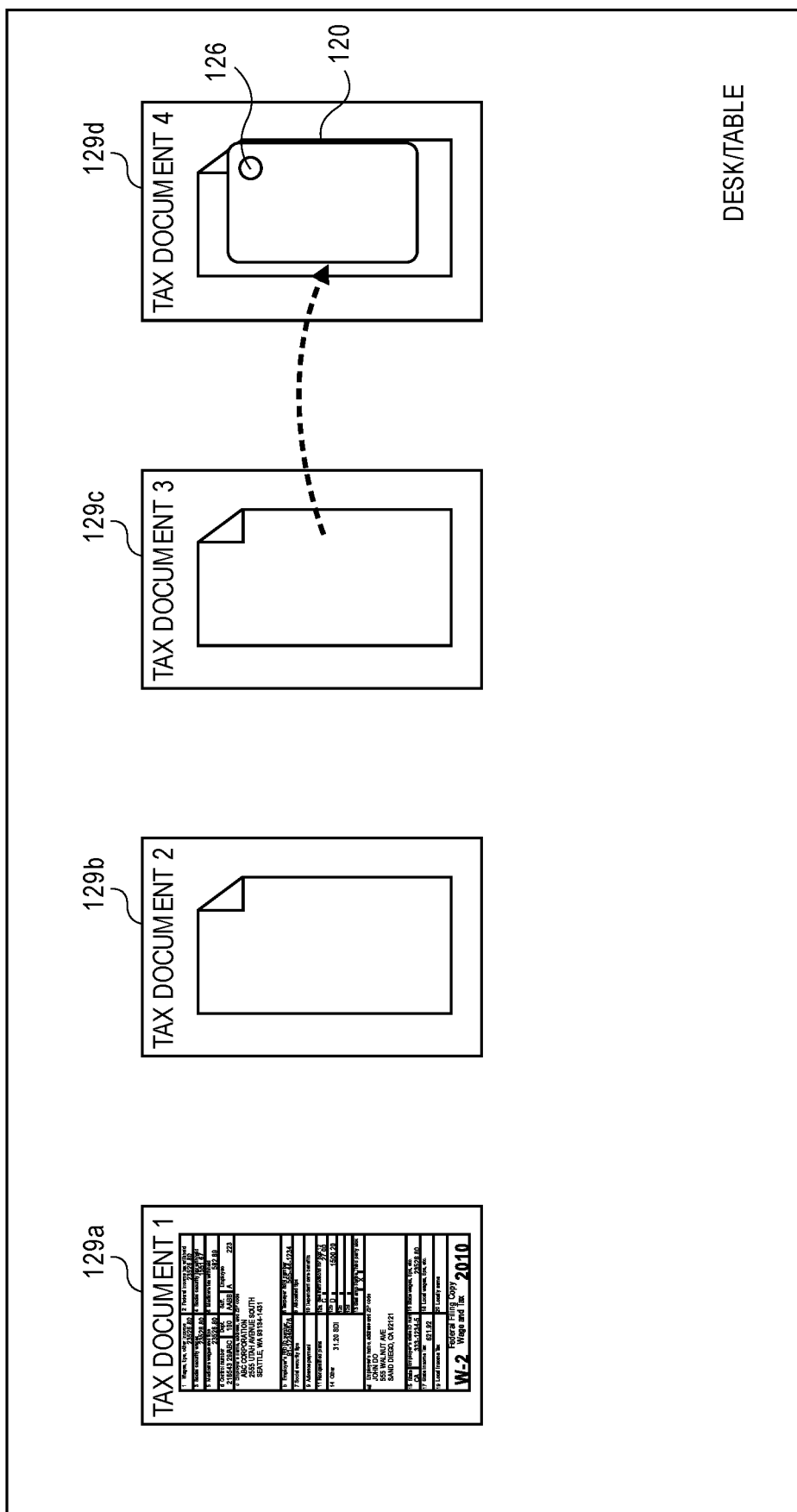

Referring to FIG. 11, at 1102, the taxpayer launches or accesses the tax return preparation application 150 using the computing device 120 and the tax return preparation application 150 generates a first interview screen 152a that is presented to the taxpayer through the display 123. The first interview screen 152a instructs the taxpayer or provides the taxpayer with the option to begin entry of data by tax document imaging 160, and in certain embodiments, the taxpayer is instructed to begin by imaging 160 a wage and tax statement such as Form W2. In certain other embodiments, the user identifies or confirms a prior year electronic tax return 151p, and data of the prior year electronic tax return 151p is imported into certain fields of the current year tax return 151c, and the taxpayer then begins entry of data by imaging tax documents 129.

Continuing with 1104, the camera 126 of the mobile communication device 120 is activated by the taxpayer and positioned to acquire a first image 128a of a first tax document 129a, which is transmitted from the mobile communication device 120 through the network 140a to the intermediate computer 110. At 1106, the tax return preparation application 150 generates a second interview screen 152b that is presented to the taxpayer through the display 123 and instructs the taxpayer to acquire an image 161b of a second, different tax document 129b, and at 1108, the acquired image 161b is transmitted form the taxpayer's mobile communication device 120 through the network 140a to the intermediate computer 110 at 1108.

Referring to FIGS. 12A-D, image acquisition may continue for each tax document 129 that is available to the taxpayer. FIGS. 12A-D illustrate an image acquisition sequence during which the user positioning the mobile communication device 120 over the first document 129*a*, acquiring an image 128*a* of the first document 129*a* in response to the first interview screen 152*a*, moving the mobile communication device 120 over to the second tax document 129*b*, acquiring an image 128*b* of the second tax document 129*b* in response to the second interview screen 152*b*, and so on for each tax document 129*n* and interview screen 129*n*. In another embodiment, the tax return preparation application 150 is configured so that a single interview screen 152 is generated for instructions to image multiple documents 129 rather than separate interview screens 152 being generated for respective imaging of respective individual documents 129 so that the user can image a first tax document 129*a*, image the next tax document 129*b*, image the next tax document 129*c*, and so on in an uninterrupted and continuous manner. The preparer can then indicate that tax document imaging is completed by selecting a user interface element of the interview screen 152 to indicate that imaging has been completed.

Referring again to FIG. 11, the intermediate computer 110 processes the first image 128*a* to transform the first image 128*a* into first electronic tax data 161*a* and processes the second image 128*b* to transform the second image 128*b* into second electronic tax data 161*b*. Embodiments may involve image processing 160 being executed while an interview screen 152 instructing the preparer regarding image acquisition is displayed such that image processing and user interaction or image acquisition can be executed in parallel, and image processing can be executed in the background during user interactions with the tax return preparation application 150.

At 1112, the intermediate computer 110, by the tax return preparation application 150, automatically populates plurality of electronic tax forms 154*c* with first electronic tax data 161*a* and second (or other) electronic tax data 161*b*, and at 1114, processing described above is repeated for additional images 128 and additional interview screens 152 (if utilized). At 1116, after the electronic tax return 151*c* has been completed, the electronic tax return 151*c* can be submitted to a computer of a tax authority, e.g., the electronically filed by the intermediate computer 110, which is in communication with the tax authority computer through a network.

The result of image processing 160 can complete all required electronic tax forms 154*c* to complete the electronic tax return 151*c*. Thus, with embodiments, an electronic tax return 151*c* can be completed, for example, by the touch of a screen 123 of a user's mobile communication device 120 without having to enter or import any other tax return data.

Figure 13A:
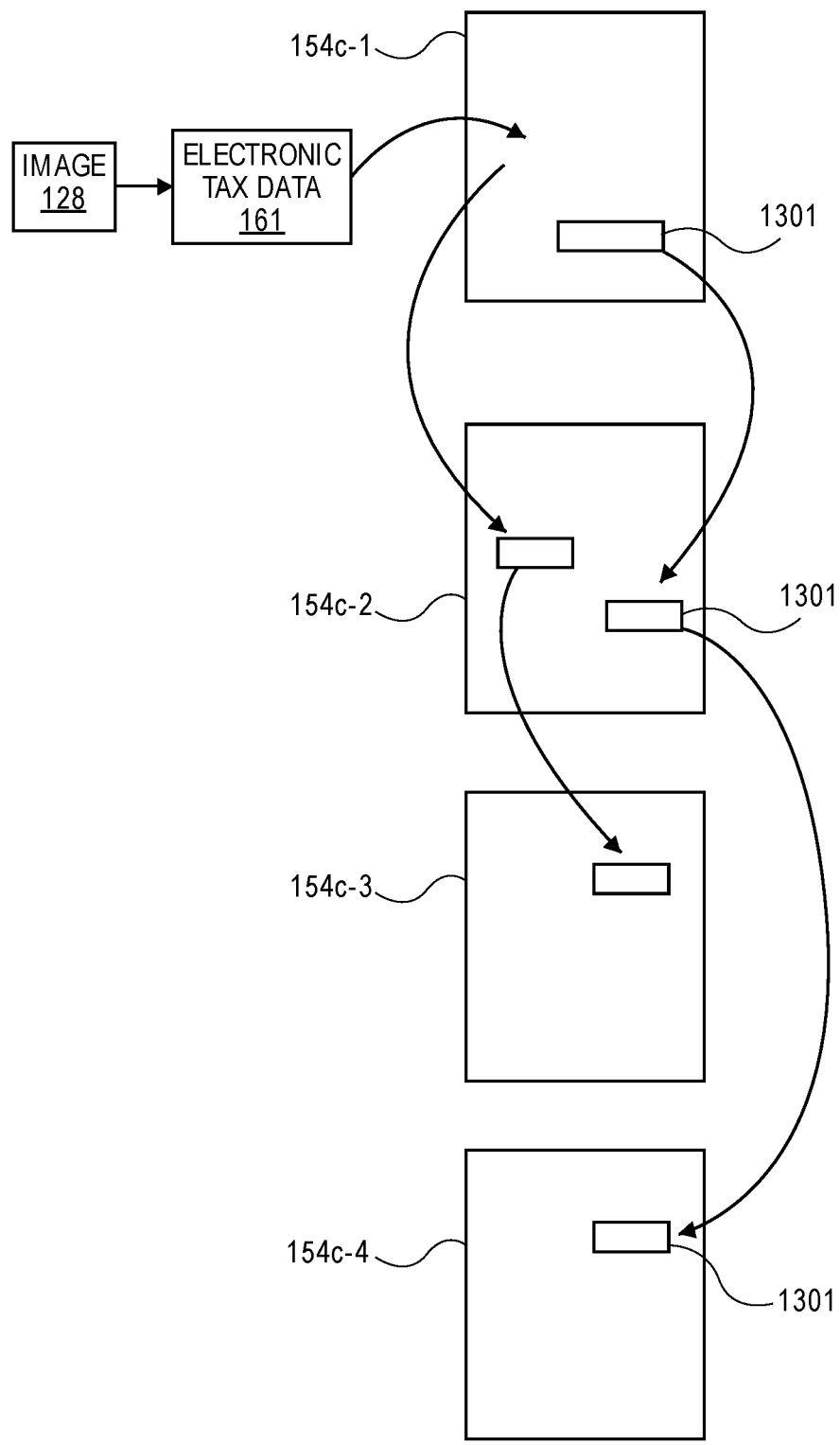
FIGS. 13A-C depict how tax document imaging results may be utilized to populate one or more electronic tax forms based on tax document imaging and/or image processing triggered hybrid population and/or fallback mechanisms and complete and file an electronic tax return prepared utilizing embodiments.
Figure 13B:
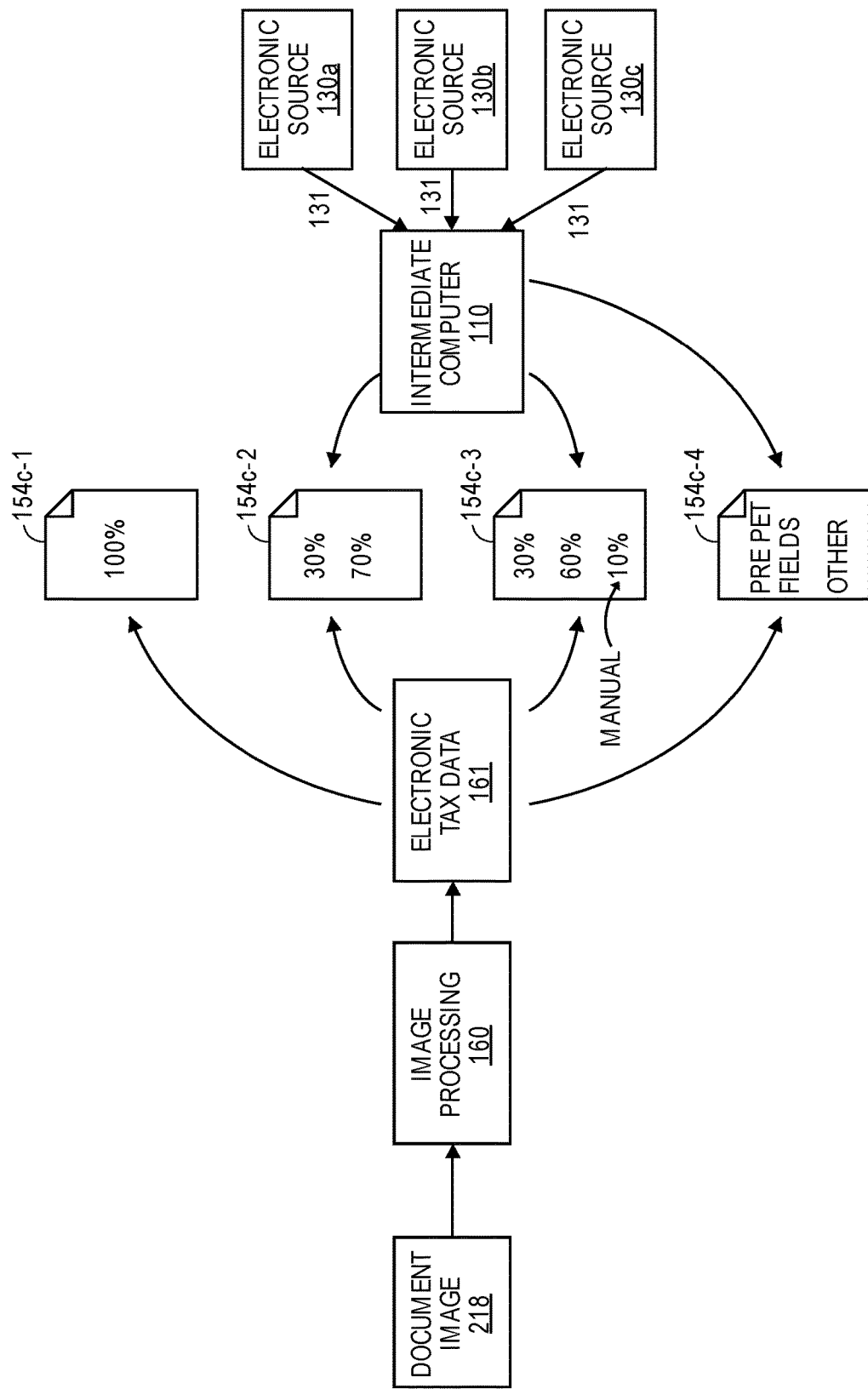

For example, referring to FIGS. 13A-B, the results of image processing 161 may be population of at least a portion of a single electronic tax form 154*c* or the same data 161 may be applicable to multiple electronic tax forms 154*c* forms such that multiple electronic tax forms can be at least partially populated. One or more electronic tax forms 154*c* may be partially completed and one or more electronic tax forms 154*c* may be completed. Further, as shown in FIG. 13A, certain fields of certain electronic tax forms 154*c* may be linked or associated with each other such that image processing results 161 used to populate one field are also automatically copied to an associated field. For example, FIG. 13A generally illustrates that three different electronic tax forms 154*c*-1, 154*c*-2 and 154*c*-4 include a common field 1301 and are linked together and populated with the same data. FIG. 13B illustrates various degrees of automatic population based on image processing results 161, e.g., electronic tax document 154*c*-1 has been completed using only image processing results 161, but other electronic tax documents 154*c*-2, 154*c*-3 and 154*c*-4 are partially completed with image processing results 161.

FIG. 13B further illustrates that fields can be populated with image processing results 161 and/or with electronic data 131 retrieved from the data store 117 and previously aggregated from respective electronic sources 130 and/or from electronic sources 130 during preparation of the electronic tax return 151*c*, e.g., as a result of hybrid population 170 such as image processing triggered electronic import or failure thereof, which triggers a fallback mechanism 171. For example, FIG. 13B illustrates an electronic tax form 154*c*-1 that is completed with only image processing results 161 and other electronic tax forms 154*c*-2, 154*c*-3 and 154*c*-4 that are completed with a combination of image processing results 161 and image processing triggered electronic import 170 (and fallback 171 as needed), and if necessary, manual data entry (as in electronic tax form 154*c*-3). FIG. 13B also illustrates that when image processing triggered electronic import 170 is utilized, the electronic import data 1312 that is identified based on image processing 160 can be utilized to populate a larger portion of an electronic tax form 154*c* and electronic tax return 151*c* than image processing results 161 (e.g., 70% electronic import vs. 30% image processing results). Thus, embodiments can utilize image processing 160 on a limited basis and instead utilize more accurate and reliable electronic data 131 retrieved from the data store 117 or directly from an electronic source 130 during preparation of the electronic tax return 151*c*, thus reducing the impact of potential image processing 160 errors and limitations of image processing 160.

Figure 13C:
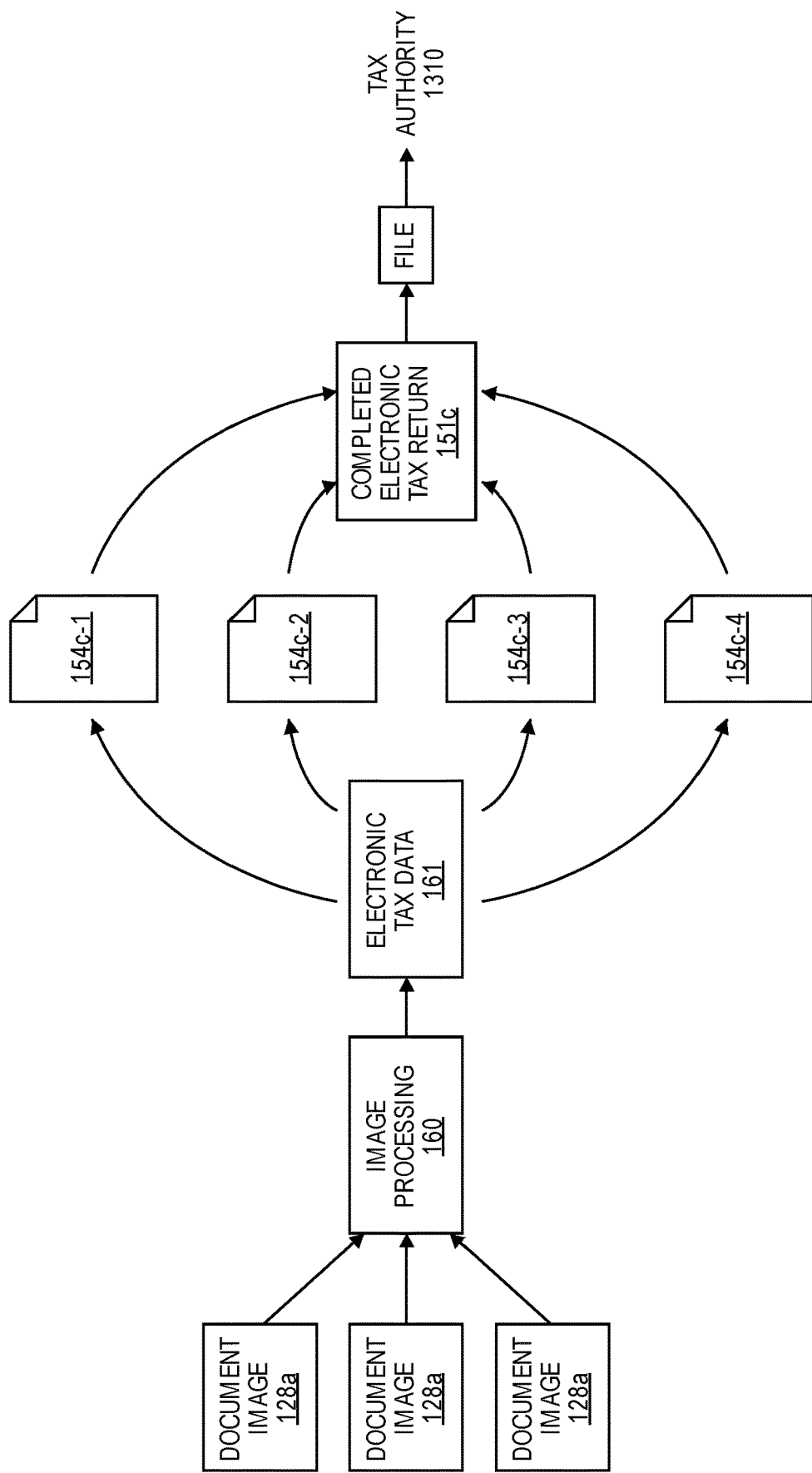

Referring to FIG. 13C, embodiments provide for automatic completion of the electronic tax return 151*c* based on image processing 160 alone, a combination of image processing 160 and image processing triggered electronic import or hybrid population 170*t*, a combination of image processing 160, image processing triggered electronic import or hybrid population 170 and a fallback mechanism 171 for when image processing triggered electronic import 170 was not initially successful, and based only on image processing triggered electronic import population 170 and/or a fallback mechanism 171. In the latter combination, or with using hybrid population 170 or fallback 171 individually, tax documents 129 are imaged, but the resulting electronic data 161 derived from image processing 160 is not utilized to actually populate any portion of an electronic tax form 154 and instead, is utilized to identify another electronic source 130 or data within the data store 117 for population. Thus, embodiments provide for automatic completion of electronic tax form 154 or the electronic tax return 151*c* itself with minimal user interaction, e.g., by contacting a touchscreen 123 to take pictures of tax documents 129, while the tax return preparation application 150 executes various backend processing that is not visible to or accessible by the preparer to prepare the electronic tax return 151*c*, and the preparer does not perform, and is not able to perform, various tax return preparation application 150 actions given the computer centric an imaging processing based operation of embodiments.

Thus, embodiments not only provide for automated, mobile communication device 120 based and ad hoc imaging of tax documents 129 to begin and automatically partially prepare or complete an electronic tax return 151*c*, but embodiments provide various technical improvements to known tax return preparation applications, preparation of electronic tax returns, networked computing systems, electronic data aggregation systems, and mobile communication device applications. Embodiments also provide g improvements to the functioning of a computing device executing the tax return preparation application 150 as a result of embodiments at least reducing computing resources including memory, processor and network or communication resources, e.g., when using an on-line tax return preparation application in order to communicate with the mobile communication device and process various user interactions since the amount of user interaction and back and forth interactions typically involved in preparation an electronic tax return using known tax return preparation applications. Instead, a the taxpayer can prepare an electronic tax return by the touch of a screen or other input element to activate the camera, and the tax return preparation application is configured to take over preparation of the electronic tax return based on image transformation, which also transforms the manner in which electronic tax returns are prepared and the user interactions and experience during preparation of the electronic tax return.

Figure 14:
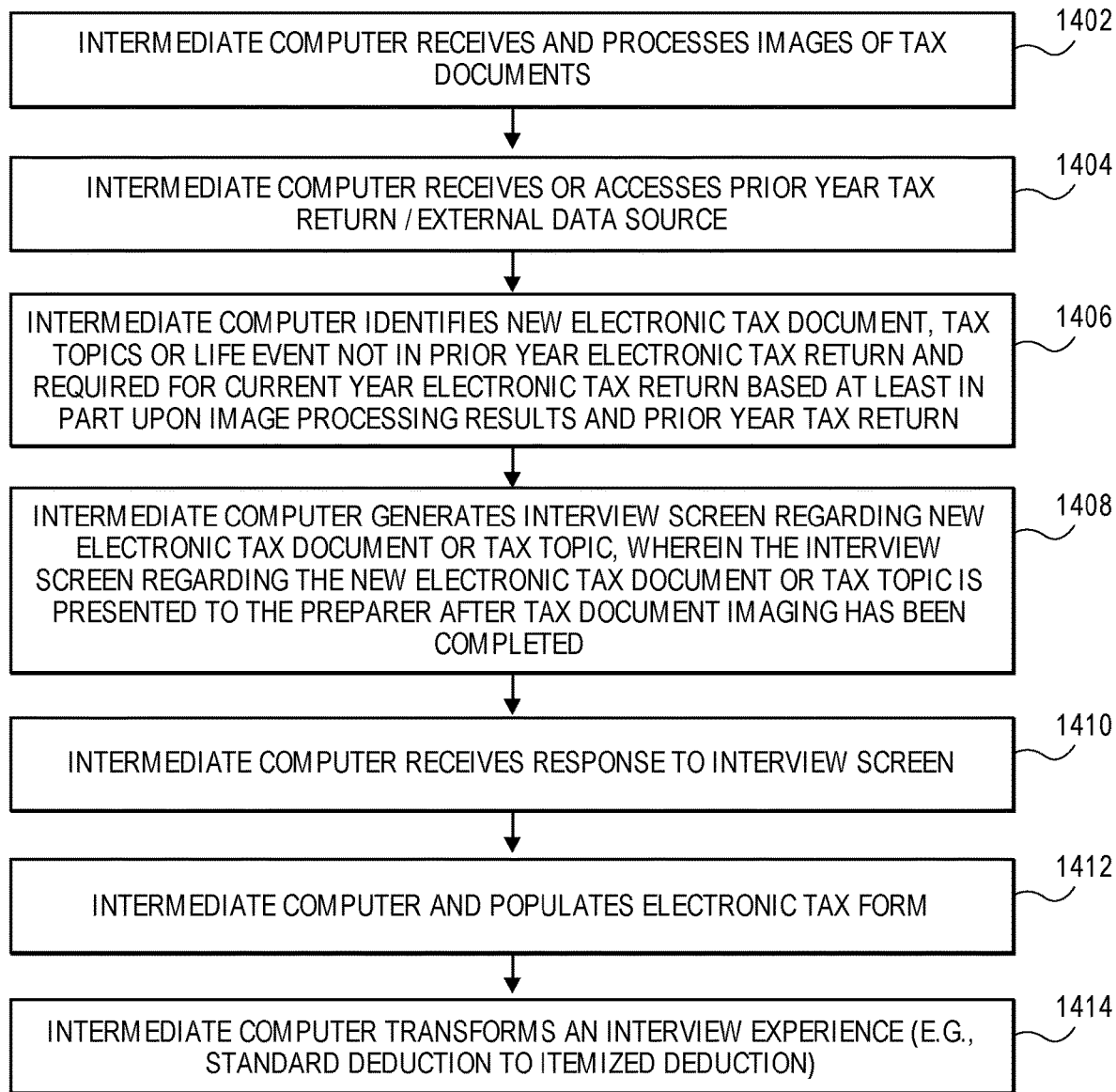
FIG. 14 is a flow diagram illustrating a method of processing tax document images and utilizing rules to detect life events applicable to the electronic tax return.
Figure 15:
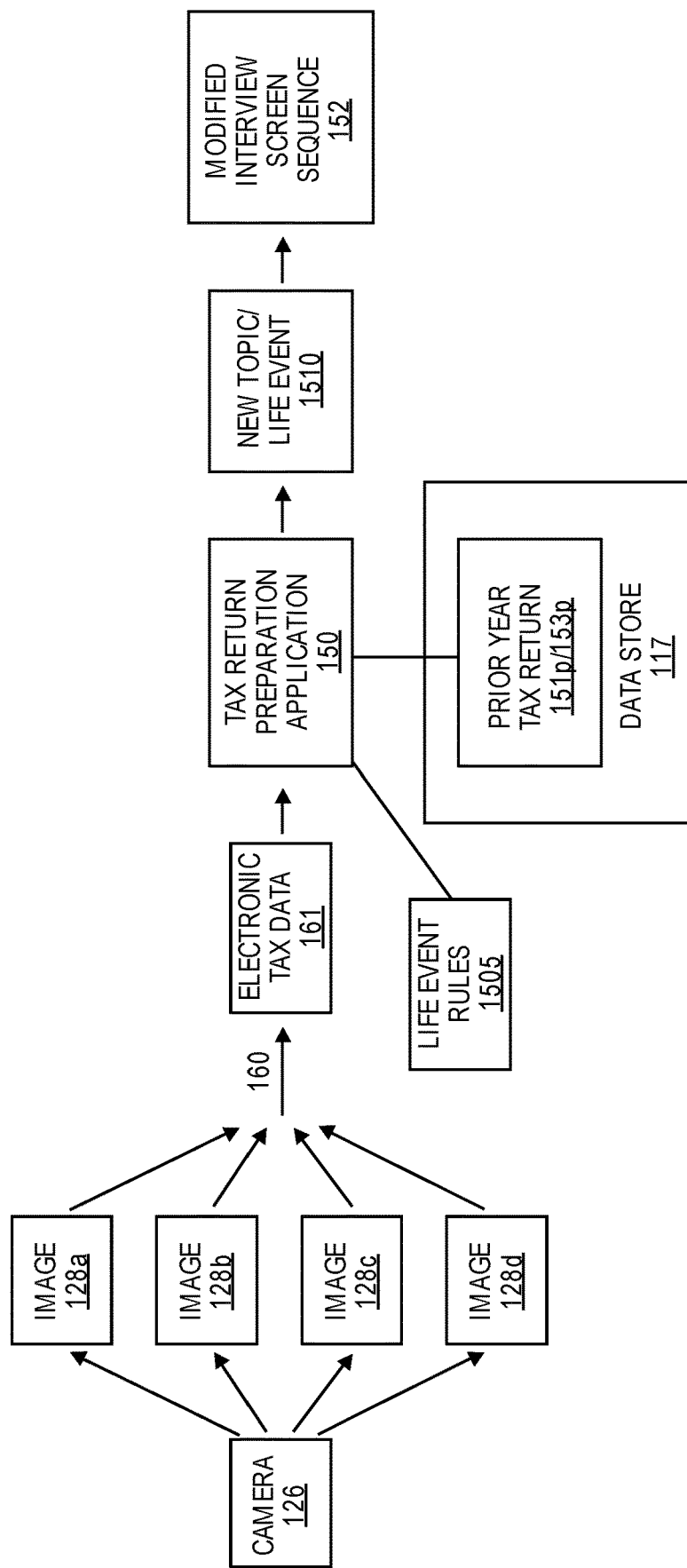
FIG. 15 is a system flow diagram further illustrating use of life event detection rules according to one embodiment.

Referring to FIGS. 14-15, embodiments may also involve preparation of electronic tax return 151*c* and/or identification of tax topics or electronic tax forms 154*c* that are required to be completed or that may apply to the taxpayer based on the image processing results 161 and/or image processing triggered electronic import or hybrid population 170/fallback 171. According to one embodiment, this involves identification of preparer life events and transformation of the user experience and interview screen 152 sequences presented to the preparer as a result of the imaged tax documents 129 and rules that are triggered based on the image processing results 151 and a prior electronic tax return 151*p*.

At 1402, the intermediate computer 110 receives and processes images 128 of tax documents 129, and at 1404, receives or accesses prior year tax return 151*p* stored in the data store 117 or another source such as the preparer's computing device 120. At 1406, based at least in part upon the image processing results 161, the intermediate computer 110, by the tax return preparation application 150, identifies a new electronic tax form 154*c*, tax topic or life event 1510 that is not part of or not reflected within the prior year electronic tax return 151*p*. Examples of life events include, for example, purchasing a house or other change of property ownership, moving to a different city or state, a change of employment, a change of family status (e.g., marital status change, having children). The tax return preparation application 150 can be configured to present certain electronic tax forms 154*c* or groups thereof upon detecting a life event to potential life event based on image processing results or image processing triggered electronic import 170 and/or fallback 171.

For example, imaged tax documents 129 may include a mortgage interest statement for 2016 for a house purchased in 2016 (and not reflected in the 2015 electronic tax return 151*p*). The tax return preparation application 150 determines which life event rules 1505 are applicable to the imaged tax documents 129, and based on whether certain rule 1505 conditions are satisfied, determines that the taxpayer has experienced a life event 1510 in the form of purchasing a home. The tax return preparation application 1510, based on the life event rules 1505, identifies other topics or questions that may be relevant to the taxpayer based on the result of execution of an applicable rule 1505 such as property taxes, energy tax credits for energy efficient home repairs, whether the taxpayer moved, had a new job starting in 2016, etc., and interview screens 152 for these new electronic tax documents 154*c* or topics are selected for presentation to the preparer.

For example, in one embodiment, a life event rule 1505 specifies that when an imaged document 129 is a mortgage interest document and the prior year electronic tax return 151*p* does not include a mortgage interest document, then upon satisfying these conditions, the tax return preparation application 150 is triggered to present interview screens 152 containing questions or topics pertaining to property tax, energy credits, rental income and deductions for moving or change of location. Such a life event rule 1505 may also specify that the interview screens 152 should also include questions about personal information such as the person's address or residence for personal information. In another embodiment, a life event rule 1505 specifies that when an imaged document 129 is a Form W2 or other wage and tax statement, and the prior year electronic tax return 151*p* either does not include a Form W2 or identifies a different employer or EIN, then upon satisfying these conditions, the tax return preparation application 150 is triggered to present interview screens 152 containing questions or topics pertaining to a change of employment, which may involve not only the new employer and new employer information, but also whether the preparer moved or has a new retirement plan, or a roll over from a prior retirement plan. The tax return preparation application 150 can be programmed with various such life event rules 1505 to cover various life events 1510 and consequences of life events 1510 and to modify the interview screen 152 presentation and user experience accordingly as a result of ad hoc imaging of tax documents 129.

At 1408, life events 1510 detected by the tax return preparation application 150 result in presentation of interview screens 152 or groups or templates thereof, based on the detected life event 1510 or potential life event 1510. At 1410, the intermediate computer 110, by the tax return preparation application 150 receives responses to the identified questions or topics concerning the life event 1510, and at 1412, populates electronic tax forms 154*c* accordingly.

Thus, embodiments provide for transforming user experiences and operation of the tax return preparation application 150 since the tax return preparation application 150 may have initially been configured to execute for a standard deduction but then is transformed to generate different interview screens 152 for a potential itemized deductions while providing for a more personalized and customized image-based electronic tax return preparation experience. In addition to smart or intelligent tax return preparation applications 150 providing for correct and more comprehensive electronic tax returns 151*c*, embodiments also at least provide improvements to a computing device executing the tax return preparation application 150 as a result of identifying life events 1510 and addressing the life events 1510 to reduce or minimize other user interactions with the tax return preparation application 150 that may otherwise be required and involve viewing different electronic tax forms 154*c*, searching menus or tax topics, submitting searches or help queries or accessing an on-line chat or assistance service such as Live Community, which assists users of TURBO TAX tax return preparation application.

Figure 16:
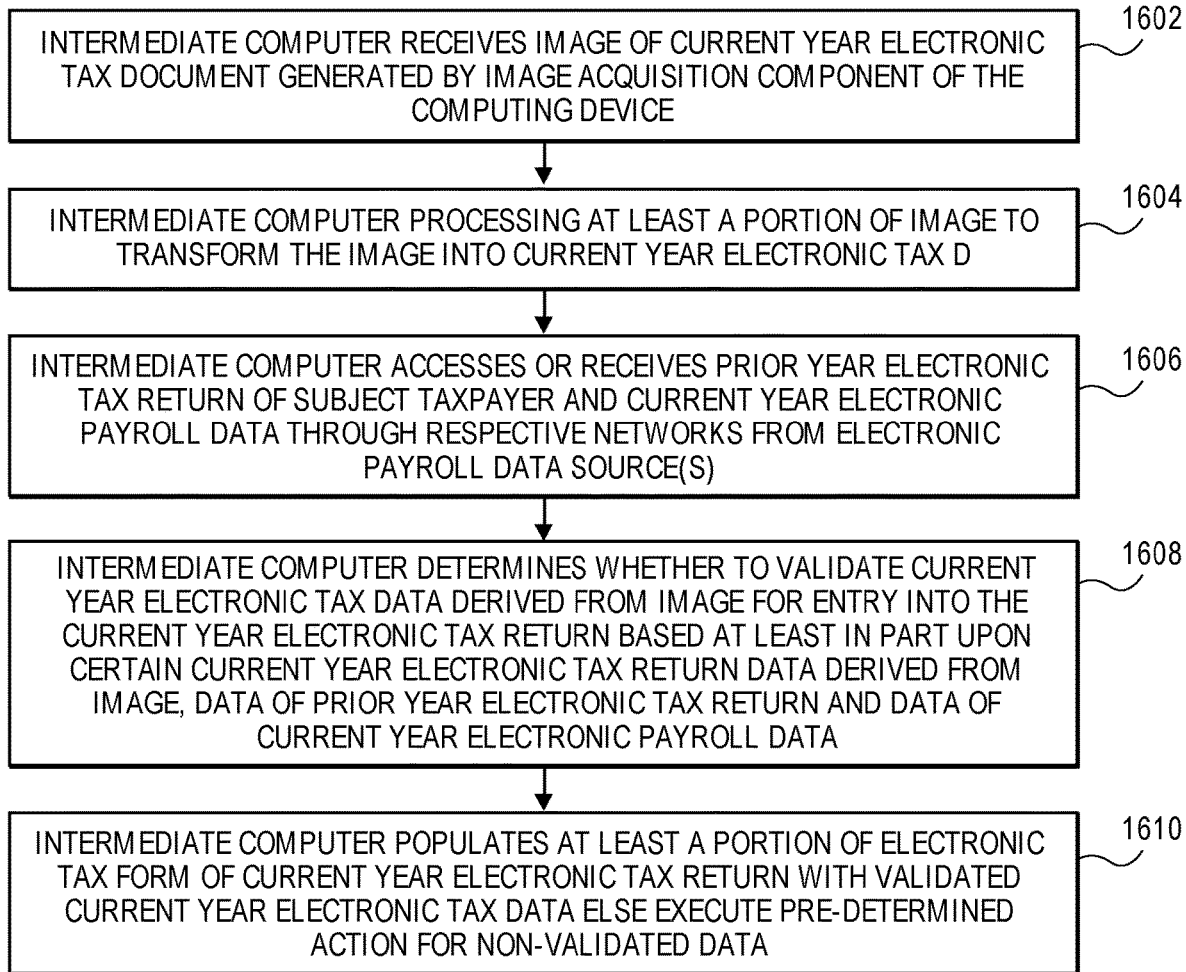
FIG. 16 is a flow diagram illustrating a rule-based method for validating electronic tax return data according to one embodiment.

Referring again to FIG. 3 and with further reference to FIG. 16, another embodiment involves validation or confirmation of electronic tax return data that has been entered into one or more fields of an electronic tax form 154*c* or has been presented to be entered into one or more fields of an electronic tax form 154*cn*. Embodiments may be utilized independently of embodiments described above since embodiments can be utilized for validation or confirmation of electronic tax return data received or determined from various entry or processing methods, or embodiments may be utilized in combination with one or more embodiments described above, e.g., to validate results of processing of images 128 of tax documents 129 or to validate electronic tax return data 131 that was imported by image processing triggered electronic import 170 and/or fallback 171.

Referring to FIG. 16 and as described above in various embodiments, at 1602, the preparer executes a camera 126 of the mobile communication device 120 to acquire an image 128 of a tax document 129, which is received by the intermediate computer 110. At 1604, the intermediate computer 110 processes at least a portion of the image 128 to transform the image 128 into current year electronic tax data 161. At 1606, the intermediate computer 110, by the tax return preparation application 110, accesses the data store 117 or requests to access prior year electronic tax return 151p of the subject taxpayer (e.g., in response to receiving an image 128 or image processing results 161). At 1608, the tax return preparation application 150 determines whether to validate the current year electronic tax data 153c derived from image processing 160 for entry into the electronic tax return 151c (or whether entered data should remain in the electronic tax return 151c) and whether a pre-determined action such as alerting the preparer should be executed in the event that a validation rule has not been satisfied.

According to on embodiment, validation rules involve image processing results 161, data of the prior year electronic tax return 153p and current year electronic payroll data 131a, and may involve different combinations thereof. The tax return preparation application 150, by the validation program 172, may determine that the image processing results 161 can be utilized for an electronic tax form 154c when certain validation rules are satisfied. The current electronic tax return data 153c to be validated may be received or determined by image processing 160 or image processing triggered electronic import 170 and fallback 171 according to embodiments described above, imported from a FMS, or manually entered. Thus, automatic validation by embodiments may be utilized in embodiments that, for example, automatically complete the current year electronic tax return 151c by acquiring images 128 of tax documents 129 and without manual data entry by the user, while reducing processing and correction of errors and associated user interactions with the tax return preparation application, thus reducing computing resources required to prepare, complete and check an electronic tax return 151c.

According to one embodiment, a validation rule specifies that current year electronic tax electronic tax return data 151c is automatically validated when the prior year tax return 151p and the current year payroll data 131a both include the same current year electronic tax data 151c (such as certain personal information, residence, and employer data). However, if the validation program 172 determines that a validation rule is not satisfied, then the tax return preparation application 150 is triggered to alert the preparer through an interview screen 152.

According to another embodiment, a validation rule specifies that current year electronic tax return data 153c is automatically validated when the prior year tax return 151p includes data 153p that matches pre-determined current year electronic tax data 153c, and the current year payroll data 131a includes data that matches the pre-determined current year electronic tax data 153c.

Another validation rule specifies that the current year electronic tax data 153c is not validated when the prior year tax return 151p does not include data matching pre-determined current year electronic tax data 153c, and the current year payroll data 131a does not include data matching the pre-determined current year electronic tax data 153c.

According to yet another embodiment, a validation rule involves the current year payroll data 131a including data matching pre-determined current year electronic tax data 153c but the prior year electronic tax return 151p does not include data matching the pre-determined current year electronic tax data 153c in which case a pre-determination action is executed to address the discrepancy between the current year payroll data 131a and the prior year electronic tax return 151p. For example, the tax return preparation application 150, based on the result generated by the validation program 172, may generate an interview screen 152 including an alert notifying the subject taxpayer of the discrepancy, and the tax return preparation application 150 receives input from the preparer through the interview screen 152 in response to the alert, which is used to determine whether to validate the current year electronic tax data 153c based at least in part upon the received input. According to one embodiment, the tax return preparation application 150 identifies a life event 1510 based at least in part upon the discrepancy and alerts the preparer regarding the detected possible life event 1510. For example, the tax return preparation application 150 may determine that the preparer has experienced a life event 1510 of a change of employment or a move based on a discrepancy between the current year payroll data 131a and the prior year electronic tax return data 151p in the form of the current year payroll data 131a identifying an employer or Form W-2 that was not included in the prior year electronic tax return 151p. The tax return preparation application 150 may also generate an interview screen 152 identifying a list of additional topics or electronic tax forms 154c that need to be addressed in view of the life event 1510.

A further validation rule involves the case when the prior year electronic tax return data 153p includes data that is the same as certain current year electronic tax data 153c, but the current year payroll data 131a does not include data that same data such that there is a discrepancy between the current year payroll data 131a and the prior year electronic tax return data 153c. In response to detecting this discrepancy, the tax return preparation application 150 generates an interview screen 152 including an alert to notify the preparer of the discrepancy and determines whether to validate the current year tax return data 153c based on the preparer's input.

According to another embodiment, the tax return a validation rule involves whether there is a match or discrepancy between whether pre-determined current year electronic tax data 153c matches data of the prior year electronic tax return 151p, whether pre-determined current year electronic tax data 153c matches data of the current year payroll data 131a, and whether data of the prior year electronic tax return 151p matches current year payroll data 131a. Thus, only data satisfying each of the three rule criteria can be validated initially, and the preparer can be alerted regarding any discrepancies.

Embodiments may validate the current year electronic data 153c based on one or multiple validation rules described above. Further, while validation rules are described with reference to the current year electronic data 153c, prior year electronic data 151p, and current year payroll data 131a, embodiments may also involve other electronic sources 130 and combinations of electronic sources 130. For example, validation rules may involve electronic data of a taxpayer's account with a financial institution or brokerage. Accordingly, it will be understood that embodiments of validation rules and specific criteria thereof are provided as illustrative, specific examples of how embodiments may be implemented.

Figure 17:
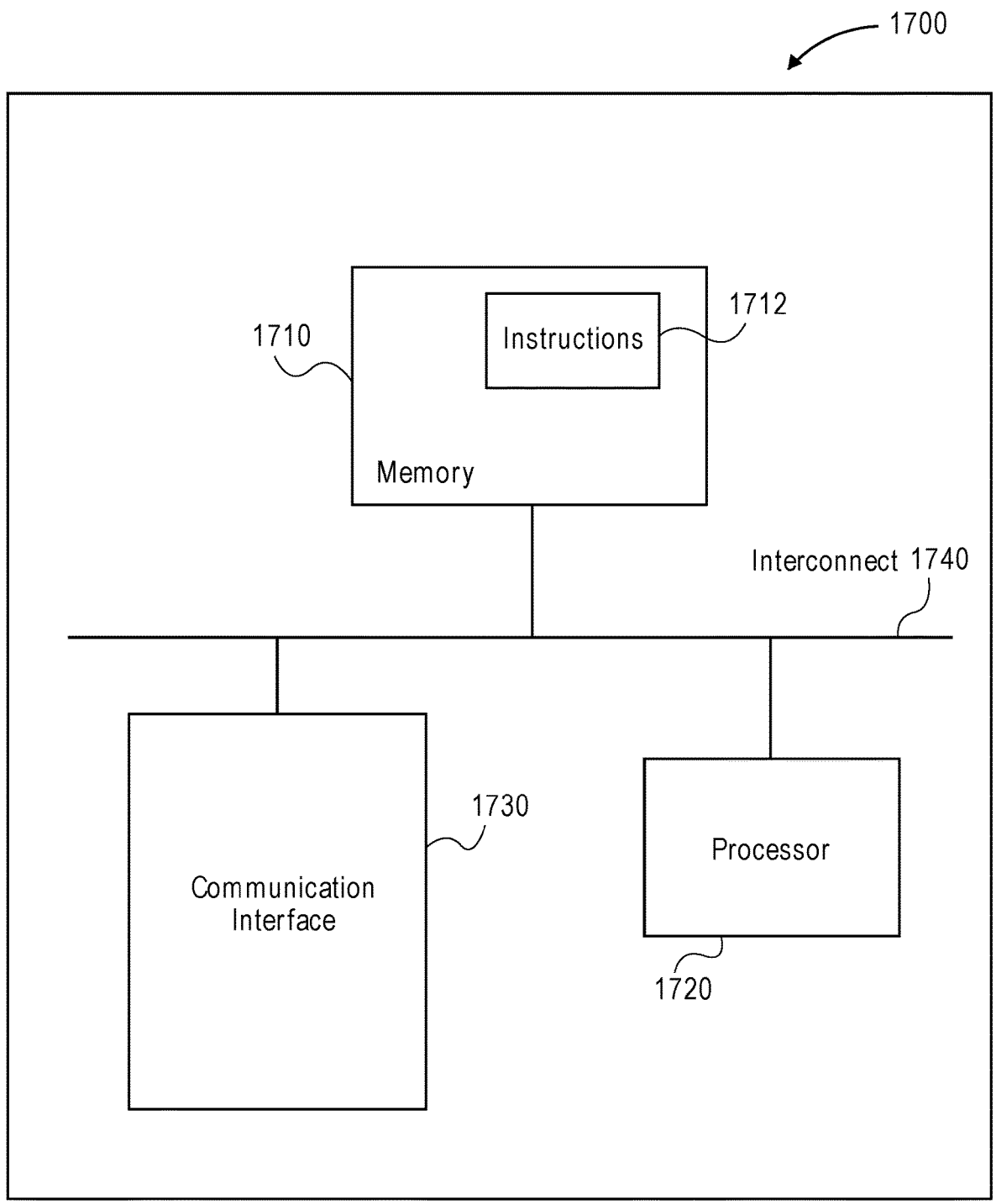
FIG. 17 is a block diagram of components of a computing apparatus or system in which various embodiments may be implemented or that may be utilized to execute embodiments.

FIG. 17 generally illustrates certain components of a computing device 1700 that may be utilized to execute or that may embody components of embodiments. For example, the computing device may include a memory 1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only.

For example, it will be understood that embodiments described herein may be executed independently of other embodiments or in combination with various embodiments during preparation of an electronic tax return. Further, while multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

The invention claimed is:

1. A computer-implemented method, comprising:

an intermediate computer, by execution of computer code by a processor of the intermediate computer, receiving electronic tax data of a plurality of taxpayers including a subject taxpayer through respective networks from respective electronic tax data sources;

the intermediate computer storing the received electronic tax data to a data store;

during preparation of an electronic tax return of the subject taxpayer, the intermediate computer, by execution of a hybrid population program of a tax return preparation application:

generating a first interview screen that is presented to the subject taxpayer through a display of a computing device of the subject taxpayer, the first interview screen requesting first input by the subject taxpayer to acquire an image of a tax document, receiving the image from the computing device and generated by an image acquisition component of the computing device in response to the first interview screen, processing at least a portion of the image by masking out other portions of the image to transform the received image into electronic tax data, validating the electronic tax data processed from the image by a validation program that utilizes at least one of electronic tax data obtained from the image processing, prior year's tax return data, payroll data, manually entered tax data, or imported tax data, the validation program reporting any errors via the display of the computing device of the subject taxpayer, determining that the electronic tax data includes a first set of electronic tax data for the plurality of pre-determined fields, obtaining the first set of electronic tax data by using an optical character recognition (OCR) technique on the image, automatically populating the pre-determined fields of the electronic tax form with the first set of electronic tax data determining an electronic source using the OCR technique, obtaining a second set of electronic tax return data from the electronic tax data source, wherein the second set includes additional data about the subject taxpayer than the first set, automatically performing an OCR accuracy check on the first set of electronic tax data by comparing with the second set to determine discrepancies in one of more fields of the electronic tax form, the fields being populated based on the first set of electronic tax data, automatically importing data from the second set of electronic tax return data to populate the discrepancy fields of the electronic tax form, and determining that the electronic tax data does not include the first set of electronic tax data for the plurality of pre-determined fields, the intermediate computer, by execution of the tax return preparation application, generating a second interview screen presented to the subject taxpayer through the computing device display, the second interview screen requesting second input from the subject taxpayer regarding the first set of electronic tax data, and in response to determining that the second input confirms the electronic tax data such that the electronic tax data does not include the first set of electronic tax data, the intermediate computer does not populate the additional fields with electronic tax return data imported from the data store.

2. The computer-implemented method of claim 1, wherein the intermediate computer, by the tax return preparation application, requests the subject taxpayer to manually enter electronic tax return data in response to the second input confirming that the electronic tax data do not include the first set of electronic tax data.

3. The computer-implemented method of claim 1, in response to the second input correcting or changing the electronic tax data, further comprising the intermediate computer, by the tax return preparation application, determining whether the electronic data corrected or changed by the second input includes the first set electronic tax data.

4. The computer-implemented method of claim 3, wherein the second input comprises the subject taxpayer manually entering data into the electronic tax form that was not recognized by processing at least the portion of the image.

5. The computer-implemented method of claim 3, wherein the second input comprises the subject taxpayer manually correcting data resulting from an error the electronic tax data resulting from processing at least the portion of the image.

6. The computer-implemented method of claim 3, further comprising the intermediate computer, by the tax return preparation application:

determining that the corrected or changed electronic tax data includes the first set of electronic tax data for the plurality of pre-determined fields, automatically populating the plurality of pre-determined fields of the electronic tax form with respective electronic tax data of the first set determined by image transformation, and automatically importing a second set of electronic tax return data from the data store to populate additional fields of the electronic tax form, wherein the second set is larger than the first set, and determining that the corrected electronic tax data does not include the first set of electronic tax data for the plurality of pre-determined fields, further comprising the intermediate computer, by the tax return preparation application, requesting the subject taxpayer to manually enter other electronic tax form data to complete the electronic tax form.

7. The computer-implemented method of claim 6, wherein the electronic tax form is completed by automatically populating the plurality of pre-determined fields of the electronic tax form with respective corrected electronic tax data of the first set and automatically populating additional fields of the electronic tax form with respective additional electronic tax data of the second set imported from the data store.

8. The computer-implemented method of claim 6, wherein the electronic tax return is completed by automatically populating the plurality of pre-determined fields of the electronic tax return with respective corrected electronic tax data of the first set and automatically populating additional fields of the electronic tax form with respective additional electronic tax data of the second set imported from the data store.

9. The computer-implemented method of claim 1, wherein the electronic tax form is completed by a combination of automatically populating the plurality of pre-determined fields of the electronic tax form with respective electronic tax data of the first set and automatically importing the second set of electronic tax return data from the data store.

10. The computer-implemented method of claim 1, wherein the electronic tax return is completed by a combination of automatically populating the plurality of pre-determined fields of the electronic tax form with respective electronic tax data of the first set and automatically importing the second set of electronic tax return data from the data store.

11. The computer-implemented method of claim 1, wherein the electronic tax form is partially completed by a combination of automatically populating the plurality of pre-determined fields of the electronic tax form with respective electronic tax data of the first set and automatically importing the second set of electronic tax return data from the data store, further comprising the intermediate computer, by the tax return preparation application, requesting the subject taxpayer to enter other electronic tax form data to complete the electronic tax form.

12. The computer-implemented method of claim 1, wherein the intermediate computer is in communication the subject taxpayer's computing device comprising a mobile communication device, wherein the image is acquired with the image acquisition component of the mobile communication device and received from the mobile communication device.

13. The computer-implemented method of claim 1, the intermediate computer processing at least the portion of the image comprising the intermediate computer performing optical character recognition on at least the portion of the image.

14. The computer-implemented method of claim 13, wherein optical character recognition is not performed on other portions of the image.

15. The computer-implemented method of claim 1, the intermediate computer, by the tax return preparation application, populating the additional fields of the electronic tax return without processing respective sections of the received image.

16. The computer-implemented method of claim 1, further comprising the intermediate computer, by the tax return preparation application:

generating a third interview screen presented to the subject taxpayer through a display of a computing device of the subject taxpayer, the third interview screen requesting third input by the subject taxpayer to acquire a second image of a second tax document of the subject taxpayer;

receiving the second image from the computing device and generated by the image acquisition component of the computing device in response to the third input, processing at least a portion of the second image to transform the received second image into second electronic tax data, determining that the second electronic tax data includes the third set of electronic tax data for the second plurality of pre-determined fields of the second electronic tax form, and automatically populating the second plurality of pre-determined fields of the second electronic tax form with respective second electronic tax data of the third set determined by image transformation, and automatically importing a fourth set of second electronic tax return data from the data store to populate additional fields of the second electronic tax form, wherein the fourth set is larger than the third set, determining that the second electronic tax data does not include the third set of electronic tax data for the second plurality of pre-determined fields of the second electronic tax form, further comprising the intermediate computer, by execution of computer code, generating a fourth interview screen presented to the subject taxpayer through the computing device display, the fourth interview screen requesting fourth input from the subject taxpayer regarding the third set of electronic tax data of the second electronic tax form, and in response to determining that the fourth input confirms the second electronic tax data such that the second electronic tax data does not include the third set of electronic tax data, the intermediate computer does not populate the additional fields of the second electronic tax form with electronic tax return data imported from the data store.

17. The computer-implemented method of claim 16, the intermediate computer, by the tax return preparation application, completing the second electronic tax form by a combination of automatically populating the second plurality of pre-determined fields of the electronic tax form with respective second electronic tax data of the third set and automatically importing the fourth set of electronic tax return data from the data store.

18. The computer-implemented method of claim 16, the intermediate computer, by the tax return preparation application, completing the electronic tax return by a combination of automatically populating the second plurality of pre-determined fields of the second electronic tax form with respective second electronic tax data of the third set, automatically importing the fourth set of electronic tax return data from the data store.

19. The computer-implemented method of claim 16, in response to the second electronic tax data corrected or changed by the second input including the third set of electronic tax data for the second plurality of pre-determined fields, further comprising the intermediate computer, by the tax return preparation application:

automatically populating the second plurality of pre-determined fields of the second electronic tax form with respective corrected electronic tax data of the third set, and automatically importing the fourth set of electronic tax return data from the data store to populate additional fields of the second electronic tax form.

20. The computer-implemented method of claim 1, in response to determining that the electronic tax data does not include the first set of electronic tax data for the plurality of pre-determined fields, the intermediate computer, by the tax return preparation application, requesting second input comprising:

reactivating the image acquisition component, and acquiring a second image of the tax document, wherein the second image is processed to transform the second received image into second electronic data and determining whether the second electronic tax data includes the first set of electronic tax data for the plurality of pre-determined fields.

21. The computer-implemented method of claim 1, in response to determining that the electronic tax data does not include the first set of electronic tax data for the plurality of pre-determined fields, the intermediate computer, by the tax return preparation application, requesting second input by requesting that the subject taxpayer comprising:

repositioning the tax document or reposition the image acquisition component relative to the tax document, and acquiring a second image of the tax document, wherein the second image is processed to transform the second received image into second electronic data, and determining whether the second electronic tax data includes the first set of electronic tax data for the plurality of pre-determined fields.

22. The computer-implemented method of claim 1, the intermediate computer receiving electronic tax data of the plurality of taxpayers from respective electronic data sources comprising respective computers of respective payroll processors.

23. The computer-implemented method of claim 1, the intermediate computer, by the tax return preparation application, determining whether the electronic tax data includes the first set of electronic tax data for at least three pre-determined fields of the electronic tax form.

24. The computer-implemented method of claim 23, the intermediate computer, by the tax return preparation application, determining whether the electronic tax data includes the first set of electronic tax data for at least three contiguous pre-determined fields of the electronic tax form.

25. A computer-implemented method, comprising:

an intermediate computer, by execution of computer code by a processor of the intermediate computer, receiving electronic tax data of a plurality of taxpayers including a subject taxpayer through respective networks from respective electronic tax data sources and storing the received electronic tax data to a data store;

during preparation of an electronic tax return for the subject taxpayer, the intermediate computer, by execution of a tax return preparation application:

generating a first interview screen presented to the subject taxpayer through a display of a computing device of the subject taxpayer, the first interview screen requesting first input by the subject taxpayer to manually enter pre-determined identification data of a tax document of the subject taxpayer;

receiving pre-determined identification data from the computing device and in response to the first input, determining that the data store includes the pre-determined identification data, and automatically importing a larger set of electronic tax return data from the data store to populate additional fields of the electronic tax form, determining that the data store does not include the pre-determined identification data, further comprising the intermediate computer, by execution of computer code, generating a second interview screen presented to the subject taxpayer through the computing device display, the second interview screen requesting the subject taxpayer to acquire an image of the tax document receiving the image from the computing device and generated by an image acquisition component of the computing device, processing at least a portion of the image by masking out other portions of the image to transform the received image into electronic tax data, validating the electronic tax data processed from the image by a validation program that utilizes at least one of electronic tax data obtained from the image processing, prior year's tax return data, payroll data, manually entered tax data, or imported tax data, the validation program reporting any errors via the display of the computing device of the subject taxpayer, determining that the electronic tax data includes the first set of electronic tax data for the plurality of pre-determined fields, obtaining the first set of electronic tax data by using an optical character recognition (OCR) technique on the image, automatically populating the pre-determined fields of the electronic tax form with the first set of electronic tax data determining an electronic source using the OCR technique obtaining a second set of electronic tax return data from the electronic source, wherein the second set includes additional data about the subject taxpayer than the first set, automatically performing an OCR accuracy check on the first set of electronic tax data by comparing with the second set to determine discrepancies in one of more fields of the electronic tax form, the fields being populated based on the first set of electronic tax data automatically importing data from the second set of electronic tax return data to populate the discrepancy fields of the electronic tax form, and determining that the electronic tax data does not include the first set of electronic tax data for the plurality of pre-determined fields, further comprising the intermediate computer, by execution of computer code, generating a second interview screen presented to the subject taxpayer through the computing device display, the second interview screen requesting second input from the subject taxpayer regarding the first set of electronic tax data, and in response to determining that the second input confirms the electronic tax data such that the electronic tax data does not include the first set of electronic tax data, the intermediate computer does not populate the additional fields with electronic tax return data imported from the data store.

* * * * *